US011727642B2

(12) United States Patent
Nakao et al.

(10) Patent No.: US 11,727,642 B2
(45) Date of Patent: Aug. 15, 2023

(54) IMAGE PROCESSING APPARATUS, IMAGE PROCESSING METHOD FOR IMAGE PROCESSING APPARATUS, AND PROGRAM

(71) Applicant: SONY CORPORATION, Tokyo (JP)

(72) Inventors: Yuta Nakao, Kanagawa (JP); Nobuho Ikeda, Kanagawa (JP); Hiroshi Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/628,892

(22) PCT Filed: May 25, 2018

(86) PCT No.: PCT/JP2018/020129
§ 371 (c)(1),
(2) Date: Jan. 6, 2020

(87) PCT Pub. No.: WO2019/012817
PCT Pub. Date: Jan. 17, 2019

(65) Prior Publication Data
US 2020/0234495 A1 Jul. 23, 2020

(30) Foreign Application Priority Data

Jul. 14, 2017 (JP) .............................. 2017-138039
Apr. 17, 2018 (JP) .............................. 2018-079061

(51) Int. Cl.
*G06T 19/00* (2011.01)
*G06T 15/20* (2011.01)
(Continued)

(52) U.S. Cl.
CPC ........ *G06T 19/003* (2013.01); *A63F 13/5258* (2014.09); *G06T 15/20* (2013.01); *H04N 21/6587* (2013.01)

(58) Field of Classification Search
None
See application file for complete search history.

(56) References Cited

U.S. PATENT DOCUMENTS 5,729,471 A    3/1998 Jain
5,745,126 A *  4/1998 Jain ..................... H04N 13/246
                                               382/154
(Continued)

FOREIGN PATENT DOCUMENTS

JP    2015187797 A    10/2015
JP    2016-77346 A     5/2016
JP    2017-12397 A     1/2017

OTHER PUBLICATIONS

Robert Zeleznik, Andrew Forsberg, "UniCam—2D Gestural Camera Controls for 3D Environments", 1999, ACM, Proceedings of 1999 Symposium on Interactive 3D Graphics, pp. 169-173.*

(Continued)

*Primary Examiner* — Robert Bader
(74) *Attorney, Agent, or Firm* — Oblon, McClelland, Maier & Neustadt, L.L.P.

(57) ABSTRACT

Reduction of a work burden relating to generation of a virtual viewpoint image is implemented.
An image processing apparatus includes a virtual viewpoint image generation section that generates, on the basis of three-dimensional information that represents an imaged imaging object in a three-dimensional space, an observation image from a viewpoint in the three-dimensional space as a virtual viewpoint image, and the virtual viewpoint image generation section sets the viewpoint that follows movement of the imaging object. This makes it possible to reduce an operation burden relating to setting of a viewpoint.

13 Claims, 33 Drawing Sheets

(51) Int. Cl.
*H04N 21/6587* (2011.01)
*A63F 13/5258* (2014.01)

(56) References Cited

U.S. PATENT DOCUMENTS

| | | | | |
|---|---|---|---|---|
| 6,124,862 | A * | 9/2000 | Boyken | G06T 15/205 |
| | | | | 345/419 |
| 2001/0024972 | A1 * | 9/2001 | Kitao | A63F 13/45 |
| | | | | 463/33 |
| 2004/0219980 | A1 * | 11/2004 | Bassett | A63F 13/5252 |
| | | | | 463/33 |
| 2006/0258449 | A1 * | 11/2006 | Yasui | G06T 13/20 |
| | | | | 463/31 |
| 2011/0267344 | A1 * | 11/2011 | Germann | G06V 20/64 |
| | | | | 382/154 |
| 2012/0188452 | A1 * | 7/2012 | Keiser | G06T 13/00 |
| | | | | 348/559 |
| 2013/0027393 | A1 | 1/2013 | Fujiwara | |
| 2015/0031450 | A1 * | 1/2015 | Matsuura | A63F 13/5258 |
| | | | | 463/31 |
| 2016/0114243 | A1 * | 4/2016 | Matsuura | A63F 13/213 |
| | | | | 463/31 |
| 2020/0106967 | A1 * | 4/2020 | Yee | G06F 3/04883 |

OTHER PUBLICATIONS

Oliver Grau, Adrian Hilton, Joe Kilner, Gregor Miller, Tim Sargeant, Jonathan Starck, "A Free-Viewpoint Video System for Visualization of Sport Scenes", Jun. 2007, SMPTE, SMPTE Motion Imaging Journal, vol. 116, issue 5-6, pp. 213-219.*

Gregory P. Garvey, "Whose Point-of-View is it Anyway?", Jan. 27, 2011, SPIE, Proc. SPIE 7864, Three-Dimensional Imaging, Interaction, and Measurement, 786419.*

International Search Report dated Jul. 31, 2018 in PCT/JP2018/020129, 1 page.

* cited by examiner

FIG. 3
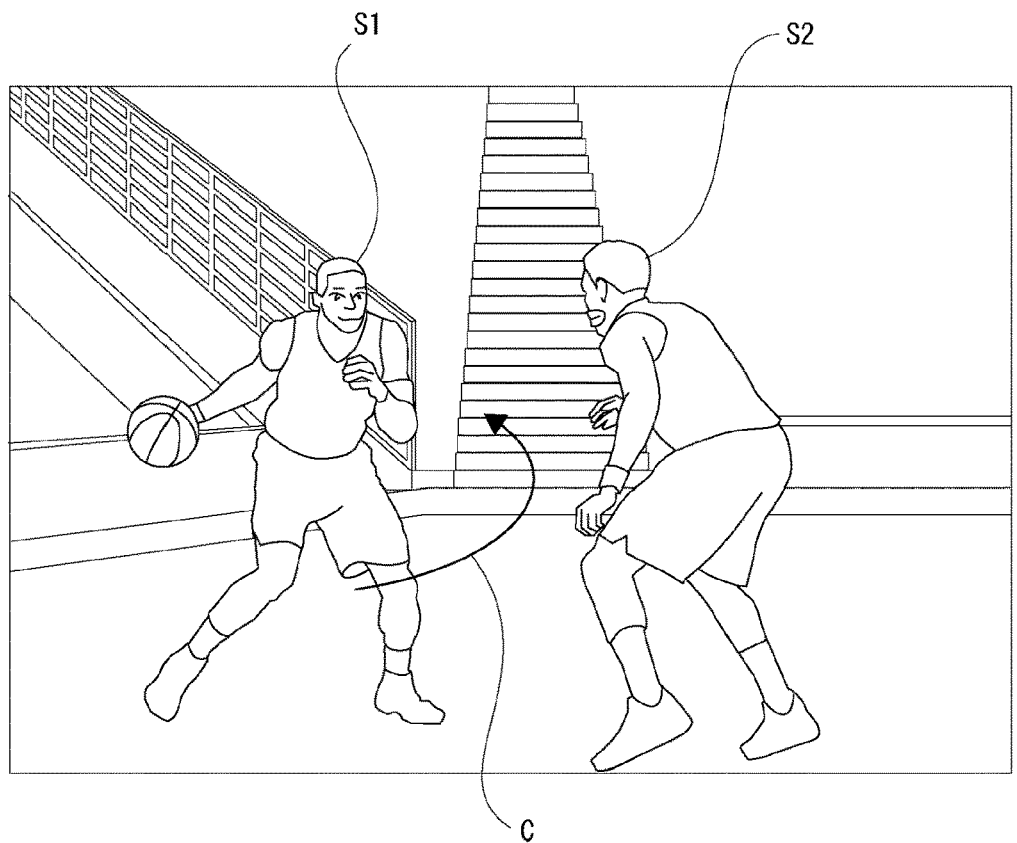
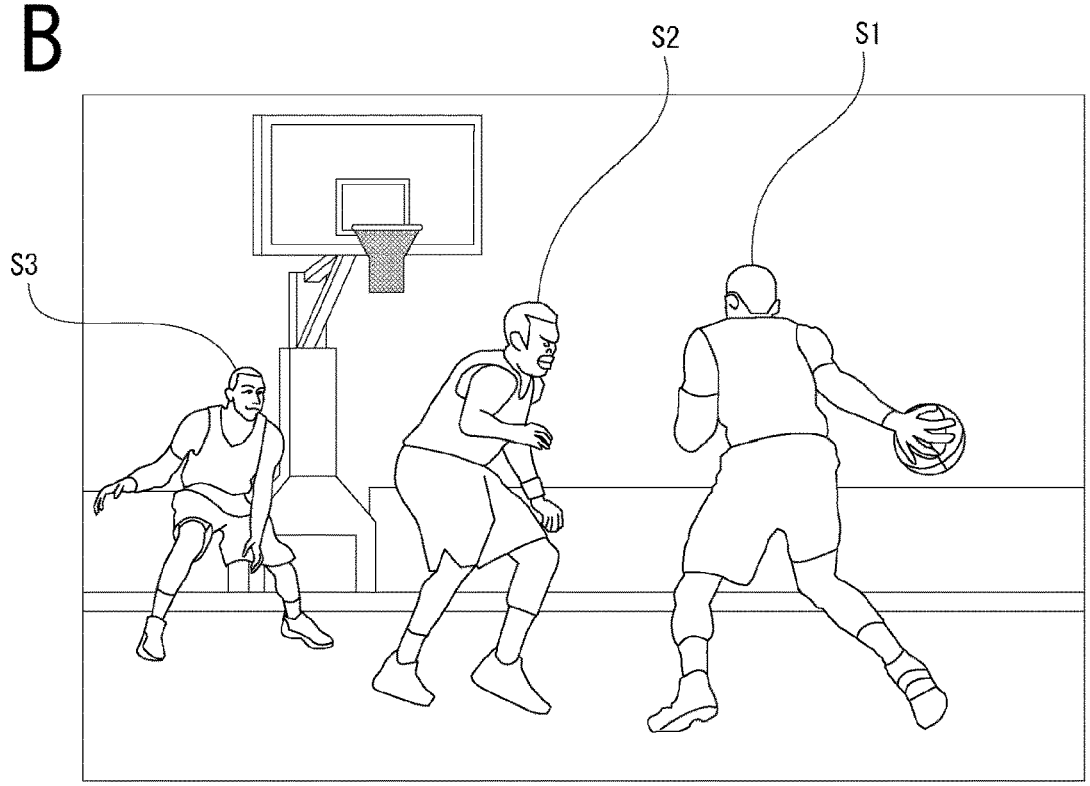

| PLAYER ID | PLAYER ATTRIBUTE INFORMATION | | |
|---|---|---|---|
| | PLAYER NAME | AFFILIATION TEAM | UNIFORM NUMBER |
| | | | |
| | | | |
| ⋮ | ⋮ | ⋮ | ⋮ |
| | | | |

FIG.6

| IMAGING OBJECT ID | POSITION | TYPE | ORIENTATION | SIMPLE MODEL | PLAYER ID |
|---|---|---|---|---|---|
|  |  |  |  |  |  |
|  |  |  |  |  |  |
| ⋮ | ⋮ | ⋮ | ⋮ | ⋮ | ⋮ |
|  |  |  |  |  |  |

FIG.7
A
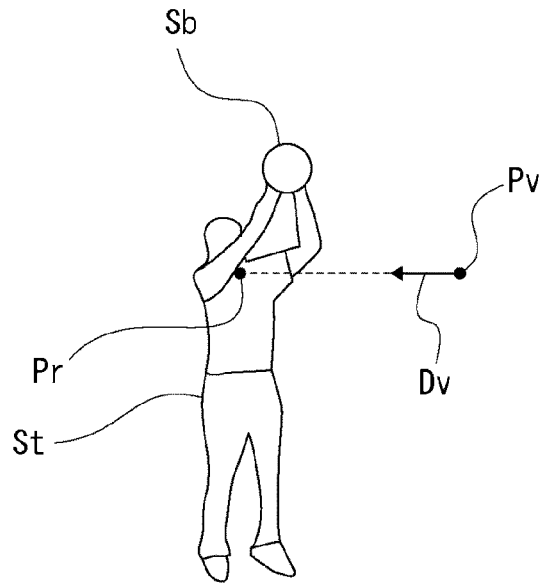
B
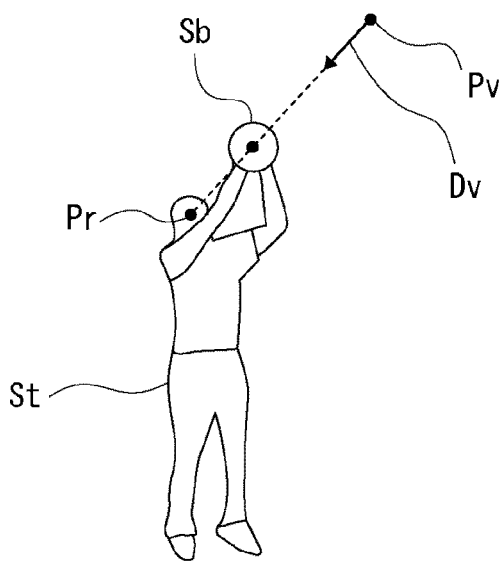

FIG.8
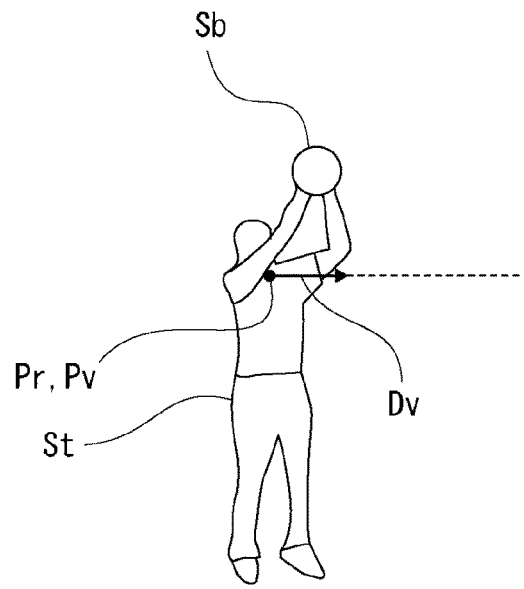
A
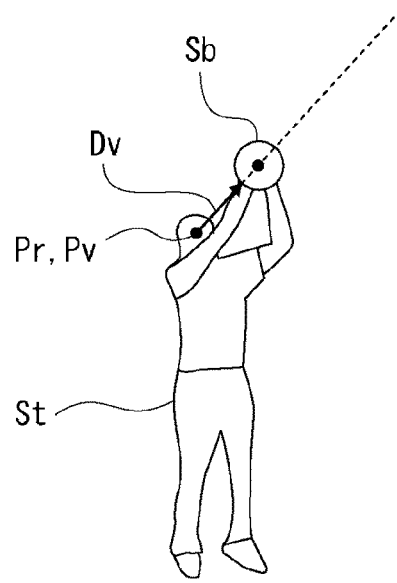
B

FIG.9
A
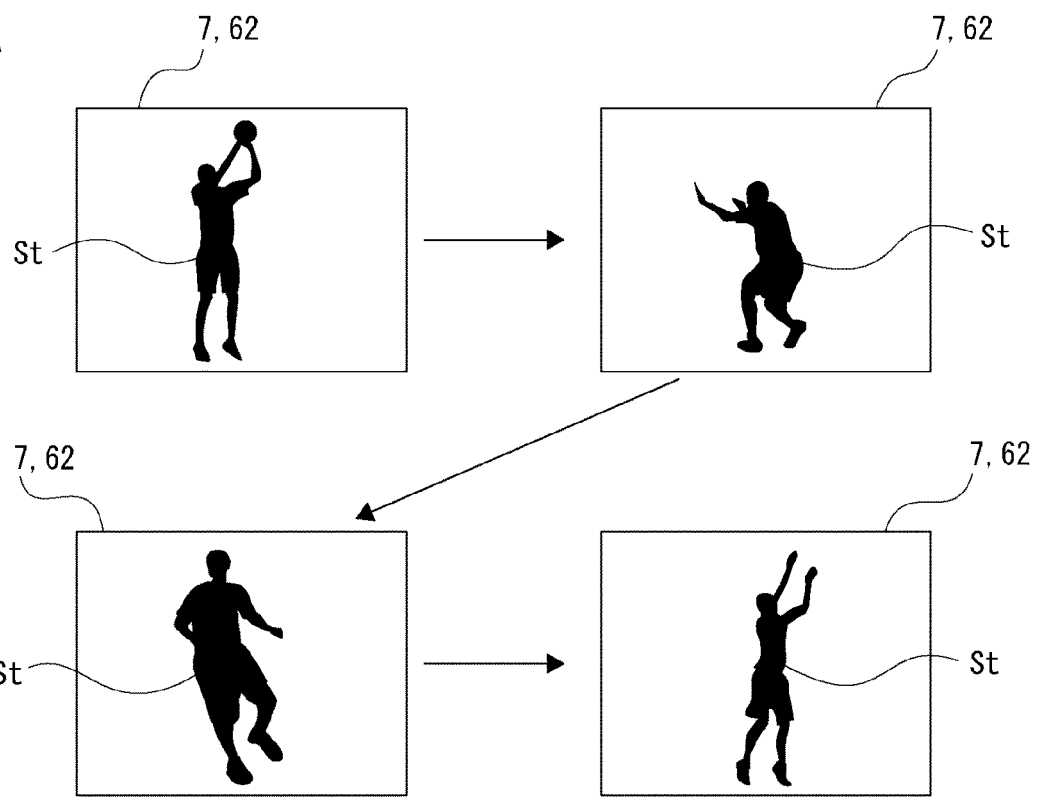
B
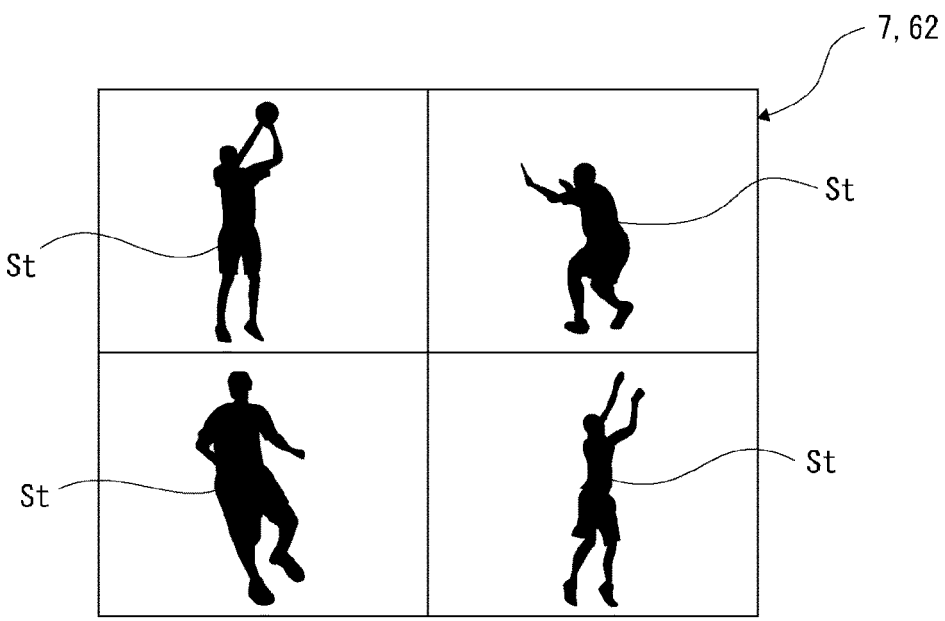

FIG. 14

| TYPE OF INFORMATION | | ONLY POSITION | FACE ORIENTATION | POSTURE | |
|---|---|---|---|---|---|
| CHANGE OF POSITION | STOP (INITIAL STATE) | ACQUISITION SITUATION | ○ | × | × |
| | | ORIENTATION DETERMINED IN ADVANCE | | | |
| | STOP (STEADY STATE) | PREVIOUS RESULT | | | |
| | MOVE | ACQUISITION SITUATION | ○ | × | × |
| | | ADVANCING DIRECTION | | | |
| | MOVE | ACQUISITION SITUATION | ○ | ○ | × |
| | | ORIENTATION ESTIMATED FROM FACE ORIENTATION | | | |
| | | ADVANCING DIRECTION AND ADVANCING SPEED, FACE ORIENTATION, AND ORIENTATION BASED ON CHANGING SPEED OF FACE ORIENTATION | | | |
| | MOVE | ACQUISITION SITUATION | ○ | ○ | ○ |
| | | ORIENTATION ESTIMATED FROM POSTURE | | | |
| | | ORIENTATION ESTIMATED FROM POSTURE, CHANGING SPEED OF ORIENTATION, AND ORIENTATION BASED ON ADVANCING DIRECTION | | | |

FIG. 15

| ADVANCING SPEED | CHANGE OF FACE ORIENTATION | ADVANCING DIRECTION AND FACE ORIENTATION (TYPICAL VALUE DURING SPECIFIC PERIOD) | METHOD |
|---|---|---|---|
| LOW | LOW | SAME | ADVANCING DIRECTION |
| LOW | LOW | DIFFERENT | TYPICAL VALUE OF FACE ORIENTATION |
| LOW | HIGH | SAME | ADVANCING DIRECTION |
| LOW | HIGH | DIFFERENT | TYPICAL VALUE OF FACE ORIENTATION |
| HIGH | LOW | SAME | ADVANCING DIRECTION |
| HIGH | LOW | DIFFERENT | TYPICAL VALUE OF FACE ORIENTATION |
| HIGH | HIGH | SAME | ADVANCING DIRECTION |
| HIGH | HIGH | DIFFERENT | ADVANCING DIRECTION |

FIG.17

| CHANGE OF BODY ORIENTATION | ADVANCING DIRECTION AND BODY ORIENTATION (TYPICAL VALUE DURING SPECIFIC PERIOD) | METHOD |
|---|---|---|
| LOW | – | TYPICAL VALUE OF BODY ORIENTATION |
| HIGH | SAME | TYPICAL VALUE OF BODY ORIENTATION |
| | DIFFERENT | ADVANCING DIRECTION |

FIG. 20
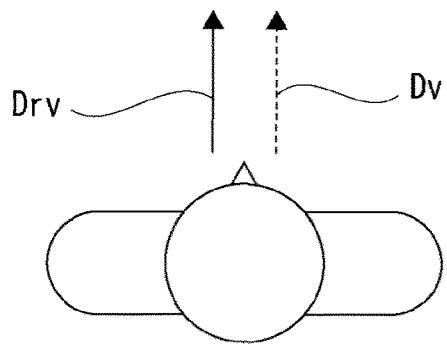
COINCIDENT
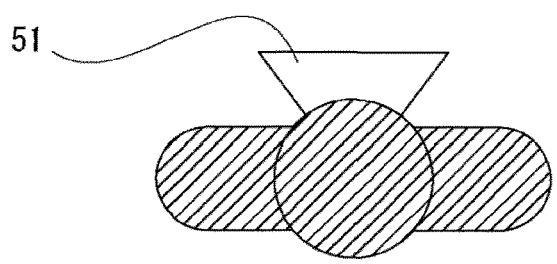
INCOINCIDENT
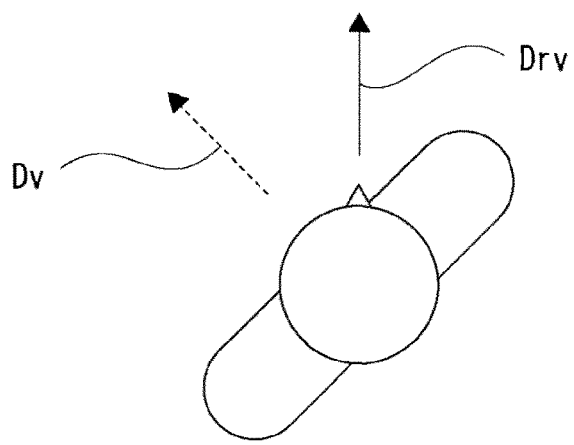

FIG. 21

| TYPE OF INFORMATION | | ACQUISITION SITUATION | ACQUISITION SITUATION | ACQUISITION SITUATION |
|---|---|---|---|---|
| FACE ORIENTATION | | × | ○ | ○ |
| | PUPIL ORIENTATION | × | × | ○ |
| METHOD | | NO PRESENTED | ESTIMATED BASED ON FACE ORIENTATION | PUPIL ORIENTATION |

FIG.24
A
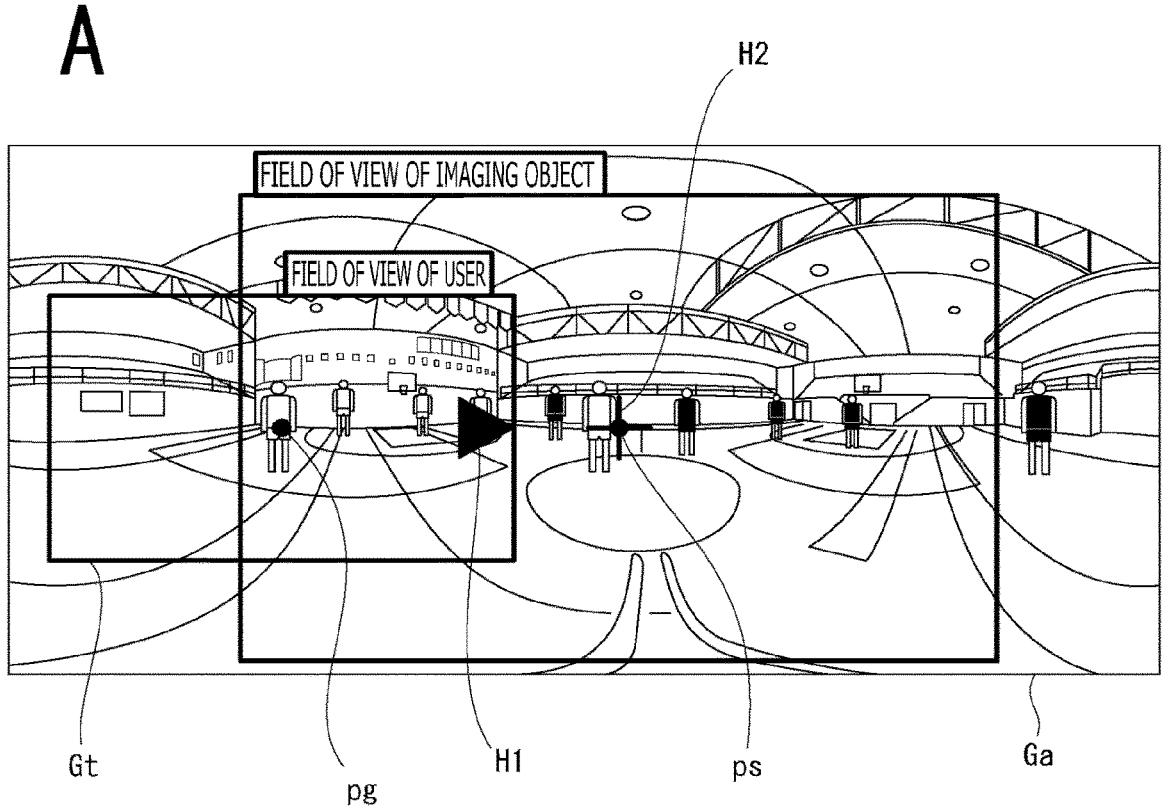
B
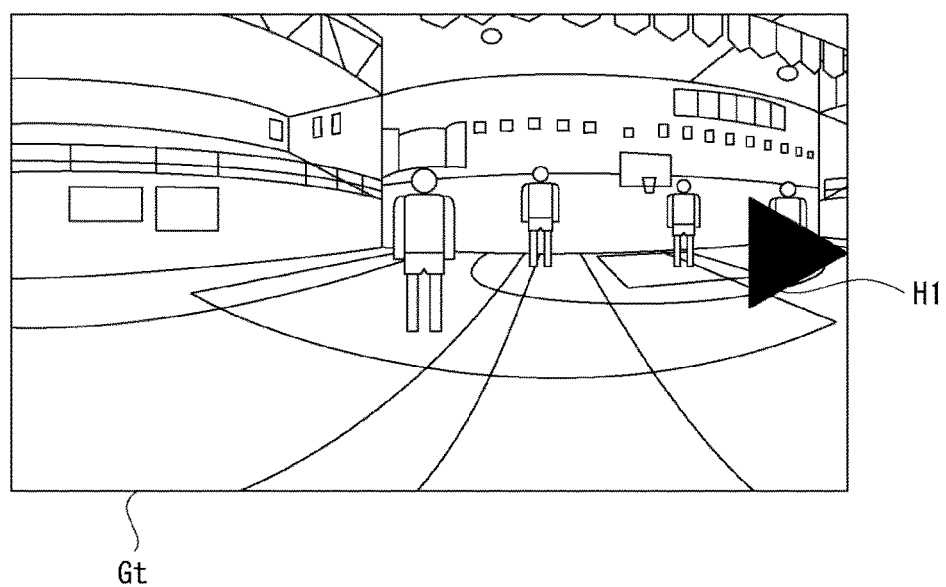

FIG. 26
A
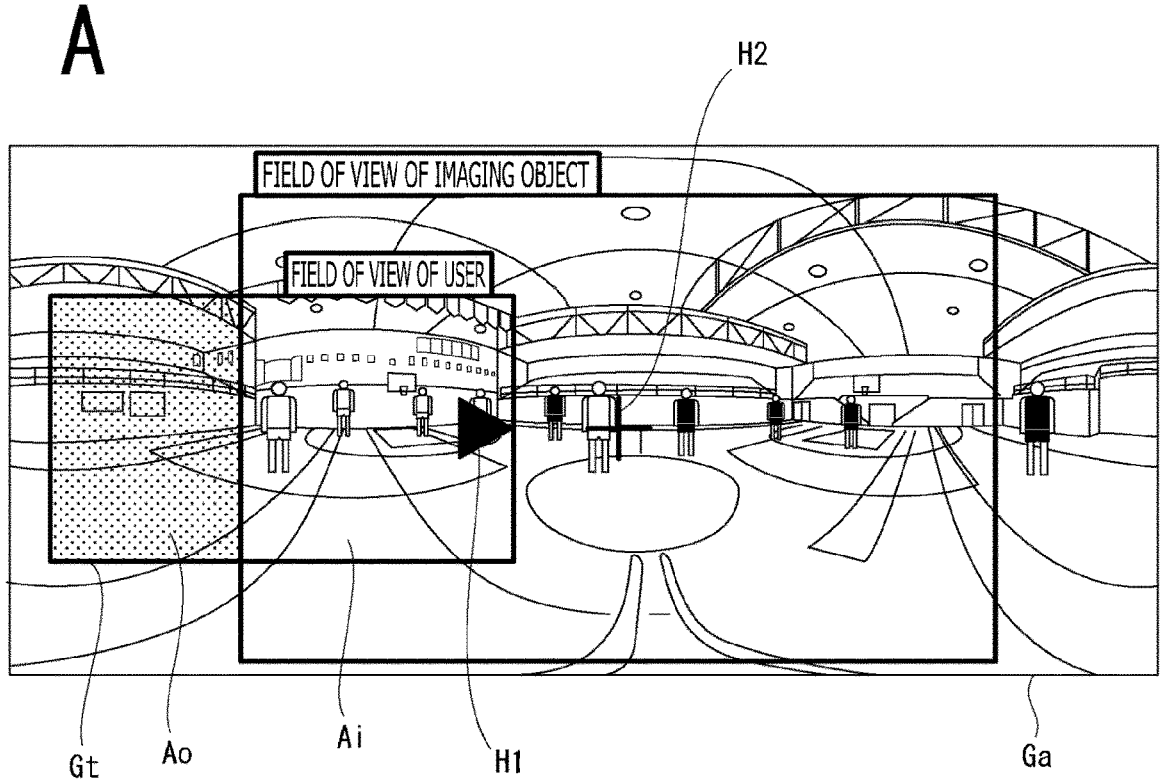
B
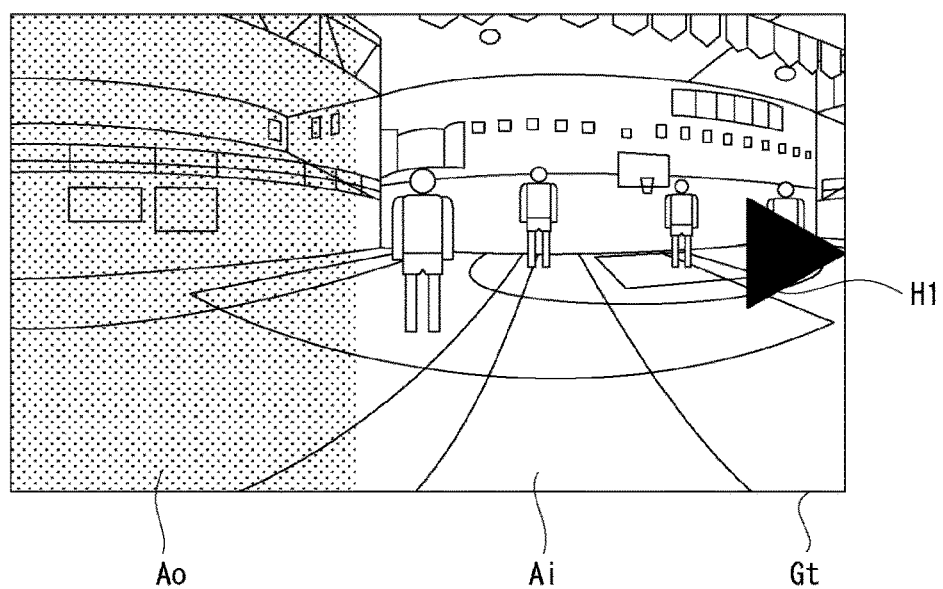

100A (IMAGE PROCESSING SYSTEM)

IMAGE PROCESSING APPARATUS, IMAGE PROCESSING METHOD FOR IMAGE PROCESSING APPARATUS, AND PROGRAM

TECHNICAL FIELD

The present technology relates to a technical field of an image processing apparatus that generates an observation image as viewed from a viewpoint in a three-dimensional space as a virtual viewpoint image on the basis of three-dimensional information that represents an imaged imaging object in the three-dimensional space, a method for the image processing apparatus, and a program for generating a virtual viewpoint image.

BACKGROUND ART

A technology is known by which a virtual viewpoint image (also called free viewpoint image or free viewpoint video) corresponding to an observation image from an arbitrary viewpoint in a three-dimensional space is generated on the basis of three-dimensional information that represents an imaged imaging object in the three-dimensional space.

It is to be noted that PTL 1 listed below can be given as a related art.

PTL 1 discloses that a 3D model is generated on the basis of captured images by a plurality of imaging apparatuses and a viewpoint is set such that a noticed portion of an imaging object (person) is viewed on an image and then a virtual viewpoint image according to the set viewpoint is generated. In the present document, it is not premised that a person as an imaging object moves and, if a viewpoint is set once, then the viewpoint remains fixed and the viewpoint does not follow an imaging object as a target when it moves temporarily.

CITATION LIST

Patent Literature

[PTL 1]
JP 2016-77346A

SUMMARY

Technical Problem

In the virtual viewpoint image, it is possible to move a viewpoint freely and to provide, especially in regard to a virtual viewpoint image as a moving image, a high realistic image in which the viewpoint dynamically changes together with the passage of time.

However, in the past, viewpoint setting for a virtual viewpoint image has performed generally by manual operation by an image editor or the like. This increases a work burden relating to generation of a virtual viewpoint image and is not desirable.

The present technology has been made in view of such a situation as described above, and it is an object of the present technology to implement reduction of the work burden relating to generation of a virtual viewpoint image.

Solution to Problem

An image processing apparatus according to the present technology includes a virtual viewpoint image generation section that generates, on the basis of three-dimensional information that represents an imaged imaging object in a three-dimensional space, an observation image from a viewpoint in the three-dimensional space as a virtual viewpoint image, and the virtual viewpoint image generation section sets the viewpoint that follows movement of the imaging object.

By setting the viewpoint that follows movement of the imaging object as described above, the operation burden relating to setting of the viewpoint can be reduced.

Preferably, the image processing apparatus according to the present technology described above includes an imaging object analysis section that acquires analysis information of the imaging object on the basis of the three-dimensional information, and the virtual viewpoint image generation section sets a reference position to be used for the viewpoint setting of the virtual viewpoint image on the basis of the analysis information.

Consequently, various viewpoint setting based on the reference position can be implemented and following of the imaging object to the viewpoint is facilitated.

Preferably, the image processing apparatus according to the present technology described above includes a three-dimensional information generation section that generates the three-dimensional information on the basis of imaging information including captured images of a plurality of imaging apparatuses and an imaging condition corresponding to the captured images.

By using the imaging information including the captured images and the imaging condition of the plurality of imaging apparatuses in such a manner, suitable three-dimensional information can be obtained.

Preferably, the image processing apparatus according to the present technology described above sets a person as the imaging object, and the virtual viewpoint image generation section sets the reference position to a physical center of the person.

The physical center signifies a physical center of a person such as, for example, the center between both shoulders of the person, the center in the upward, downward, leftward, and rightward directions of the body, the center of the face, or the center of the feet.

Preferably, in the image processing apparatus according to the present technology described above, the virtual viewpoint image generation section sets the viewpoint on the basis of position information of the imaging object.

This makes it possible to set a viewpoint at which the imaging object can be easily captured.

Preferably, the image processing apparatus according to the present technology described above targets a person as the imaging object, and the virtual viewpoint image generation section sets the viewpoint on the basis of attribute information of the imaging object.

This makes it possible to automatically set the viewpoint on the basis of the position of the imaging object specified from the attribute information of the imaging object.

Preferably, in the image processing apparatus according to the present technology described above, the virtual viewpoint image generation section sets the viewpoint on the basis of area information designated in the three-dimensional space.

This makes it possible to automatically set the viewpoint on the basis of the position of the imaging object existing in a specific area in the three-dimensional space.

Preferably, in the image processing apparatus according to the present technology described above, the virtual viewpoint image generation section sets the viewpoint on the basis of an operation input.

This makes it possible to set a viewpoint on which an intention of the user is reflected while operation burden reduction in the viewpoint setting is achieved.

Preferably, the image processing apparatus according to the present technology described above includes a display section that displays the virtual viewpoint image, and the display section sequentially displays a plurality of the virtual viewpoint images that is different in a setting method of the view point as candidate viewpoint images and the virtual viewpoint image generation section sets the viewpoint on the basis of a selection operation relating to the candidate viewpoint images.

This makes it possible for the user to select a favorable viewpoint while actually confirming image contents. Further, since sequential display is applied, a comparatively great candidate viewpoint image can be displayed and the user can perform viewpoint selection while confirming particulars of the image.

Preferably, the image processing apparatus according to the present technology described above includes a display section that displays the virtual viewpoint image, and the display section displays a plurality of the virtual viewpoint images that is different in the setting method of the view point as candidate viewpoint images in a juxtaposed relationship with each other, and then the virtual viewpoint image generation section sets the viewpoint based on a selection operation relating to the candidate viewpoint images.

This makes it possible for the user to select a favorable viewpoint while actually confirming image contents. Further, since the candidate viewpoint images are displayed in a juxtaposed relationship with each other, the user can perform viewpoint selection while comparing a plurality of candidate viewpoint images with each other at the same time.

Preferably, in the image processing apparatus according to the present technology described above, the virtual viewpoint image generation section allows changeover between a viewpoint for observing the imaging object and another viewpoint for observing outwardly from the imaging object as the viewpoint.

This achieves diversification of a viewpoint that can be set.

Preferably, in the image processing apparatus according to the present technology described above, the virtual viewpoint image generation section sets the viewpoint along a spherical surface that covers a periphery of the imaging object in response to an operation.

This increases the degree of freedom of a viewpoint position that can be set by an operation by the user.

Preferably, in the image processing apparatus according to the present technology described above, a person is targeted as the imaging object, and the virtual viewpoint image generation section sets a first-person viewpoint that is a viewpoint for observing outwardly from the imaging object as the viewpoint and selects a setting method for a gaze direction from the first-person viewpoint on the basis of an acquisition situation of analysis information relating to an orientation of the imaging object.

This makes it possible to perform setting of an appropriate gaze direction according to the acquisition situation of analysis information relating to an orientation of the imaging object such as, for example, an orientation of the face of the imaging object or an orientation of the body.

Preferably, in the image processing apparatus according to the present technology described above, the virtual viewpoint image generation section selects a setting method for the gaze direction on the basis of the acquisition situation and a changing rate of an orientation of the imaging object.

This makes it possible to perform, where, even if analysis information relating to an orientation of the imaging object such as, for example, an orientation of the face of the imaging object or an orientation of the body is acquired, the changing rate is high, setting of a gaze direction according to the changing rate of the orientation of the imaging object such as setting of a gaze direction without using the analysis information.

Preferably, in the image processing apparatus according to the present technology described above, the virtual viewpoint image generation section sets the gaze direction on the basis of the acquisition situation and an advancing direction of the imaging object.

This makes it possible to set, when analysis information according to the orientation of the imaging object cannot be acquired, the gaze direction on the basis of the advancing direction of the imaging object (changing direction of the position of the imaging object).

Preferably, in the image processing apparatus according to the present technology described above, a person is targeted as the imaging object, and the virtual viewpoint image generation section include a notification processing section that sets a first-person viewpoint that is a viewpoint for observing outwardly from the imaging object as the viewpoint, sets a gaze direction from the viewpoint on the basis of the analysis information relating to the orientation of the imaging object, and performs a process for notifying a user of information according to a displacement between the gaze direction and an orientation of the gaze of the imaging object.

Since such notification of the information according to the displacement between the gaze direction and the orientation of the gaze of the imaging object as described above is performed, the user can easily align the gaze direction of the virtual viewpoint image to the orientation of the gaze of the imaging object.

Preferably, in the image processing apparatus according to the present technology described above, the notification processing section performs a process for displaying gaze alignment guide information for aligning the gaze direction of the virtual viewpoint image with the orientation of the gaze of the imaging object together with the virtual viewpoint image.

Since such gaze alignment guide information as described above is displayed together with the virtual viewpoint image, the user can easily align the gaze direction of the virtual viewpoint image to the orientation of the gaze of the imaging object.

Preferably, in the image processing apparatus according to the present technology described above, the notification processing section performs a process for estimating a field of view of the imaging object on the basis of the orientation of the gaze of the imaging object and causing both an overlapping portion and a non-overlapping portion with the field of view of the imaging object in the virtual viewpoint image in different displaying forms.

Since the displaying forms in the overlapping portion and the non-overlapping portion with the field of view of the imaging object in the virtual viewpoint image are different from each other, it allows the user to easily understand to which direction the gaze direction is to be changed for the orientation alignment with the gaze of the imaging object.

Further, the image processing method according to the present technology is an image processing method for an image processing apparatus, including acquiring three-dimensional information that represents an imaged imaging object in a three-dimensional space, generating an observation image from a viewpoint in the three-dimensional space on the basis of the three-dimensional information, and setting the viewpoint that follows movement of the imaging object when the virtual viewpoint image is generated.

Also with such an image processing method as just described, working similar to that by the image processing apparatus according to the present technology described above is obtained.

Further, the program according to the present technology is a program for causing a computer apparatus to execute acquiring three-dimensional information that represents an imaged imaging object in a three-dimensional space, generating an observation image from a viewpoint in the three-dimensional space on the basis of the three-dimensional information, and setting the viewpoint that follows movement of the imaging object when the virtual viewpoint image is generated.

With such a program as just described, the image processing apparatus according to the present technology described above is implemented.

Advantageous Effect of Invention

With the present technology, reduction of a work burden relating to generation of a virtual viewpoint image can be implemented.

It is to be noted that the effect described here is not always restrictive and any of effects described in the present disclosure may be applied.

BRIEF DESCRIPTION OF DRAWINGS

FIG. 3 is an explanatory view of a viewpoint of a virtual viewpoint image.

FIG. 6 is a view exemplifying imaging object analysis information in the embodiment.

FIG. 7 is a view illustrating an example of setting of a viewpoint and a gaze direction corresponding to a "viewpoint for observing an imaging object" in the embodiment.

FIG. 8 is a view illustrating an example of setting of a viewpoint and a gaze direction corresponding to a "viewpoint for observing outwardly from an imaging object" in the embodiment.

FIG. 9 is an explanatory view of a displaying method of a plurality of candidate viewpoint images.

FIG. 14 is an explanatory view of a setting method of a gaze direction in a second modification.

FIG. 15 is a view depicting an example of a setting method of a gaze direction when an imaging object is in a moving state in the case where only a face orientation has been acquired.

FIG. 17 is a view depicting an example of a setting method of a gaze direction when an imaging object is in a moving state in the case where both a face orientation and a posture have been obtained.

FIG. 20 is a view illustrating a relationship between a gaze direction of a virtual viewpoint image and a direction of a gaze of an imaging object according to a first-person viewpoint.

FIG. 21 is a view illustrating a setting method of a direction of a gaze of an imaging object in the third modification.

FIG. 24 is an explanatory view of an example of information notification according to a displacement that occurs between the gaze direction and the orientation of the gaze.

FIG. 26 is an explanatory view of another example of information notification according to a displacement that occurs between the gaze direction and the orientation of the gaze.

DESCRIPTION OF EMBODIMENT

In the following, an embodiment according to the present technology is described in the following order with reference to the accompanying drawings.
<1. Image Processing System of Embodiment>
[1-1. Configuration of Image Processing System]
[1-2. Viewpoint Setting Method of Embodiment]
[1-3. Processing Procedure]
<2. Modifications>
[2-1. First Modification]
[2-2. Second Modification]
[2-3. Third Modification]
[2-4. Fourth Modification]
[2-5. Fifth Modification]
[2-6. Sixth Modification]
[2-7. Seventh Modification]
[2-8. Eighth Modification]
<3. Summary of Embodiment>
<4. Other Modifications>
<5. Present Technology>

Figure 1:
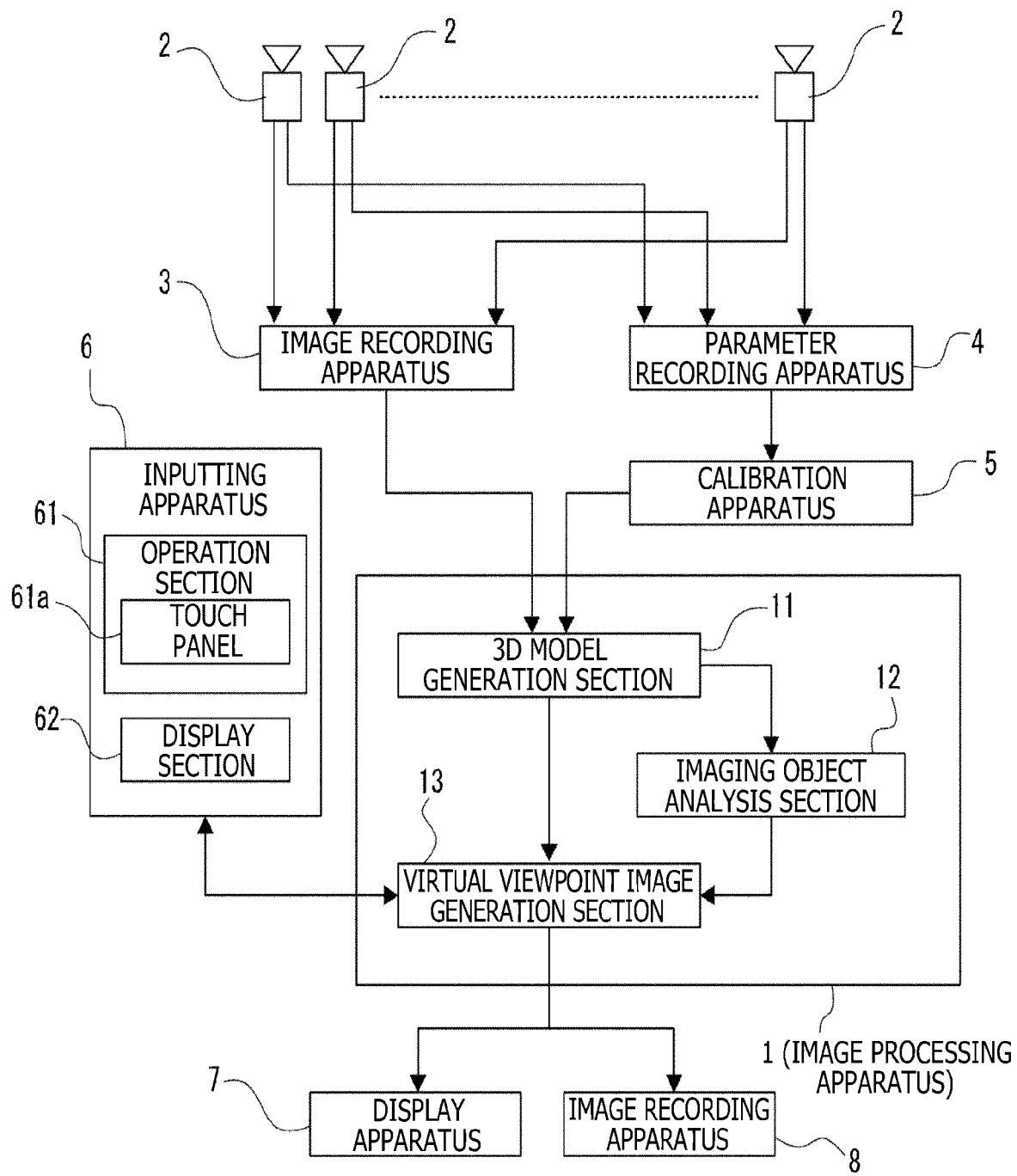
FIG. 1 is a view depicting an example of a configuration of an image processing system including an image processing apparatus as an embodiment.

1. Image Processing System of Embodiment 1-1. Configuration of Image Processing System FIG. 1 depicts an example of a configuration of an image processing system 100 including an image processing apparatus 1 as an embodiment according to the present technology.

The image processing system 100 includes, in addition to the image processing apparatus 1, a plurality of imaging apparatuses 2, an image recording apparatus 3, a parameter recording apparatus 4, a calibration apparatus 5, an inputting apparatus 6, a display apparatus 7, and an image recording apparatus 8, and generates a virtual viewpoint image (also called free viewpoint image or free viewpoint video) that corresponds to an observation image from an arbitrary viewpoint in a three-dimensional space on the basis of imaging information acquired from the plurality of imaging apparatuses 2.

Each imaging apparatus 2 is configured as a digital camera apparatus having an imaging element configured from, for example, a CCD (Charge Coupled Devices) sensor or a CMOS (Complementary Metal-Oxide-Semiconductor) sensor and acquires a captured image (captured image data) as digital data. In the present example, each imaging apparatus 2 acquires a captured image according to a moving image.

Each imaging apparatus 2 images a manner in which, in the present example, a ball game such as basketball or soccer is being carried out and individually is arranged in a pre-determined direction at a predetermined position at the competition venue where the ball game is held. Although the number of imaging apparatuses 2 in the present example is three or more, it is sufficient if the number of imaging apparatuses 2 is at least two or more in order to make it possible to generate a virtual viewpoint image. If the number of imaging apparatus 2 is increased to image a target imaging object from an increased number of angles, then improvement in accuracy of three-dimensional restoration of an imaging object can be achieved and improvement in picture quality of a virtual viewpoint image can be achieved.

The image recording apparatus 3 includes a data recording section such as, for example, an SSD (Solid State Drive) or an HDD (Hard Disk Drive), and a control section that performs recording and reproduction control of data into and from the data recording section. The image recording apparatus 3 records captured images by the respective imaging apparatuses 2 and transmits such recorded captured images to an external apparatus (in the present example, the image processing apparatus 1) in accordance with a request.

It is to be noted that recording of captured images by the respective imaging apparatuses 2 into the image recording apparatus 3 eliminates the necessity to perform a generation process of a virtual viewpoint image based on the captured images at the imaging site (in the present example, at the competition venue), and it becomes possible to perform browsing of the virtual viewpoint image at an arbitrary timing. However, this recording is not necessarily essential in the case where a generation process of a virtual viewpoint image is carried out at the imaging site, and the captured images by the respective imaging apparatuses 2 may be transmitted directly to the image processing apparatus 1. In this case, since the recording process by the image recording apparatus 3 is omitted, generation of a virtual viewpoint image can be performed at a higher speed as much.

In the present example, a time code is added to a captured image by each imaging apparatus 2 such that it becomes possible to establish frame synchronism in later processing in the image processing apparatus 1.

The parameter recording apparatus 4 includes a data recording section such as, for example, an SSD or an HDD, and a control section that performs recording and reproduction control of data into and from the data recording section. The parameter recording apparatus 4 records camera internal parameters acquired from the respective imaging apparatuses 2 and transmits the recorded camera internal parameters to an external apparatus (in the present example, the calibration apparatus 5) in accordance with a request.

In generation of a virtual viewpoint image, as the camera internal parameters, information of the focal distance of the camera, the aspect ratio of pixels, lens distortions and so forth are acquired. The parameter recording apparatus 4 records the camera internal parameters in association with the identification information of the imaging apparatus 2 of the acquisition source and a time code.

The calibration apparatus 5 carries out calibration on the basis of the camera internal parameters acquired from the parameter recording apparatus 4. Here, a 3D model generation section 11 hereinafter described detects a point observed in common by a plurality of imaging apparatuses 2 and restores a three-dimensional structure of an imaging object on the basis of the principle of triangulation. In the calibration here, a process for determining camera parameters for increasing the accuracy of such three-dimensional restoration of an imaging object is performed. In particular, the calibration apparatus 5 extracts camera parameters representative of the position and imaging direction (gaze direction) of each imaging apparatus 2 on the basis of the acquired camera internal parameters. The extracted camera parameters are transferred in a state in which they allow identification regarding with which imaging apparatus 2 they are associated to the image processing apparatus 1.

Here, the camera parameters described above correspond to information representative of "imaging conditions corresponding to a captured image" in the present technology, and the position or the imaging direction of each imaging apparatus 2 described above is an example of the "imaging conditions corresponding to a captured image."

It is to be noted that recording of camera internal parameters by the parameter recording apparatus 4 in such a manner as described above makes it possible to perform browsing of a virtual viewpoint image at an arbitrary timing similarly as in the case of the image recording apparatus 3 described above. However, it is not essentially required to provide the parameter recording apparatus 4, but it is sufficient if camera internal parameters are transferred from each imaging apparatus 2 directly to the calibration apparatus 5.

The inputting apparatus 6 is an apparatus for performing operation inputting to the image processing apparatus 1 (virtual viewpoint image generation section 13) and includes an operation section 61 that includes required operation elements such as, for example, various keys and buttons and a display section 62 including a display device such as, for example, an LCD (Liquid Crystal Display) or an organic EL (Electro-Luminescence) display that can display an image.

The operation section 61 in the present example includes a touch panel 61a that allows a touch operation by a user as an operation element. The touch panel 61a is formed on a display screen of the display section 62 and the user can perform various information inputting by a touch operation with the display screen.

The display section 62 displays various information generated by the inputting apparatus 6 and information inputted from the image processing apparatus 1.

The inputting apparatus 6 transmits operation information by the user obtained by the operation section 61 to the image processing apparatus 1.

The image processing apparatus 1 includes a 3D model generation section 11, an imaging object analysis section 12, and a virtual viewpoint image generation section 13.

The 3D model generation section 11, the imaging object analysis section 12, and the virtual viewpoint image generation section 13 are configured as an image processor configured, for example, from a DSP (Digital Signal Processor) or the like the image processing apparatus 1 includes.

The 3D model generation section 11 generates, on the basis of captured images by the respective imaging apparatuses 2 inputted from the image recording apparatus 3 and camera parameters of the individual imaging apparatuses 2 inputted from the calibration apparatus 5, 3D model data representing an imaging object in a three-dimensional space (namely, restoring a three-dimensional structure of the imaging object from two-dimensional images). In particular, the 3D model data includes data representing an imaging object in a three-dimensional coordinate system by (X, Y, Z).

The 3D model data generated by the 3D model generation section 11 are inputted to the imaging object analysis section 12 and the virtual viewpoint image generation section 13.

Here, the captured images from the respective imaging apparatuses 2 and the camera parameters of the individual imaging apparatuses 2 inputted in order to allow the 3D model generation section 11 to generate 3D model data correspond to an example of "imaging information" in the present technology.

Further, the 3D model data described above corresponds to an example of "three-dimensional information" that represents an imaged imaging object in a three-dimensional space.

The imaging object analysis section 12 performs analysis of a position, an orientation, and a posture of an imaging object as a person (player) on the basis of 3D model data. In particular, the imaging object analysis section 12 performs estimation of a position of an imaging object, generation of a simple model of the imaging object, and estimation of an orientation of the imaging object (in the present example, a face orientation). The imaging object analysis section 12 of the present example performs also an identification process of an imaging object. In particular, the imaging object analysis section 12 performs identification of a player and identification of a competition ball.

It is to be noted that the process for generation of a simple model and for identification of a player performed by the imaging object analysis section 12 is hereinafter described. The identification of a ball can be performed by a matching process with a reference template based, for example, on the shape, size and so forth of an imaging object or by a like process.

The virtual viewpoint image generation section 13 generates a virtual viewpoint image on the basis of 3D model data inputted from the 3D model generation section 11 and imaging object analysis information (hereinafter referred to as "imaging object analysis information Ia") by the imaging object analysis section 12. Especially, the virtual viewpoint image generation section 13 in the present embodiment determines an imaging object, which moves, for example, as a player, as a target and changes (sets) the position of a viewpoint of a virtual viewpoint image following the movement of the imaging object.

Further, the virtual viewpoint image generation section 13 changes the position of the viewpoint of the virtual viewpoint image on the basis of operation information from the inputting apparatus 6 while keeping such following of the movement of the imaging object as described above.

Here, by setting the viewpoint position for a virtual viewpoint image, for example, for each fixed time interval (frame rate) on the basis of three-dimensional information of the imaging object that changes together with the movement of the imaging object and analysis information of the imaging object, the viewpoint position set at a certain point of time differs from the viewpoint position set immediately before then (at a different point of time). In particular, since the viewpoint position changes following the movement of the imaging object, also the virtual viewpoint image generated on the basis of the viewpoint position results in following the movement of the imaging object (resulting in an image that continues to display the imaging object within a picture frame).

It is to be noted that, although, in the image processing system 10 depicted in FIG. 1, captured images by a plurality of imaging apparatuses 2 are recorded by the image recording apparatus 3, at this time, in order to achieve reduction of the recording capacity, for example, only a partial image portion (moving picture portion) as a noticed scene or the like may be recorded. In particular, it is conceivable to specify and record a noticed scene utilizing information of imaging object analysis by the imaging object analysis section 12. For example, as a specification method of a noticed scene, it is conceivable to specify a goal scene on the basis of position information of a play ball and position information of a goal or specify a scene in which a play ball is intercepted on the basis of position information of a play ball and position information of players.

Figure 2:
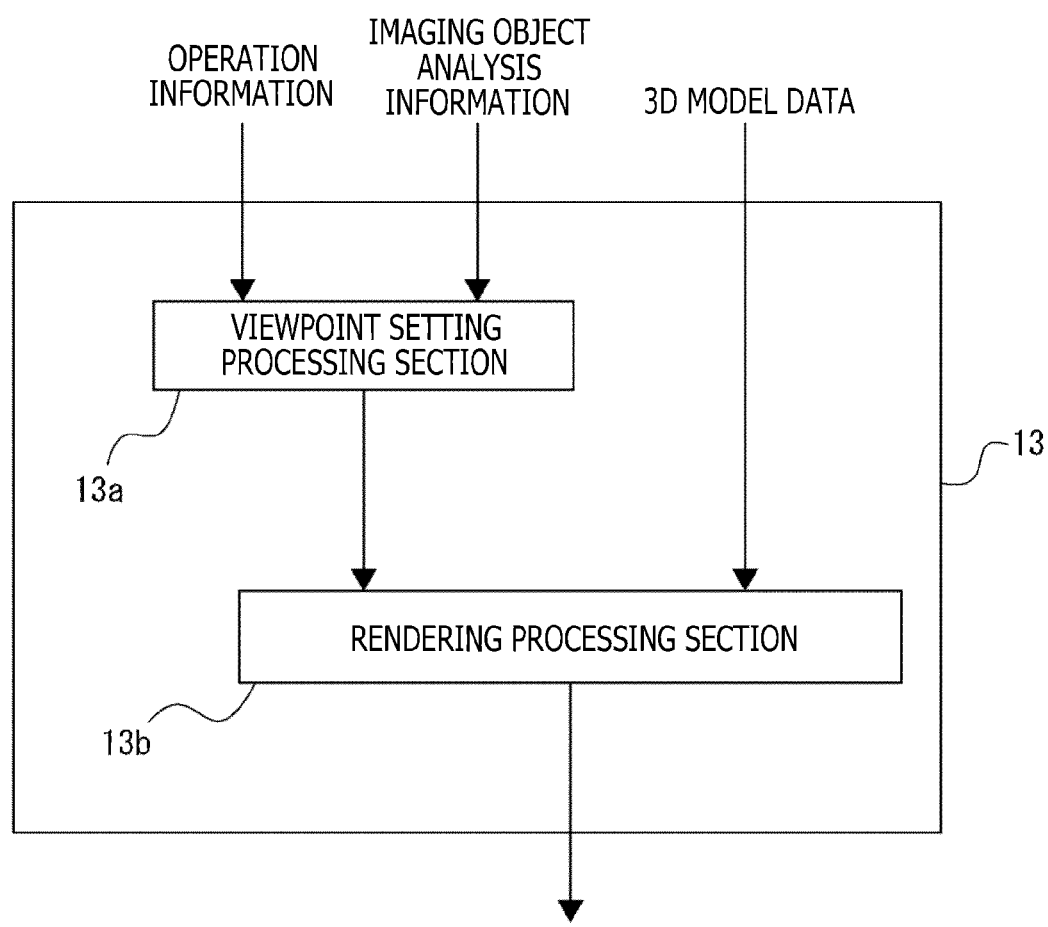
FIG. 2 is a functional block diagram of a virtual viewpoint image generation section provided in the image processing apparatus as the embodiment.

FIG. 2 is a functional block diagram of the virtual viewpoint image generation section 13.

As depicted in FIG. 2, the virtual viewpoint image generation section 13 has functions as a viewpoint setting processing section 13a and a rendering processing section 13b.

The viewpoint setting processing section 13a sets a viewpoint of a virtual viewpoint image on the basis of imaging object analysis information Ia by the imaging object analysis section 12 and operation information from the inputting apparatus 6.

For the confirmation, a viewpoint of a virtual viewpoint image is described with reference to FIG. 3.

A of FIG. 3 depicts an image of a virtual viewpoint image that captures an imaging object from a required viewpoint set in a three-dimensional space. In the virtual viewpoint image in this case, an imaging object S1 is viewed substantially from the front and another imaging object S2 is viewed substantially from the back.

In B of FIG. 3, an image of a virtual viewpoint image in the case where a viewpoint at which the imaging object S1 is viewed substantially from the back is set by changing the position of the viewpoint in a direction indicated by an arrow mark C in A of FIG. 3 is depicted. In the virtual viewpoint image of B of FIG. 3, the imaging object S2 is viewed substantially from the front, and a further imaging object S3 and a basket goal, which are not depicted in A of FIG. 3, are depicted.

Here, the viewpoint of the virtual viewpoint image is hereinafter referred to as "viewpoint Pv."

A setting method of the viewpoint Pv as the present embodiment is described later.

Referring to FIG. 2, the rendering processing section 13b generates a virtual viewpoint image, which is an observation image (two-dimensional image) from the viewpoint Pv, on the basis of the viewpoint Pv set by the viewpoint setting processing section 13a and 3D model data.

As hereinafter described, in the present example, it is made possible to set, on the basis of an operation of the user, which direction in a three-dimensional space is to be observed from the viewpoint Pv to generate an image as a virtual viewpoint image ("inward" or "outward" viewpoint mode hereinafter described). In the following, such an observation method from the viewpoint Pv as just described is referred to as "gaze direction Dv."

Referring to FIG. 1, a virtual viewpoint image obtained by the virtual viewpoint image generation section 13 (rendering processing section 13b) is transmitted to the display apparatus 7 and the image recording apparatus 8.

The display apparatus 7 includes a display section including a display device such as, for example, an LCD or an organic EL display and performs display of a virtual viewpoint image.

The image recording apparatus 8 includes a data recording section such as, for example, an SSD or an HDD and a control section that performs recording and reproduction control of data into and from the data recording section, and records a virtual viewpoint image into the data recording section. By recording a virtual viewpoint image into the image recording apparatus 8, it becomes possible to allow the user to browse the virtual viewpoint image at an arbitrary timing.

1-2. Viewpoint Setting Method of Embodiment

In the present embodiment, setting of a viewpoint Pv following an imaging object that moves as a player is performed. At this time, the imaging object of the target for following is set as "noticed imaging object" in advance. Setting of a noticed imaging object is performed by the viewpoint setting processing section 13a in the virtual viewpoint image generation section 13.

It is to be noted that, while the present example exemplifies a case in which the noticed imaging object is a person as a player, the noticed imaging object may be a person other than a player, and also it is possible to set part of regions of a person or a thing other than a person as a noticed imaging object.

As a setting method of a noticed imaging object, the following methods can be listed.

(1) On the basis of the imaging object analysis information Ia by the imaging object analysis section 12, a player holding a competition ball is set as a noticed imaging object.

(2) A player of a predetermined uniform number or of a predetermined name is set as a noticed imaging object.

(3) A player positioned in a predetermined area in a three-dimensional space is set as a noticed imaging object.

In regard to (1) above, the setting can be performed using position information of an imaging object as a play ball identified by the imaging object analysis section 12 and position information of an imaging object as a player. For example, a player positioned nearest to the position of a play ball is set as a noticed imaging object.

In regard to (2) above, a result of an identification process of a player by the imaging object analysis section 12 is used.

Here, an analysis process by the imaging object analysis section 12 including the identification process of a player is described.

The imaging object analysis section 12 detects as an imaging object of a target by the image analysis, particularly in the present example, an imaging object as a player and an imaging object as a competition ball. Along with this, the imaging object analysis section 12 allocates an identifier (hereinafter referred to as "imaging object ID") for each of the detected imaging objects.

The imaging object analysis section 12 detects, in regard to the imaging object as a player, an orientation of the imaging object. The orientation of the imaging object is detected, in the present example, as an orientation of the face of the imaging object utilizing a face detection technology.

Further, in regard to the imaging object as a player, a simple model that allows the posture of the imaging object to be grasped is generated. The simple model is a model in which, for example, as exemplified in FIG. 4, an imaging object as a player is simplified with information of detection points (black circles in FIG. 4) principally of joints and so forth and lines interconnecting the detection points.

For example, places that are displaced principally in response to the posture such as the waist, head, neck, and joint portions of the hands and legs are determined as detection points. Each detection point is connected by a line to a particular different detection point. Since the detection points that are individually interconnected by lines are defined, a simple model representing the human body by points and lines is formed.

As hereinafter described, in the present example, setting of a viewpoint Pv can be performed on the basis of detection points represented by such a simple model as described above, namely, on the basis of information representing the positions of required portions of a player.

Furthermore, the imaging object analysis section 12 performs an identification process of a player in regard to an imaging object as a player.

In the present example, the identification process of a player is performed on the basis of a result of detection of a uniform number.

Figures 4, 5:
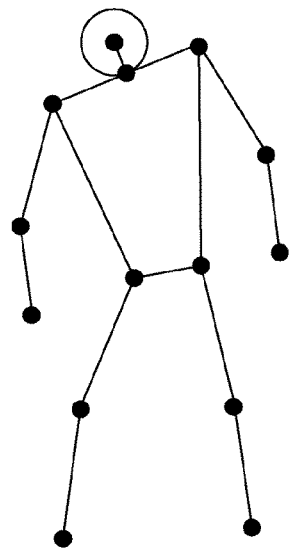
FIG. 4 is an explanatory view of a simple model of an imaging object.
FIG. 5 is a view exemplifying player attribute management information in the embodiment.

In the imaging object analysis section 12, for example, such player attribute management information Ib as depicted in FIG. 5 is stored. As depicted in FIG. 5, the player attribute management information Ib is information with which, for each player ID that is an identifier of a player, information representative of an attribute of a player such as, for example, a player name, an affiliation team, and a uniform number is associated as player attribute information.

The imaging object analysis section 12 performs an identification process of a player on the basis of such player attribute management information Ib as described above. In particular, the imaging object analysis section 12 performs decision of an affiliation team and identification of a uniform number by image analysis of an imaging object detected as a player and specifies a player ID with which the information of the affiliation name and the uniform number are associated in the player attribute management information Ib.

Here, the decision of an affiliation team can be performed on the basis of a difference or the like in color or color scheme of player's equipment such as, for example, a uniform or a cap.

It is to be noted that the identification method of a player is not limited to the method described above, but various methods are available such as to perform, for example, matching with a template in regard to physical feature information of an imaging object (for example, height, shoulder width, how to run and so forth).

FIG. 6 depicts an example of the imaging object analysis information Ia outputted from the imaging object analysis section 12 to the virtual viewpoint image generation section 13 (viewpoint setting processing section 13a).

The imaging object analysis information Ia is information with which, for each imaging object ID, information of the position of the imaging object, type of imaging object (in the present example, a player or a competition ball), orientation of the imaging object (only of a player), simple model (only of a player), and player ID specified by the identification process described above is associated.

The imaging object analysis section 12 generates and outputs such imaging object analysis information Ia as described above for each frame to the viewpoint setting processing section 13a. At this time, the imaging object analysis information Ia is outputted, for example, with a time code associated therewith to the viewpoint setting processing section 13a such that frame synchronism is established with 3D model data.

The viewpoint setting processing section 13a performs setting of a noticed imaging object as (2) described above on the basis of such imaging object analysis information Ia as just described.

In the present example, the viewpoint setting processing section 13a has stored therein player attribute management information Ib with which player attribute information is associated for each player ID similar to that depicted in FIG. 5. Further, the viewpoint setting processing section 13a specifies a player ID with which a predetermined affiliation team or uniform number in the player attribute management information Ib is associated or a player ID with which a predetermined name is associated, and sets the imaging object with which the player ID is associated in the imaging object analysis information Ia as a noticed imaging object.

In regard to (3) described above, a player who is positioned in a predetermined area in a three-dimensional space, for example, a predetermined area in the proximity of a goal or a predetermined area in the proximity of the center circle of the playing court, as a noticed imaging object. It is to be noted that, in the case where a plurality of players is positioned in a predetermined area, one noticed imaging object is set in accordance with a predetermined setting condition such as to set a player nearest to a position determined in advance as a noticed imaging object.

Here, in regard to (3), the area information is information representative of a region in a three-dimensional space.

Subsequently, a setting method of a viewpoint Pv by the viewpoint setting processing section 13a is described.

First, in the present example, it is possible to change over the "viewpoint mode" between a mode in which a "viewpoint Pv for observing a noticed imaging object" is set and another mode in which "a viewpoint Pv for observing outwardly from a noticed imaging object" is set as the "viewpoint mode."

Further, it is possible to change over the "viewpoint setting mode" between an "automatic setting mode" in which setting of a viewpoint Pv is performed automatically even if the user does not perform a setting operation for a viewpoint Pv and a "simple setting mode" in which a viewpoint Pv or a gaze direction Dv can be set freely by a simple operation by the user.

The changeover of the viewpoint mode and the viewpoint setting mode is performed in response to an operation input by the user, for example, through the inputting apparatus 6 (operation section 61).

First, examples of setting of a viewpoint Pv and a gaze direction Dv are described in regard to each of the "viewpoint Pv for observing a noticed imaging object" and the "viewpoint Pv for observing outwardly from a noticed imaging object" are described with reference to FIGS. 7 and 8.

FIG. 7 is an explanatory view of an example of setting of a viewpoint Pv and a gaze direction Dv corresponding to the "viewpoint Pv for observing a noticed imaging object." Here, two examples of setting depicted in A of FIG. 7 and B of FIG. 7 are given. It is to be noted that in FIGS. 7 and 8, reference characters of imaging objects as a noticed imaging object and a play ball are "St" and "sb," respectively.

First, in the present example, regardless of the "viewpoint Pv for observing outwardly from a noticed imaging object" and the "viewpoint Pv for observing a noticed imaging object," upon setting of a viewpoint Pv, a reference position Pr for a noticed imaging object St is set. Here, the reference position Pr is set to the physical center of the noticed imaging object St. The physical center is the center of the body of an image as a person such as, for example, the center between the shoulders, the center in the leftward and rightward direction and the upward and downward direction of the body (for example, a crossing point between an upward and downward center line and a leftward and rightward center line), the center between the feet or the like.

It is to be noted that it is an example to the last to set the reference position Pr to the physical center of an imaging object, and the reference position Pr can be set to an arbitrary position at least based on the position of an imaging object.

The example of setting of A of FIG. 7 depicts an example in which the reference position Pr is set to the center between the shoulders. The information of the shoulder positions of the noticed imaging object St can be acquired from information of a simple model of the imaging object analysis information Ia.

In the example of setting of A of FIG. 7, the viewpoint Pv is set to a position spaced by a predetermined distance in the direction of the "orientation of an imaging object" of the noticed imaging object St from the reference position Pr at the height same as that of the reference position Pr that is the center between the shoulders. Further, since the viewpoint Pv is the "viewpoint Pv for observing a noticed imaging object," the gaze direction Dv in this case is set in a direction from the viewpoint Pv toward the reference position Pr (set to a reverse direction to the direction of the "orientation of an imaging object" of the noticed imaging object St).

In the case of A of FIG. 7, the separation distance between the reference position Pr and the viewpoint Pv is set to a distance by which, for example, at least the upper body part of the noticed imaging object St is included in an angle of view in the virtual viewpoint image. For example, it is preferable to set the separation distance to a distance of approximately "40 cm." It is to be noted that this "40 cm" is based on that, in the case where an angle of view in the case where the imaging element has the APS-C size and has a focal distance of approximately 35 mm is assumed, the upper body part is included in the angle of view with a distance of approximately "24 cm."

According to the example of setting of A of FIG. 7, an image of high presence that captures the upper half part of a player while following a movement (motion) of the player during play can be provided as a virtual viewpoint image. Especially, a virtual viewpoint image suitable for analysis or investigation of a movement of a player in a competition in which a hand is used such as a basketball or the like can be provided.

The example of setting of B of FIG. 7 is an example corresponding to a case in which the noticed imaging object St has a play ball.

In the present example of setting, the viewpoint Pv is set to a position spaced by a predetermined distance in the direction of the "orientation of an imaging object" of the noticed imaging object St from the reference position Pr on a straight line interconnecting the reference position Pr set as the physical center of the noticed imaging object St and the position of the imaging object Sb as a play ball. It is to be noted here that the position of the imaging object Sb is the center position of the imaging object Sb. Also in this case, since the viewpoint is the "viewpoint Pv for observing a noticed imaging object," the gaze direction Dv is set in a direction from the viewpoint Pv toward the reference position Pr.

In the example of B of FIG. 7, the reference position Pr is set to the face center of the noticed imaging object St.

In the example of B of FIG. 7, the separation distance between the reference position Pr and the viewpoint Pv is set to a distance greater than the separation distance between the reference position Pr and the position of the imaging object Sb. For example, it is supposed that the separation distance is set at least to a distance with which the whole body of the noticed imaging object is included in the angle of view in the virtual viewpoint image, and in this case, preferably the separation distance between the reference position Pr and the viewpoint Pv is set to a distance, for example, of approximately "80 cm."

According to the example of setting of B of FIG. 7, a virtual viewpoint image of high presence that captures the facial expression of the noticed imaging object St over a play ball while following the movement of a player during playing can be provided.

FIG. 8 is an explanatory view of an example of setting of a viewpoint Pv and a gaze direction Dv corresponding to the "viewpoint Pv for observing outwardly from a noticed imaging object."

Both examples of setting of A and B of FIG. 8 are examples in which the reference position Pr is set to the physical center of the noticed imaging object St. In particular, in the example of setting of A of FIG. 8, the reference position Pr is set to the center between both shoulders of the noticed imaging object St. In this case, since the viewpoint is the "viewpoint Pv for observing outwardly from a noticed imaging object," the viewpoint Pv is set to a position same as the reference position Pr. Then, the gaze direction Dv is set to a direction of the "orientation of an imaging object" of the noticed imaging object St.

The example of setting of B of FIG. 8 is an example ready for a case in which a noticed imaging object holds a play ball.

In this case, the reference position Pr is set to the face center of the noticed imaging object St. Since the viewpoint Pv is a "viewpoint Pv for observing outwardly from a noticed imaging object," also in this case, the viewpoint Pv is set to a position same as the reference position Pr.

In the present example, the gaze direction Dv is set as a direction from the viewpoint Pv toward the position of the imaging object Sb (for example, toward the central position).

According to the example of setting of A of FIG. 8, a virtual viewpoint image suitable for analysis or research of a movement of a player in a competition in which a hand is used such as a basketball competition can be provided.

Further, according to the example of setting of B of FIG. 8, a virtual viewpoint image of high presence that depicts a situation observable from the eyes of a player during playing moment by moment. Especially, a virtual viewpoint image that depicts a behavior of a player for a competition ball in a scene in which the player passes the competition ball to a different player or in a shoot scene can be provided, and this is suitable for analysis or research of a movement of a player.

It is to be noted that, in the following description, the "viewpoint Pv for observing a noticed imaging object" is sometimes referred to simply as "inward viewpoint." Further, the "viewpoint Pv for observing outwardly from a noticed imaging object" is sometimes referred to simply as "outward viewpoint."

Now, the "automatic setting mode" and the "simple setting mode" as the "viewpoint setting mode" are described.

The automatic setting mode is a mode in which the viewpoint setting processing section 13a sets a viewpoint Pv so to speak automatically by the method, for example, described hereinabove with reference to FIG. 7 or 8.

In the case of the present example, in the automatic setting mode, the viewpoint setting processing section 13a sequentially changes over the setting method of the viewpoint Pv. In particular, in the present example, the setting method for the noticed imaging object St is sequentially changed over such that a virtual viewpoint image in which a viewpoint Pv with reference to sequentially different imaging object S is set is displayed to the user.

A of FIG. 9 depicts an image of virtual viewpoint images that are browsed by the user by changeover of the noticed imaging object St in such an automatic setting mode as just described.

In the present example, since a virtual viewpoint image generated by the virtual viewpoint image generation section 13 is displayed on the display screen of the display apparatus 7 and the display screen of the display section 62 of the inputting apparatus 6, FIG. 9 depicts an image of the virtual viewpoint image displayed on the display screens. It is to be noted that, while A of FIG. 9 exemplifies a virtual viewpoint image in a case in which the viewpoint mode is the "inward viewpoint" (viewpoint Pv for observing the noticed imaging object), similar changeover is performed also in the case of the outward viewpoint.

In the automatic setting mode in the present example, in the case where a predetermined inputting operation is performed for the inputting apparatus 6 while a virtual viewpoint image is sequentially changed over and displayed in such a manner as described above, the setting method changeover of the viewpoint Pv is stopped. In particular, in response to an operation performed for selecting an arbitrary virtual viewpoint image from among virtual viewpoint images to be changed over and displayed, the changeover of the setting method of the noticed imaging object St is stopped.

In the present example, the selection operation described above is performed as an operation for the touch panel 61a of the operation section 61. In particular, in response to a predetermined touch operation performed for the touch panel 61a such as, for example, tapping or double tapping, the setting method of a viewpoint Pv to a virtual viewpoint image displayed at the point of time (in the present example, a setting method of a noticed imaging object St) is maintained.

Here, such a behavior as described above can be rephrased as to sequentially display a plurality of virtual viewpoint images among which the setting method of a viewpoint Pv is different as candidate viewpoint images to the user and setting a viewpoint Pv on the basis of a selection operation from among the candidate viewpoint images.

It is to be noted that also it is possible to adopt, in place of such a successive displaying method of candidate viewpoint images as described above, a method of displaying a plurality of candidate viewpoint images simultaneously to a user, for example, as depicted in B of FIG. 9.

In this case, the virtual viewpoint image generation section 13 generates candidate viewpoint images, in which a viewpoint Pv is set for a noticed imaging object St by methods different from each other, in parallel. In particular, the viewpoint setting processing section 13a sets viewpoints Pv individually for a noticed imaging object St set by methods different from each other, and the rendering processing section 13b generates virtual viewpoint images based on the set viewpoints Pv in parallel. Then, the rendering processing section 13b outputs the generated virtual viewpoint images to the display apparatus 7 and the display section 62 of the inputting apparatus 6.

The display apparatus 7 and the display section 62 display the plurality of virtual viewpoint images in a predetermined region in their respective display screen images.

In this case, in the case where a predetermined touching operation for the touch panel 61a is detected, the operation section 61 of the inputting apparatus 6 transmits information of the screen image region for which the touching operation is performed to the virtual viewpoint image generation section 13.

The virtual viewpoint image generation section 13 specifies the virtual viewpoint image selected by the touching operation on the basis of the information of the screen image region, and thereafter, the viewpoint setting processing section 13a performs setting of a viewpoint Pv by the setting method of the viewpoint Pv of the specified virtual viewpoint image and the rendering processing section 13b stops the generation of a plurality of candidate viewpoint images and generates and outputs a virtual viewpoint image based on the set viewpoint Pv.

Now, the "simple setting mode" is described.

The simple setting mode of the present example is a mode in which the user can change the position of the viewpoint Pv or the gaze direction Dv by an operation on the basis of the reference position Pr of the noticed imaging object St.

Figure 10:
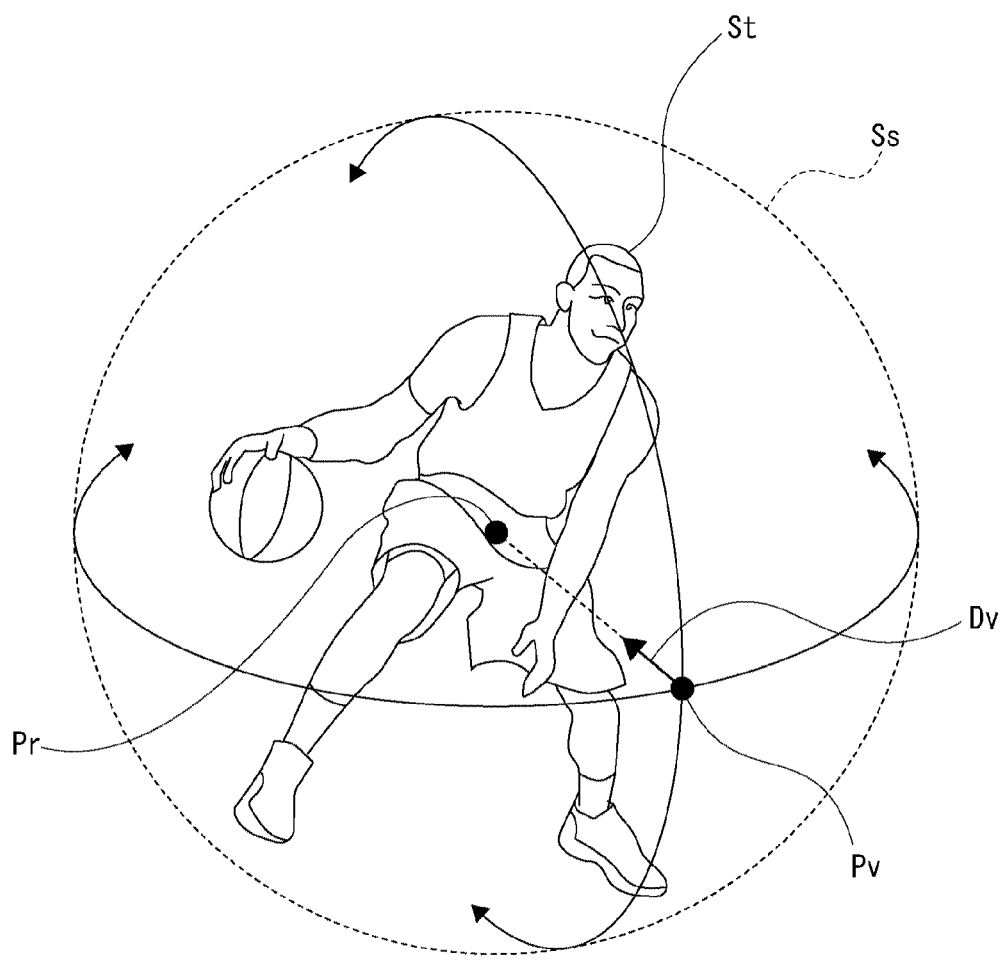
FIG. 10 is an explanatory view of a simple setting mode in the embodiment.

FIG. 10 is an explanatory view of the simple setting mode.

In the simple setting mode, in the case where the viewpoint mode is a mode of the "inward viewpoint," the viewpoint Pv is changed along a spherical surface Ss centered at the reference position Pr as depicted in FIG. 10 in response to an operation of the user. It is to be noted, since the viewpoint mode is the mode of the "inward viewpoint," the gaze direction Dv in this case is set to a direction from the viewpoint Pv toward the reference position Pr.

The changing operation of the viewpoint Pv in this case can be, for example, an operation of the touch panel 61a (for example, an operation of tracing a finger in a direction in which the viewpoint Pv is to be moved) or a multi-directional operating element such as a cross key or a joystick provided on the operation section 61.

It is to be noted that a form of the inputting apparatus 6 that uses the touch panel 61a can be implemented, for example, as such an apparatus as a tablet terminal, and since the operation section can be provided integrally with a panel for browsing virtual viewpoint images, the equipment cost for introduction can be reduced.

On the other hand, in the case where a game controller type form such as a joystick is adopted, although equipment for exclusive use for operation inputting is required, since finer inputting is possible, there is a merit that improvement of the operability can be achieved.

Although, in regard to simple setting of a viewpoint Pv ready for such a case of the "inward viewpoint" as described above, an example in which the separation distance between the reference position Pr and the viewpoint Pv (namely, the radius of the spherical surface Ss) is fixed is given, the separation distance may be made variable in response to an operation.

Further, the spherical surface Ss does not necessarily coincide at the center thereof with the reference position Pr, and it is sufficient, from the point of view of the "viewpoint for observing a noticed imaging object," if the spherical surface Ss is set as a spherical surface that at least covers the circumference of the noticed imaging object St.

In the simple setting mode, in the case where the viewpoint mode is a mode of the "outward viewpoint" (viewpoint for observing outwardly from a noticed imaging object), the viewpoint Pv and the reference position Pr are set to the same position first, and then the gaze direction Dv is changed in response to an operation. The gaze direction Dv in this case is an outward direction from the viewpoint Pv reversely from that depicted in FIG. 10.

It is to be noted that also it is possible to change, in the simple setting mode when the viewpoint mode is the mode of the "outward viewpoint," not only the gaze direction Dv but also the position of the viewpoint Pv in response to an operation.

In such a simple setting mode as described above, since the reference position Pr of the noticed imaging object St is used for setting of the viewpoint Pv, reduction of the operation burden (work burden) in setting of the viewpoint Pv can be achieved in comparison with that in an alternative case in which the user sets a viewpoint Pv at an arbitrary position in a three-dimensional space.

1-3. Processing Procedure

A procedure of particular processes for implementing the viewpoint setting method as the embodiment described above is described with reference to a flow chart of FIG. 11.

Figure 11:
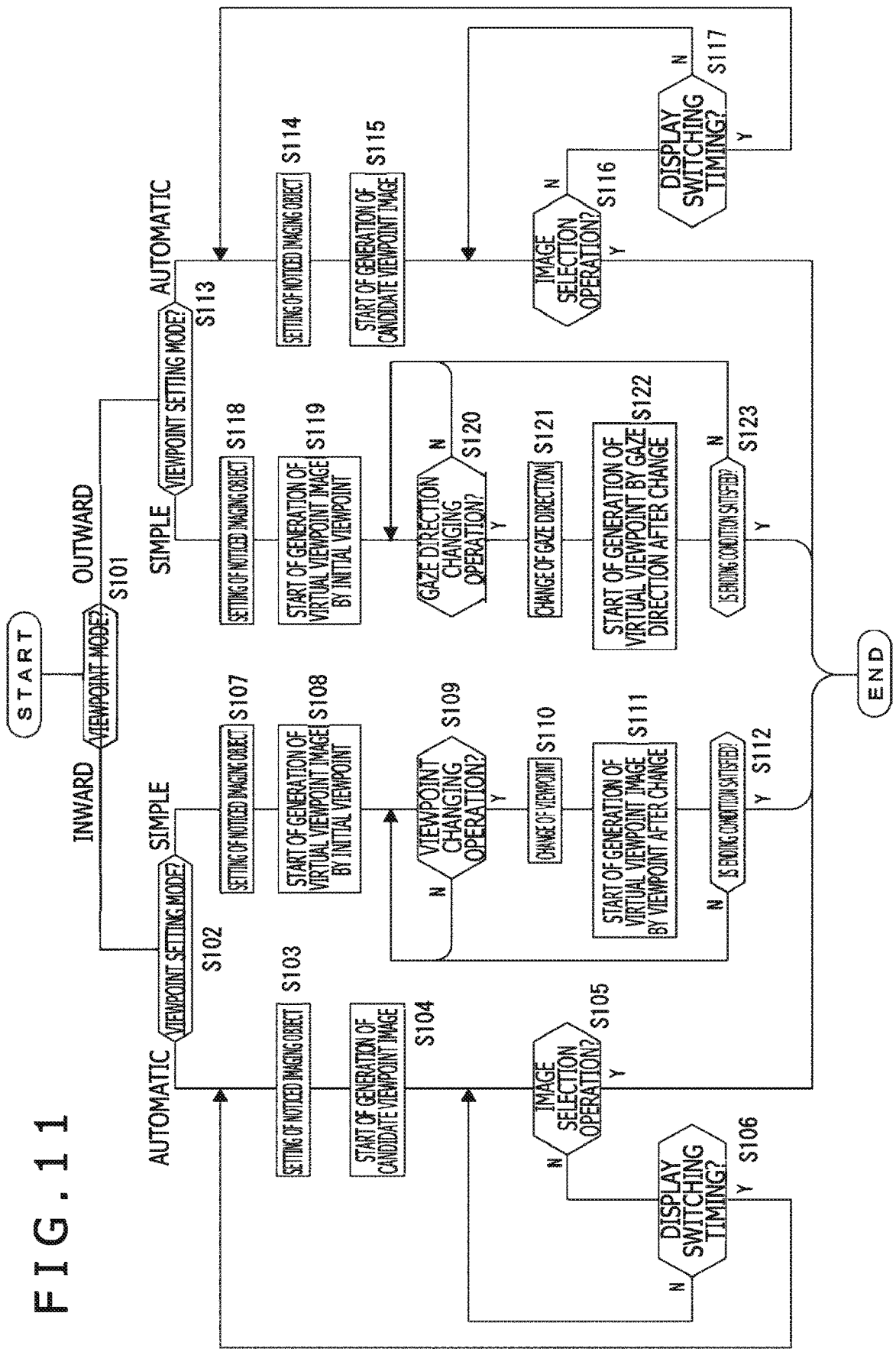
FIG. 11 is a flow chart depicting a procedure of particular processes for implementing a viewpoint setting method as the embodiment.

In the present example, the processes depicted in FIG. 11 are executed by the virtual viewpoint image generation section 13 configured from a DSP.

It is to be noted that FIG. 11 exemplifies processes corresponding to a case in which such a successive displaying method as depicted in A of FIG. 9 is adopted as a displaying method for candidate viewpoint images when the viewpoint mode is the automatic setting mode.

First at step S101, the virtual viewpoint image generation section 13 decides, as a confirmation process of a viewpoint mode, which one of the "inward viewpoint" and "outward viewpoint" modes the current viewpoint mode is, and if the current viewpoint mode is the "inward viewpoint" mode, then the processing advances to step S102, but if the current viewpoint mode is the "outward viewpoint" mode, then the processing advances to step S113 hereinafter described.

At step S102, the virtual viewpoint image generation section 13 decides, as a confirmation process of a viewpoint setting mode, which one of the "automatic setting mode" and the "simple setting mode" the current viewpoint setting mode is, and if the current viewpoint setting mode is the "automatic setting mode," then the processing advances to step S103, but if the current viewpoint mode is the "simple setting mode," then the processing advances to step S107.

At step S103, the virtual viewpoint image generation section 13 performs a setting process of a noticed imaging object St. In particular, the virtual viewpoint image generation section 13 sets a noticed imaging object St by such a method as that of (1), (2), or (3) described hereinabove. Since, in the present example, a plurality of candidate viewpoint images that is different in the setting method of a noticed imaging object St from each other are sequentially displayed in such a manner as described above, the process at step S103 performs setting of a noticed imaging object St with the method changed for every execution.

Then at step S104, the virtual viewpoint image generation section 13 starts generation of a candidate viewpoint image. In particular, the virtual viewpoint image generation section 13 performs setting of a viewpoint Pv based on such a reference position Pr of a noticed imaging object St as exemplified in FIG. 7 and setting of a gaze direction Dv in regard to the noticed imaging object St set at step S103 and starts generation of a candidate viewpoint images based on the set viewpoint Pv and gaze direction Dv.

It is to be noted that, in the case where the setting method of a viewpoint Pv exemplified in B of FIG. 7 above is adopted, it is a condition that, in the setting process at step S103, a noticed imaging object St is set by the method of (1) described hereinabove.

Further, although it is assumed that, in the present example, setting of a reference position Pr is performed by the virtual viewpoint image generation section 13, also a configuration can be taken that information of the reference position Pr set by the imaging object analysis section 12 is acquired by the virtual viewpoint image generation section 13.

As generation of a candidate viewpoint images is started at step S104, display of the candidate viewpoint images is started by the display section 62 of the inputting apparatus 6.

In response to the start of generation of a candidate viewpoint images as described above, the virtual viewpoint image generation section 13 waits for an image selection operation or coming of a display changeover timing by the processes at steps S105 and S106. In particular, the virtual viewpoint image generation section 13 waits for a predetermined operation for the touch panel 61a of the inputting apparatus 6 or for the coming of a display changeover timing of a candidate viewpoint image. It is to be noted that the display changeover of a candidate viewpoint image in the present example is performed in a fixed cycle. Therefore, the virtual viewpoint image generation section 13 decides, in response to lapse of a fixed period of time after the start of generation of a candidate viewpoint image at step S104, at step S106 that a display changeover timing comes.

In the case where it is decided at step S106 that a display switching timing comes, the virtual viewpoint image generation section 13 returns the processing to step S103. Consequently, the setting method of a noticed imaging object St is changed over, and generation of a new candidate viewpoint image based on a viewpoint Pv set targeting a different imaging object and display by the display section 62 are started.

Such changeover display of a candidate viewpoint image is repeated until an image selection operation is performed at step S105.

In the case where it is decided at step S105 that an image selection operation is performed, the virtual viewpoint image generation section 13 ends the series of processes depicted in FIG. 11.

Consequently, the noticed imaging object St remains the noticed imaging object St set by the process at step S103 having been performed latest.

Now, processes in the case where it is decided at step S102 that the current setting mode is the "simple setting mode" are described.

At step S107, the virtual viewpoint image generation section 13 performs a setting process of a noticed imaging object similarly as at step S103 and then starts generation of a virtual viewpoint image based on the initial viewpoint at subsequent step S108. The initial viewpoint is a viewpoint Pv set initially upon acceptance of a setting operation (changing operation) of the viewpoint Pv in the simple setting mode. It is sufficient if the initial viewpoint is a viewpoint Pv that is based on the reference position Pr at least set targeting the noticed imaging object St set at step S107. For example, it is sufficient if the initial viewpoint is set by the method described hereinabove with reference to A of FIG. 7 or the like. In the case where the noticed imaging object St is set by the method of (1) described hereinabove, also it is possible to set the initial viewpoint by the method described hereinabove with reference to B of FIG. 7.

In response to starting of generation of a virtual viewpoint image according to the initial viewpoint, the virtual viewpoint image generation section 13 waits for a viewpoint changing operation at step S109. In particular, the virtual viewpoint image generation section 13 waits for a predetermined operation input from the operation section 61 of the inputting apparatus 6, particularly for a predetermined operation input that indicates a changing direction of the viewpoint Pv.

In the case where a viewpoint changing operation is performed, the virtual viewpoint image generation section 13 performs change of the viewpoint Pv according to the operation as a viewpoint changing process at step S110. In particular, in the present example, the virtual viewpoint image generation section 13 changes the viewpoint Pv along the spherical surface Ss centered at the reference position Pr of the noticed imaging object St in response to the operation.

Then at step S111, the virtual viewpoint image generation section 13 starts generation of a virtual viewpoint image according to the viewpoint after the change. Consequently, the display section 62 and the display apparatus 7 change the viewpoint Pv of the virtual viewpoint image being displayed in response to the operation.

At step S112 following the step S111, the virtual viewpoint image generation section 13 decides whether or not an ending condition for processing is satisfied. As the ending condition, for example, a predetermined operation input that indicates stopping of generation of a virtual viewpoint image is available.

In the case where it is decided that the ending condition is not satisfied, the virtual viewpoint image generation section 13 returns the processing to step S109 to wait for a viewpoint changing operation. Consequently, until after the ending condition is satisfied, change of the viewpoint Pv is performed in response to a viewpoint changing operation.

In the case where it is decided at step S112 that the ending condition is satisfied, the virtual viewpoint image generation section 13 ends the series of processes depicted in FIG. 11.

Now, a case in which the viewpoint mode is the "outward viewpoint" mode is described.

As can be recognized from the foregoing description, in the "outward viewpoint" mode, a general flow of processes is similar to that in the case of the "inward viewpoint" mode described hereinabove except that, in comparison with the "inward viewpoint" mode, the viewpoint Pv is set to the reference position Pr and the gaze direction Dv is an outward direction from the viewpoint Pv.

First, at step S113, the virtual viewpoint image generation section 13 confirms the type of the viewpoint setting mode similarly as at step S102, and executes, if the viewpoint setting mode is the "automatic setting mode," processes at steps beginning with step S114 but executes, if the viewpoint setting mode is the "simple setting mode," processes at steps beginning with step S118.

The processes at steps S114 to S117 corresponding to the "automatic setting mode" are similar to the processes at steps S103 to S106 described hereinabove except that the setting methods of the viewpoint Pv and the gaze direction Dv are different as described above, and therefore, overlapping description of them is omitted.

In the simple setting mode, the virtual viewpoint image generation section 13 performs, at step S118, a setting process of a noticed imaging object similarly as at step S103 or S107 and starts, at next step S119, generation of a virtual viewpoint image based on the initial viewpoint. The process at step S119 is similar to the process at step S108 described hereinabove except that the viewpoint Pv and the gaze direction Dv are set to those corresponding to the outward viewpoint mode.

At next step S120, the virtual viewpoint image generation section 13 waits for a gaze direction changing operation. In particular, the virtual viewpoint image generation section 13 waits for a predetermined operation input from the operation section 61 of the inputting apparatus 6, in particular, for a predetermined operation input that indicates a changing direction of the gaze direction Dv.

Then, in the case where a gaze direction changing operation is performed, the virtual viewpoint image generation section 13 performs change of the gaze direction Dv at step S121 and starts generation of a virtual viewpoint image based on the gaze direction Dv after the change at step S122.

At step S123 following step S122, the virtual viewpoint image generation section 13 decides whether or not an ending condition is satisfied similarly as at step S112 described hereinabove, and returns, if the ending condition is not satisfied, to step S120 to wait for a gaze direction changing operation again, but ends the series of processes depicted in FIG. 11 if the ending condition is satisfied.

It is to be noted that the foregoing description is directed to an example in which the virtual viewpoint image generation section 13 automatically sets a noticed imaging object St, also it is possible for the noticed imaging object St to be set on the basis of an operation by the virtual viewpoint image generation section 13.

For example, the virtual viewpoint image generation section 13 can accept an input of predetermined player attribute information such as, a uniform number or a name and set an imaging object as a player specified from the inputted player attribute information as the noticed imaging object St.

Alternatively, also it is possible for the virtual viewpoint image generation section 13 to sequentially display (or simultaneously display) images in which different players are represented as candidate images on the display section 62 and set a player of a candidate image selected through an operation as the noticed imaging object St.

Furthermore, also it is possible to sequentially display (or simultaneously display) images of players in an ascending order of the distance from a position (target position) designated in a three-dimensional space by an operation of the user and set a player of a selected image as the noticed imaging object St. Alternatively, the successive display of the players at this time can be an order of a uniform number (or a name) of a player, a descending order of the distance to the position of a play ball or the like.

Further, while principally a basketball is given as an example of a play ball in the foregoing description, the play ball is not limited to a substantially spherical ball used in a basketball play, soccer, baseball or the like but broadly includes a substantially spheroidal ball used in rugby, American football or the like, a pack used in hockey, a shuttle used in badminton or the like.

Further, while the foregoing description is directed to an example in which a "viewpoint mode" based on the "outward viewpoint" or the "inward viewpoint" is provided, it is not essential to provide such a viewpoint mode as just described. In the case where a "viewpoint mode" is not provided, for example, in display of candidate viewpoint images by successive display or simultaneous display described above, also it is possible to display candidate viewpoint images based on the outward viewpoint and candidate viewpoint images based on the inward viewpoint in a mixed manner.

It is to be noted that it is not essential to generate a virtual viewpoint image for all frames of captured images by the imaging apparatus 2, and also it is possible to generate a virtual viewpoint image thinning out part of frames. At this time, setting of a viewpoint Pv may be performed for all frames or for only necessary part of frames. For example, such an example is conceivable that setting of a viewpoint Pv is performed for every frame but rendering of a virtual viewpoint image is performed only for frames at fixed intervals on the basis of information of the viewpoint Pv set to each frame.

2. Modifications

2-1. First Modification

In the following, modifications of the embodiment are described.

Figure 12:
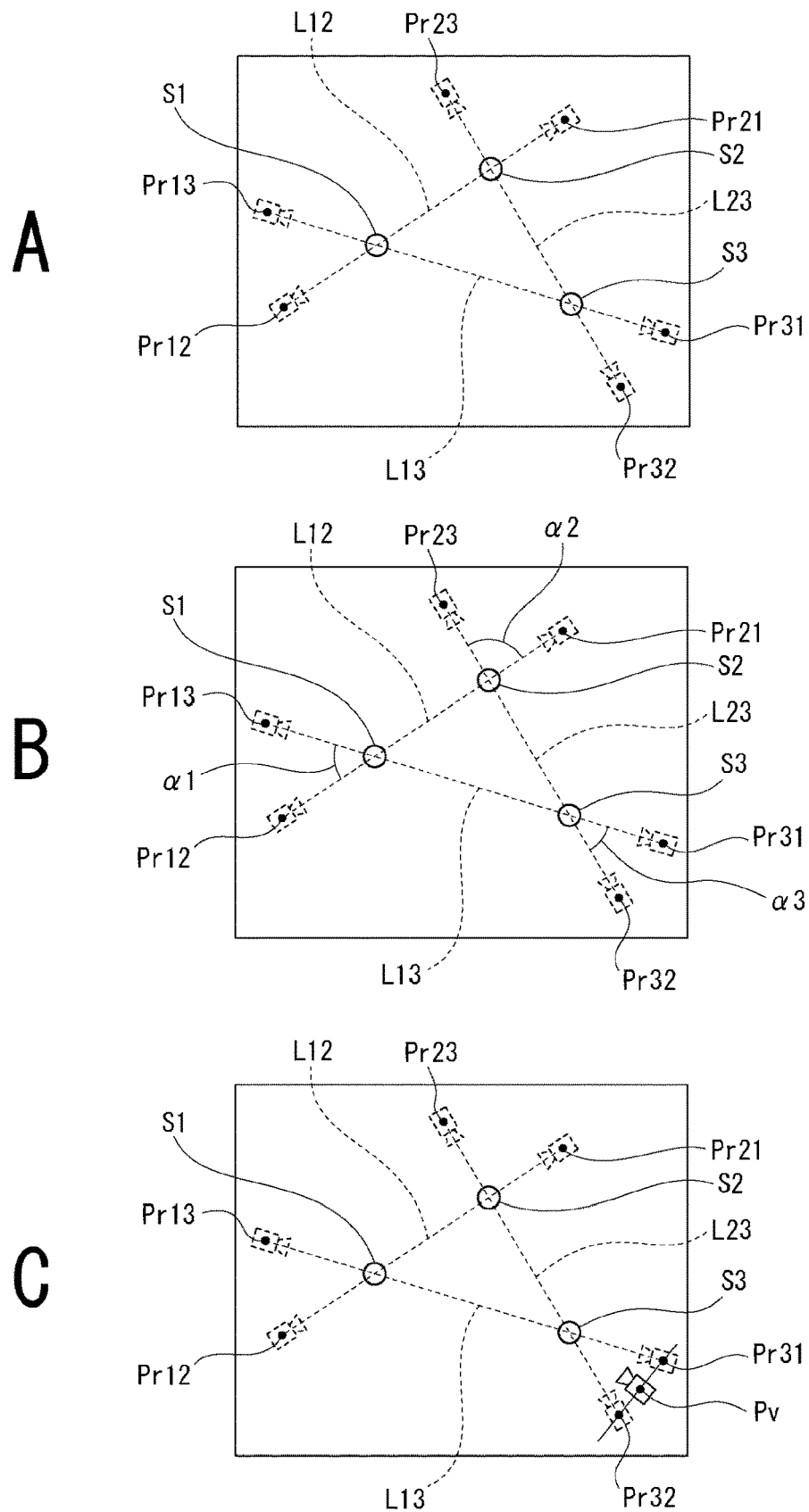
FIG. 12 is an explanatory view of an example of setting ready for a case in which an image that follows movement of a plurality of players is obtained as a virtual viewpoint image.
Figure 13:
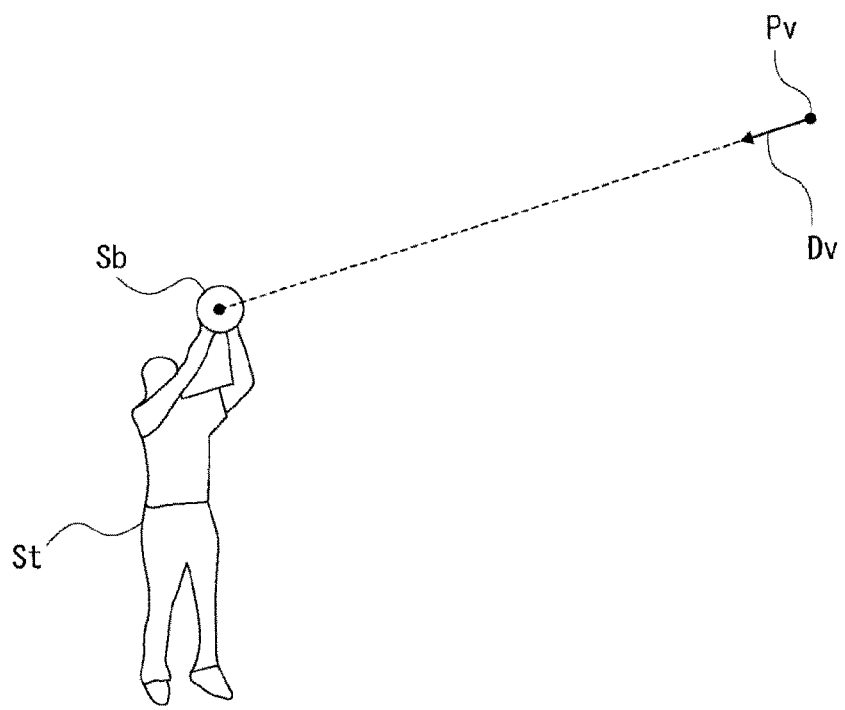
FIG. 13 is a view illustrating a modification regarding setting of a viewpoint with respect to one noticed imaging object.

The first modification is a modification relating to setting of a viewpoint Pv, and examples of such setting are depicted in FIGS. 12 and 13. The examples of setting of FIGS. 12 and 13 are examples of setting of a viewpoint Pv ready for the "inward viewpoint" mode described hereinabove.

The example of setting of FIG. 12 is an example of setting ready for a case in which an image that follows movement of a plurality of players is obtained as a virtual viewpoint image. Here, a case in which an image follows movement of three players is exemplified.

First, as depicted in A of FIG. 12, for imaging objects S1, S2, and S3 as the three players, reference positions Pr12, Pr21, Pr13, Pr31, Pr23, and Pr32 are set at positions extrapolated from the imaging objects S on straight lines L12, L13, and L23 that pass the positions of the imaging objects S. It is to be noted that this setting is performed, for example, by the virtual viewpoint image generation section 13.

As depicted in A of FIG. 12, the straight line L12 is a straight line passing the positions of the imaging objects S1 and S2; the straight line L13 is a straight line that passes the positions of the imaging objects S1 and S3; and the straight line L23 is a straight line passing the positions of the imaging objects S2 and S3.

The reference position Pr12 is positioned on the interior side of the imaging object S1 as viewed from the midpoint between the imaging object S1 and the imaging object S2 on the straight line L12. The reference position Pr21 is positioned on the interior side of the imaging object S2 as viewed from the midpoint between the imaging object S1 and the imaging object S2 on the straight line L12.

The reference position Pr13 is positioned on the interior side of the imaging object S1 as viewed from the midpoint between the imaging object S1 and the imaging object S3 on the straight line L13, and the reference position Pr31 is positioned on the interior side of the imaging object S3 as viewed from the midpoint between the imaging object S1 and the imaging object S3 on the straight line L13.

Meanwhile, the reference position Pr23 is positioned on the interior side of the imaging object S2 as viewed from the midpoint between the imaging object S2 and the imaging object S3 on the straight line L23, and the reference position Pr32 is positioned on the inner side of the imaging object S3 as viewed from the midpoint between the imaging object S2 and the imaging object S3 on the straight line L23.

After such reference positions Pr as described above are set, the virtual viewpoint image generation section 13 determines angles $\alpha 1$, $\alpha 2$, and $\alpha 3$ defined by the straight lines L including the straight lines L12, L13, and L23 as depicted in B of FIG. 12. In particular, the virtual viewpoint image generation section 13 determines the angle $\alpha 1$ that is an angle defined by the straight line L12 and the straight line L13; determines the angle $\alpha 2$ that is an angle defined by the straight line L12 and the straight line L23; and determines the angle $\alpha 3$ that is an angle defined by the straight line L13 and the straight line L23.

Then, the virtual viewpoint image generation section 13 specifies a minimum angle from among the angles $\alpha 1$, $\alpha 2$, and $\alpha 3$ and specifies a set of the straight lines L that defines the minimum angle. In short, in the example of A of FIG. 12, the set of the straight line L13 and the straight line L23 is specified.

Further, the virtual viewpoint image generation section 13 specifies, from among the totaling four reference positions Pr set on the two straight lines L that define the minimum angle as described above, two reference positions Pr on the nearer sides to the crossing point of the straight lines L. In short, in the example depicted, from among the reference positions Pr13 and Pr31 set on the straight line L13 and the reference positions Pr23 and Pr32 set on the straight line L23, the reference positions Pr31 and Pr32 nearer to the cross point of the straight line L13 and the straight line L23 (in short, the position of the imaging object S3) are specified.

Then, the virtual viewpoint image generation section 13 sets the midpoint between the two reference positions Pr specified in such a manner as a viewpoint Pv (C of FIG. 12). At this time, the gaze direction Dv is set to a direction from the viewpoint Pv to the position of the nearest imaging object (in the example depicted, the imaging object S3).

It is to be noted that, although the foregoing description is directed to an example in which a viewpoint Pv is set after two reference positions Pr are set on all straight lines L, it is sufficient if only two reference positions Pr that are used directly for setting of a viewpoint Pv (in the example of FIG. 12, the reference positions Pr31 and Pr32).

By setting such a viewpoint Pv as described above, as the virtual viewpoint image, an image can be provided which represents a plurality of imaging objects at a central portion as far as possible in a picture frame. In other words, a virtual viewpoint image can be provided in which a plurality of imaging objects can be simultaneously observed easily.

It is to be noted that, also in the case where four or more persons are to be followed up, a viewpoint Pv can be set in a similar manner as in the method described above.

Further, in the case where two players are to be followed, it is conceivable to adopt such a method that, for example, a viewpoint Pv is set on a straight line that defines a predetermined angle with respect to a straight line that passes two imaging objects as the players.

Here, the setting method of a viewpoint Pv described hereinabove with reference to FIG. 12 is suitable for a case in which, for example, in the case where the method of (3) describe hereinabove is adopted as the setting method of a noticed imaging object St, three or more players positioned in a predetermined area are detected or a like case.

FIG. 13 is a view illustrating a modification regarding setting of a viewpoint Pv to one noticed imaging object St.

In particular, the modification of FIG. 13 is an example of setting of a viewpoint Pv to a noticed imaging object St who holds a play ball, and the virtual viewpoint image generation section 13 in this case sets a viewpoint Pv to a position of an arriving destination of the play ball, for example, to a position of a goal and sets a gaze direction Dv to a direction of the position of the imaging object Sb as the play ball from the viewpoint Pv.

It is to be noted that it is sufficient if the position of the goal is analyzed, for example, by the imaging object analysis section 12 and the virtual viewpoint image generation section 13 acquires a result of the analysis. As an alternative, also it is possible to store information of the position of the goal in the virtual viewpoint image generation section 13 in advance.

2-2. Second Modification

The second modification sets the gaze direction Dv when the viewpoint is the "outward viewpoint" on the basis of analysis information regarding the orientation of an imaging object.

Here, in the following description, the "outward viewpoint," namely, a viewpoint for observing outwardly from an imaging object, is referred to also as "first-person viewpoint."

When a virtual viewpoint image by a first-person viewpoint is generated, it is desirable to reproduce visual information being viewed by a person as a noticed imaging object St, namely, to reproduce a field of view of the noticed imaging object St. Therefore, in the second modification, a gaze direction Dv of a virtual viewpoint image by a first-person viewpoint is set on the basis of analysis information of an orientation of the noticed imaging object St.

FIG. 14 is an explanatory view of a setting method of a gaze direction Dv in the second modification.

First, as a premise, in the present example, information of the orientation of the face and the posture is used as analysis information relating to the orientation of the noticed imaging object St. The imaging object analysis section 12 in the present example performs estimation of the orientation of the face and the posture of an imaging object as a person on the basis of 3D model data generated by the 3D model generation section 11.

The orientation of the face is a direction in which the face of the imaging object faces and is estimated, for example, on the basis of information of the positions of the parts of the face of the imaging object such as the eyes, nose, and mouth. It is to be noted that various methods have been proposed for a particular estimation method of the orientation of the face and the estimation method is not restrictive.

As the posture, the simple model of an imaging object described hereinabove (refer to FIG. 4) is applicable. As hereinafter described, in the present example, the orientation of the body of a noticed imaging object St is estimated from such a simple model as just described.

Here, analysis information relating to the orientation of an imaging object such as the orientation of the face and the posture can suffer from missing of data by some reason such as an influence of imaging equipment such as, for example, an imaging apparatus 2 or an arithmetic processing capacity of the imaging object analysis section 12, and it is not guaranteed that it can be acquired normally.

Therefore, in the present example, a setting method of a gaze direction Dv in regard to a virtual viewpoint image by a first-person viewpoint is selected in response to an acquisition situation of analysis information relating to the orientation of the noticed imaging object St.

In particular, as depicted in FIG. 14, acquisition situations are roughly divided into a situation in which none of the direction of the face and the posture of the noticed imaging object St have been acquired, another situation in which only the direction of the face has been acquired, and in a further situation in which both the orientation of the face and the posture have been acquired. Thus, in the present example, in regard to each of the cases, case separation according to the state of the noticed imaging object St, in particular, case classification into stop (initial state), stop (steady state), and movement, is performed, and setting of a gaze direction Dv is performed by a method corresponding to each case.

Here, in regard to the stop (initial state), the initial state signifies a start timing of a virtual viewpoint image (moving image) to which a viewpoint Pv as a first-person viewpoint is set for a noticed imaging object St. In other words, the stop (initial state) signifies that the noticed imaging object St is out of action in the initial state.

The stop (steady state) signifies a state in which the noticed imaging object St is out of action in any state other than the initial state described above.

It is to be noted that it is a premise that, in the present example, information of the position of the noticed imaging object St can be acquired normally.

First, a case in which none of the orientation of the face and the posture have been acquired is described.

In a state in which none of the orientation of the face and the posture have been acquired, when the noticed imaging object St is in the stop (initial state) state, the gaze direction Dv is set to a direction determined in advance. In particular, the gaze direction Dv in this case is set to a direction determined in advance in accordance with a type of a content. For example, in the case where the imaging object is a competition player and the type of the content is a goal competition such as soccer or basketball, the direction determined in advance is a direction toward the goal of the opponent (direction of the goal that is an own score source). On the other hand, in the case where the content is a court competition such as tennis or badminton, the direction determined in advance is a direction toward the opponent's court side as viewed from the own court side. Further, in the case of a scene in which the noticed imaging object St is walking a passage, the direction determined in advance is a direction toward the exit of the passage.

Then, in the case where none of the direction of the face and the posture have been acquired, when the noticed imaging object St is in a moving state, the gaze direction Dv is set to the advancing direction of the noticed imaging object St. The advancing direction of the noticed imaging object St is determined as a changing direction of the position of the noticed imaging object St.

It is to be noted that the advancing direction described above signifies a direction in which the position of the noticed imaging object St changes, and not analysis information relating to the orientation of the noticed imaging object St but analysis information relating to the position is applied to the advancing direction.

Furthermore, in the case where none of the orientation of the face and the posture have been acquired, when the noticed imaging object St is in a stop (steady state) state, the gaze direction Dv keeps a result immediately before then. In particular, when the noticed imaging object St has transited from the stop (initial state) state to the stop (steady state) state, the gaze direction Dv keeps the "orientation determined in advance" described hereinabove, but when the noticed imaging object St has transited from the moving state to the stop (steady state) state, the gaze direction Dv keeps the advancing direction till then.

It is to be noted that, when the stop (steady state) state continues for a predetermined period of time or more, the gaze direction Dv may be changed to the "direction determined in advance."

Now, a case in which only the orientation of the face has been acquired from between the orientation of the face and the posture is described.

In the state in which only the orientation of the face has been acquired, when the noticed imaging object St is in an stopping state, namely, in a stopping state irrespective of the initial state or the steady state, the gaze direction Dv is a direction estimated from the orientation of the face. In particular, the gaze direction Dv at this time is a representative value of the orientation of the face within a specific period including processing target time.

Here, the "processing target time" signifies, in the present example, a frame that is a processing target, and the specific period including the processing target time signifies a period of a plurality of frames including the frame of the processing target. In the present example, the specific period including the processing target time is a period including not only a period on the past side from the processing target time but also a period on the future side from the processing target time.

As the representative value of the orientation of the face, for example, an average value of the orientation of the face during the specific period described above. In particular, for example, if the specific period described above is a period of totaling seven frames including three frames in the past and three frames in the future with reference to the frame of the processing target, the average value of the orientation of the face is an average value of values of the orientation of the face obtained from the seven frames.

As an alternative, also it is possible to use, as the representative value of the orientation of the face, a median of the orientation of the face within the specific period described above. Here, the median signifies a value that is positioned in the middle when a finite number of data are arranged in an ascending order. For example, when the specific period is the periods by the seven frames described above and the time of the frames is represented by time [t−3], [t−2], [t−1], [t], [t+1], [t+2], and [t+3] from the past toward the future, if it is assumed that the values of the orientation of the face at the time are "5," "7," "6," "10," "5," "9," and "8," the median of the orientation of the face is the value of the center when the values are arranged in an ascending order, namely, "7" that is a value positioned in the middle of "5," "5," "6," "7," "8," "9," and "10." It is to be noted that, in the case where the finite number of data is an odd number and two values are positioned at the center, the median is an average value of the two values.

Further, in the case where only the orientation of the face has been acquired from between the orientation of the face and the posture, when the noticed imaging object St is in a moving state, the gaze direction Dv is a direction that is based on the advancing direction and the advancing speed, the orientation of the face, and the changing rate of the orientation of the face.

In particular, the gaze direction Dv when the noticed imaging object St is in a moving state is set in such a manner as depicted in FIG. 15.

First, in regard to the advancing speed of the noticed imaging object St and the changing rate of the orientation of the face, case classification into totaling four cases depending upon combinations of "high" and "low" of them is performed. Then, for each of the four cases, case classification into two cases including a case in which the advancing direction of the noticed imaging object St and the orientation of the face are same as each other and another case in which they are different from each other. Consequently, totaling eight cases are considered.

Here, the advancing speed of the noticed imaging object St is determined using, for example, km/h (hour) as a unit, and the changing rate of the orientation of the face is determined using, for example, deg/s (second) as a unit. Then, a threshold value THs for the advancing direction and a threshold value THf for the changing rate of the orientation of the face are determined in advance, and "high" and "low" of the speed and the rate are decided on the basis of results of comparison in magnitude with the threshold value THs and threshold value THf. For example, if the advancing speed or the changing rate of the orientation of the face is lower than the threshold value THs or the threshold value THf, then a decision result of "low" is obtained, but if the advancing speed or the changing rate of the orientation of the face is equal to or higher than the threshold value THs or the threshold value THf, then a decision result of "high" is obtained.

As a criterion for "low" of the advancing speed, for example, approximately 5 km/h that is an average walking speed can be proposed, and as a criterion for "high" of the advancing speed, for example, 12 km/h that approximately is a speed of jogging can be proposed.

Further, in regard to the changing rate of the orientation of the face, as a criterion for "low," for example, approximately 50 deg/s can be proposed, and as a criterion for "high," for example, approximately 90 deg/s can be proposed.

It is to be noted that also it is possible to make the threshold value THs and the threshold value THf variable, for example, in response to the type of the content or the like.

Further, "same" and "different" of the advancing direction and the orientation of the face are decided using a representative value (representative value within a specific period) of them.

As depicted in FIG. 15, in the present example, in the case where both the advancing speed and the changing rate of the orientation of the face are "low," when the advancing direction and the orientation of the face are same as each other, the gaze direction Dv is set to the advancing direction, but when the advancing direction and the orientation of the face are different from each other in the case described above, the gaze direction Dv is set to a representative value of the orientation of the face.

On the other hand, in the case where the advancing speed is "low" and the changing rate of the orientation of the face is "high," when the advancing direction and the orientation of the face are same as each other, the gaze direction Dv is set to the advancing direction, but when the advancing direction and the orientation of the face are different from each other in the case described above, the gaze direction Dv is set to a representative value of the orientation of the face.

In particular, when the advancing speed is "low," if the advancing direction and the orientation of the face are same each other, then irrespective of the changing rate of the orientation of the face, the gaze direction Dv is set to the advancing direction, but if the advancing direction and the orientation of the face are different from each other, then the gaze direction Dv is set to a representative value of the orientation of the face.

Then, in the case where the advancing speed is "high" and the changing rate of the orientation of the face is "low," when the advancing direction and the orientation of the face are same as each other, the gaze direction Dv is set to the advancing direction, but when the advancing direction and the orientation of the face are different from each other in the case described above, the gaze direction Dv is set to a representative value of the orientation of the face.

Further, in the case where both the advancing speed and the changing rate of the orientation of the face are "high," the gaze direction Dv is set to the advancing direction irrespective of whether or not the advancing direction and the orientation of the face are same as each other.

In particular, in the situation in which the advancing speed is "high," if the changing rate of the orientation of the face is low, the gaze direction Dv is set following the orientation of the face, but if the changing rate of the orientation of the face is high, then the gaze direction Dv is set to the advancing direction without following the orientation of the face. Consequently, prevention of such a situation that the display substance of a virtual viewpoint image changes rapidly is achieved, and moderation of the discomfort or the fatigue (for example, the fatigue of the eyes or the like) of the user whose observes the virtual viewpoint image can be achieved.

Now, a setting method of a gaze direction Dv in the case where both the orientation of the face and the posture have been acquired is described with reference to FIG. 14.

In the case just described, when the noticed imaging object St is in a stop state (also in this case, irrespective of the initial state and the steady state), the gaze direction Dv is set to a direction estimated from the posture.

On the other hand, if the noticed imaging object St is in a moving state, then the gaze direction Dv is set to a direction based on the orientation estimated from the posture, the changing rate of the direction and the advancing direction.

In the present example, as the estimation to be estimated from the posture of the noticed imaging object St, the orientation of the body of the noticed imaging object St is estimated.

Figure 16:
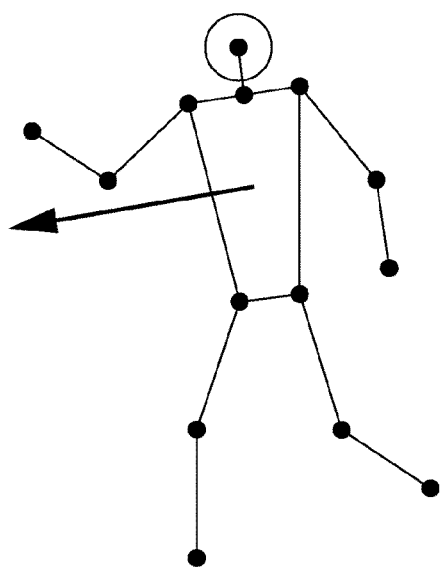
FIG. 16 is an explanatory view of a body orientation of an imaging object.

This orientation of the body is estimated from a simple model of the noticed imaging object St obtained by the imaging object analysis section 12 and particularly is determined as a normal direction to the body part (for example, a quadrangle) of the simple model as depicted in FIG. 16. Here, although two directions having a relationship reverse to each other are available as the normal direction, as the direction of the body, the direction on the side on which the nose of the noticed imaging object St exists from between the two normal directions is selected. In other words, the orientation of the body can be rephrased as the orientation of the front of the noticed imaging object St.

Here, in the present example, a simple model of the noticed imaging object St is generated using information of the orientation of the face of the noticed imaging object St. In other words, the simple model is generated in the case where information of the orientation of the face is available.

To this end, for an acquisition situation of analysis information relating to the orientation of the noticed imaging object St, such case classification as depicted in FIG. 14 is performed.

FIG. 17 is an explanatory view of a setting method of a gaze direction Dv in the case where both the orientation of the face and the posture can be acquired and the noticed imaging object St is in a moving state.

As depicted in FIG. 17, in such a case as just described, case classification depending upon "high" and "low" of the changing rate of the orientation of the body is performed and, in regard to the case where the changing rate of the orientation of the body is "high," case classification is performed depending upon whether the advancing direction and the orientation of the body are "same" or "different."

The advancing rate of the orientation of the body is determined using, for example, deg/s as a unit. The decision of "low" or "high" of the changing rate of the orientation of the body is performed on the basis of a result of comparison with a threshold value THb determined in advance for the changing rate. For example, if the changing rate is lower than the threshold value THb, then a result of decision of "low" is obtained, but if the changing rate is equal to or higher than the threshold value THb, then a result of decision of "high" is obtained.

In regard to the orientation of the body, since, in comparison with the orientation of the face described hereinabove, a higher speed rotation becomes possible by addition of a turning speed by the lower limbs or the trunk, it is conceivable to set, taking the point just described into consideration, the threshold value THb to a higher value than the threshold value THE described hereinabove.

It is to be noted that also it is possible to make the threshold value THb variable in response to a type of a content or the like.

Further, in the decision of "same" or "different" between the advancing direction and the orientation of the body, for both the advancing direction and the orientation of the body, a representative value within a specific period is used.

In setting of a gaze direction Dv for each of the cases described above, first, in regard to the case in which the changing rate of the orientation of the body is "low," the gaze direction Dv is set to a representative value of the orientation of the body.

On the other hand, in the case where the changing rate of the orientation of the body is "high," where the advancing direction and the orientation of the body are "same," the gaze direction Dv is set to a representative value of the orientation of the body, but where the advancing direction and the orientation of the body are "different," the gaze direction Dv is set to the advancing direction.

In such a manner, also in regard to the orientation of the body, in the case where the changing rate is "high," the gaze direction Dv is set so as not to follow the change of the orientation.

A procedure of particular processes to be performed in order to implement the setting of a gaze direction Dv described hereinabove is described with reference to a flow chart of FIG. 18.

Figure 18:
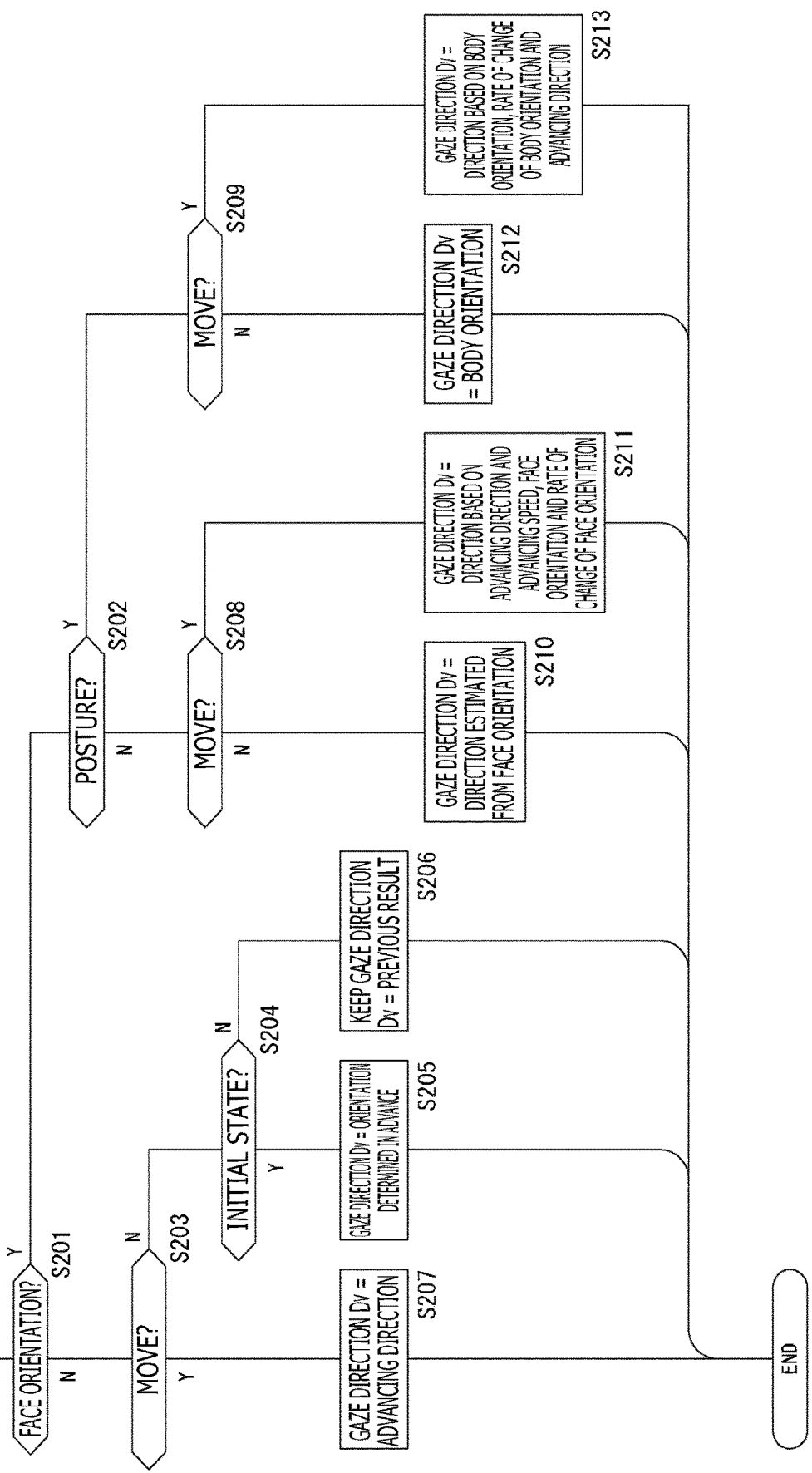
FIG. 18 is a flow chart depicting a procedure of particular processes to be performed in order to implement setting of a gaze direction as the second modification.

It is to be noted that, in the present example, the execution subject of the processes depicted in FIG. 18 is the virtual viewpoint image generation section 13.

First, the virtual viewpoint image generation section 13 decides at step S201 whether or not the orientation of the face has been acquired. In particular, the virtual viewpoint image generation section 13 decides whether or not information of the orientation of the face of the noticed imaging object St has been acquired from the imaging object analysis section 12.

If the orientation of the face has been acquired, then the virtual viewpoint image generation section 13 advances the processing to step S202, at which it decides whether or not information of the posture has been acquired, namely, whether or not information of a simple model of the noticed imaging object St has been acquired from the imaging object analysis section 12.

By the processes at steps S201 and S202, which case from among a case in which none of the orientation of the face and the posture as analysis information relating to the orientation of the noticed imaging object St have been acquired, another case in which only the orientation of the face has been acquired and a further case in which both the orientation of the face and the posture have been acquired is applicable to the analysis information relating to the orientation of the noticed imaging object St.

In the case where it is decided at step S201 that the orientation of the face has not been acquired, namely, in the case where none of the orientation of the face and the posture have been acquired, the virtual viewpoint image generation section 13 advances the processing to step S203, at which it decides whether or not the noticed imaging object St is in a moving state. Then, in the case where it is decided that the noticed imaging object St is not in a moving state, the virtual viewpoint image generation section 13 advances the processing to step S204, at which it decides whether or not the noticed imaging object St is in an initial state.

By the processes at steps S203 and S204, it is decided which state from among the stop (initial state) state, stop (steady state) state and moving state the state of the noticed imaging object St is applicable.

It is to be noted that the decision regarding move/stop of the noticed imaging object St is performed on the basis of information of the position of the noticed imaging object St obtained by the imaging object analysis section 12.

In the case where it is decided at step S204 that the noticed imaging object St is in an initial state (in short, in the case of the stop (initial state) state), the virtual viewpoint image generation section 13 advances the processing to step S205, at which it sets the gaze direction Dv to the direction determined in advance, whereafter it ends the processes depicted in FIG. 18. It is to be noted that the "direction determined in advance" is described hereinabove, and therefore, overlapping description of the same is omitted.

On the other hand, in the case where it is decided at step S204 that the noticed imaging object St is not in an initial state, the virtual viewpoint image generation section 13 advances the processing to step S206, at which it performs a process for keeping an immediately preceding result as the gaze direction Dv, whereafter it ends the processes depicted in FIG. 18.

On the other hand, in the case where it is decided at step S203 described hereinabove that the noticed imaging object St is in an moving state, the virtual viewpoint image generation section 13 advances the processing to step S207, at which it sets the gaze direction Dv to the advancing direction of the noticed imaging object St, whereafter it ends the processes depicted in FIG. 18.

It is to be noted that, when the gaze direction Dv is set to the advancing direction, also it is possible to use, as the advancing direction, a representative value within the particular period.

Further, in the case where it is decided at step S202 described hereinabove that the posture of the noticed imaging object St has not been acquired, namely, in the case where only the orientation of the face has been acquired, the virtual viewpoint image generation section 13 advances the processing to step S208, at which it decides whether or not the noticed imaging object St is in a moving state.

If the noticed imaging object St is not in a moving state, then the virtual viewpoint image generation section 13 advances the processing to step S210, at which it performs a process for setting the gaze direction Dv to a direction estimated from the orientation of the face, namely, a process for setting the gaze direction Dv to a representative value within the specific period of the orientation of the face, whereafter it ends the processes depicted in FIG. 18.

On the other hand, in the case where it is decided at step S208 that the noticed imaging object St is in a moving state, the virtual viewpoint image generation section 13 advances the processing to step S211, at which it performs a process for setting the gaze direction Dv to a direction based on the advancing direction and the advancing speed of the noticed imaging object St, the orientation of the face, and the changing rate of the orientation of the face, and then ends the processes depicted in FIG. 18.

It is to be noted that, since a particular setting method of a direction based on the advancing direction and the advancing speed of the noticed imaging object St, the orientation of the face, and the changing rate of the orientation of the face has been described with reference to FIG. 14, overlapping description of the same is avoided.

Then, in the case where it is decided at step S202 that the posture has been acquired (in the case where body of the orientation of the face and the posture have been acquired), the virtual viewpoint image generation section 13 advances the processing to step S209, at which it decides whether or not the noticed imaging object St is in a moving state.

If the noticed imaging object St is not in a moving state, then the virtual viewpoint image generation section 13 advances the processing to step S212, at which it performs a process for setting the gaze direction Dv to the orientation of the body, namely, for setting the gaze direction Dv to a representative value within the specific period of the orientation of the body, and ends the processes depicted in FIG. 18.

On the other hand, in the case where it is decided at step S209 that the noticed imaging object St is in a moving state, the virtual viewpoint image generation section 13 advances the processing to step S213, at which it sets the gaze direction Dv to a direction based on an orientation of the body of the noticed imaging object St, the changing rate of the orientation of the body, and the advancing direction, and ends the processes depicted in FIG. 18.

It is to be noted that the particular setting method of the direction based on the advancing direction and the advancing speed of the noticed imaging object St, the orientation of the body, and the changing rate of the orientation of the body is a method similar to the method described hereinabove with reference to FIG. 17, and overlapping description of the same is avoided.

As described above, in the second modification, the virtual viewpoint image generation section 13 selects a setting method of a gaze direction Dv from a first-person viewpoint on the basis of an acquisition situation of analysis information relating to the orientation of the noticed imaging object St.

This makes it possible to perform setting of an appropriate gaze direction Dv according to an acquisition situation of analysis information relating to the orientation of an imaging object such as, for example, the orientation of the face, the orientation of the body and so forth of the noticed imaging object St.

Accordingly, an image from an appropriate gaze direction Dv can be provided as a virtual viewpoint image of a first-person viewpoint.

2-3. Third Modification

The third modification notifies a user of information according to displacement between a gaze direction Dv of a virtual viewpoint image and a direction of a gaze of an imaging object.

Figure 19:
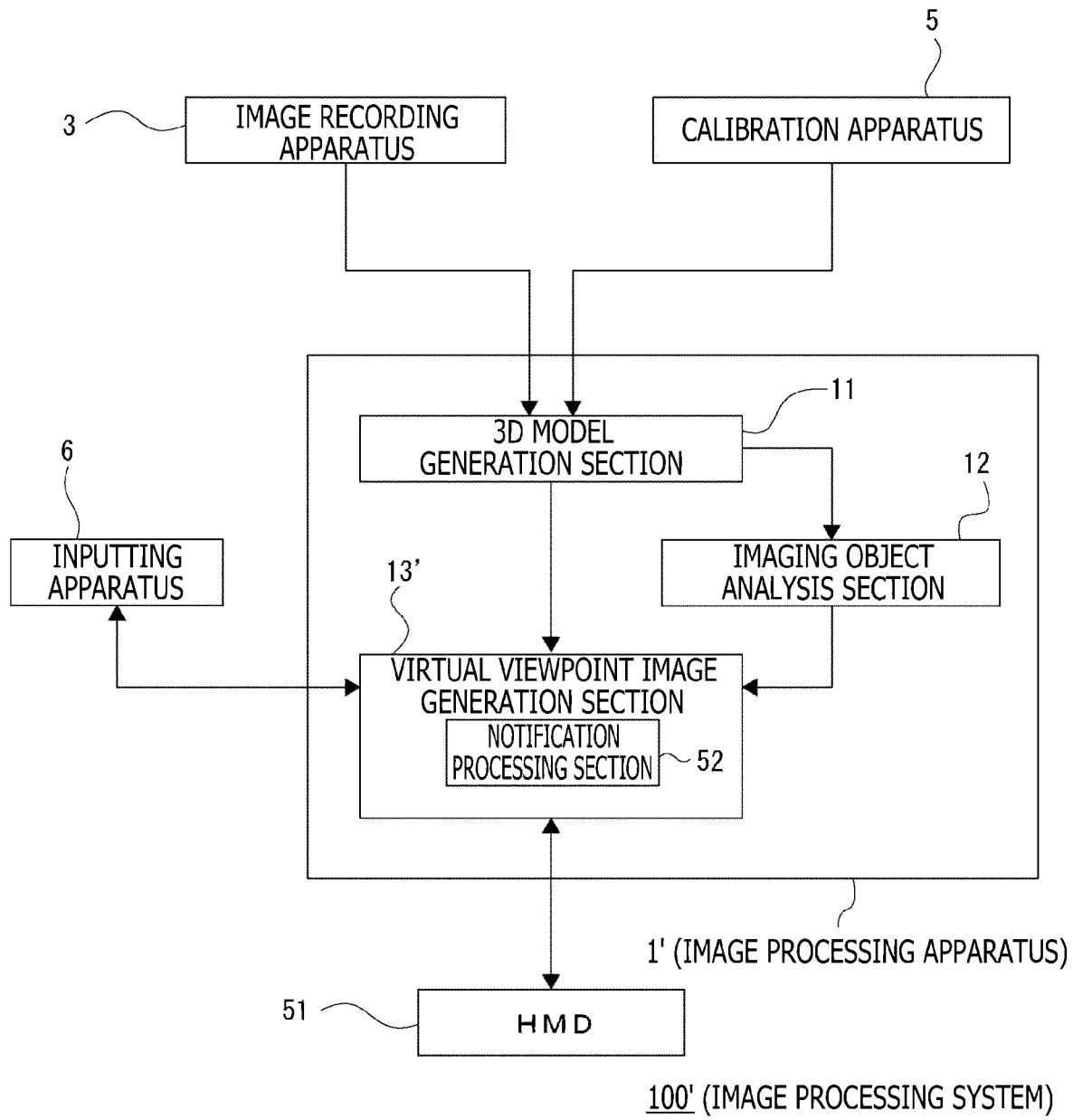
FIG. 19 is an explanatory view of a configuration of an image processing system as a third modification.

FIG. 19 is an explanatory view of a configuration of an image processing system 100' as the third modification.

The difference of the image processing system 100' from the image processing system 100 depicted in FIG. 1 is that it includes an image processing apparatus 1' in place of the image processing apparatus 1 and that it includes an HMD (head-mounted display) 51 in place of the display apparatus 7.

It is to be noted that, though not depicted, also the image processing system 100' depicted in FIG. 19 includes a plurality of imaging apparatuses 2 and a parameter recording apparatus 4 similar to the image processing system 100 depicted in FIG. 1. Further, also in the image processing system 100', the image recording apparatus 8 depicted in FIG. 1 may be provided.

The image processing apparatus 1' is different in comparison with the image processing apparatus 1 in that it includes a virtual viewpoint image generation section 13' in place of the virtual viewpoint image generation section 13. The virtual viewpoint image generation section 13' includes a notification processing section 52 that performs setting of a gaze direction Dv from a first-person viewpoint described hereinabove in connection with the second modification and performs notification of information according to a displacement between the gaze direction Dv and the orientation of a gaze to the imaging object to the user.

In the image processing system 100', a virtual viewpoint image according to a first-person viewpoint generated by the virtual viewpoint image generation section 13' is presented to a user who wears the HMD 51.

The image processing system 100' of the present example has a function of changing the gaze direction Dv of a virtual viewpoint image displayed on the screen of the HMD 51 in response to a movement (turning motion) of the head of the user on which the HMD 51 is mounted. To this end, a motion detection device such as, for example, a gyro sensor for detecting a movement of the head of the user is incorporated in the HMD 51. The virtual viewpoint image generation section 13' is configured to change the gaze direction Dv of a virtual viewpoint image to be outputted to the HMD 51 on the basis of a detection signal of the motion detection device of the HMD 51.

Here, in the case where a virtual viewpoint image according to a first-person viewpoint is displayed on the HMD 51, it is conceivable to set the gaze direction Dv of the virtual viewpoint image to such a direction based on the orientation of the body or the orientation of the face of the noticed imaging object St as described hereinabove in connection with the second modification.

However, it is not necessarily considered that the orientation of the body or the orientation of the face of the noticed imaging object St coincides with the direction of the gaze of the noticed imaging object St, and in the case where the orientation of the body or the orientation of the face and the direction of the gaze do not coincide with each other, an image that appropriately reproduces the field of view of the noticed imaging object St cannot be provided as a virtual viewpoint image to be displayed to the user.

A particular example is depicted in FIG. 20.

First, in the following description, in order to prevent confusion between the gaze direction Dv of a virtual viewpoint image and the direction of the gaze of the noticed imaging object St, the direction of the gaze of the noticed imaging object St is referred to as "orientation Drv of the gaze."

Note that it is confirmed that the gaze direction Dv is one of factors that determine the field of view of a virtual viewpoint image and is a parameter for defining a direction from the viewpoint Pv to be used for observation to form a virtual viewpoint image. In this sense, the "gaze direction Dv" is sometimes referred to as "observation direction" of a virtual viewpoint image.

In FIG. 20, a user wearing the HMD 51 mounted thereon and a noticed imaging object St are depicted in contrast.

The user wearing the HMD 51 mounted thereon is less likely to always turn the head to the left or the right, and basically it can be premised that the face of the user is oriented to the front side. Therefore, it is desirable to make the gaze direction Dv of a virtual viewpoint image coincide with the orientation of the body of the noticed imaging object St. By making the gaze direction Dv coincide with the orientation of the body of the noticed imaging object St in this manner, the orientation of the body can be aligned between the user and the noticed imaging object St.

It is to be noted that, according to the setting method of a gaze direction Dv described in connection with the second modification, in the case where information of the orientation of the body cannot be acquired, a gaze direction Dv based on the orientation of the face is set, and in the case where also the orientation of the face cannot be acquired, the advancing direction is set as the gaze direction Dv.

Referring to FIG. 20, the noticed imaging object St depicted on the upper side of the user wearing the HMD 51 mounted thereon indicates coincidence between the orientation of the body and the orientation Drv of the gaze. In other words, the virtual viewpoint image in this case indicates the gaze direction Dv coincident with the orientation Drv of the gaze of the noticed imaging object St, and in the case where a virtual viewpoint image according to the first-person viewpoint of the noticed imaging object St is displayed to the user, a virtual viewpoint image based on the field of view coincident with the field of view of the noticed imaging object St can be displayed.

On the other hand, the noticed imaging object St depicted on the lower side of the user does not indicate coincidence between the orientation of the body and the orientation Drv of the gaze. Accordingly, the virtual viewpoint image in this case indicates the gaze direction Dv that does not coincide with the orientation Drv of the gaze of the noticed imaging object St, and in the case where a virtual viewpoint image based on the first-person viewpoint of the noticed imaging object St is displayed to the user, the field of view of the noticed imaging object St cannot be reproduced.

As described above, the noticed imaging object St sometimes indicates incoincidence between the orientation of the body and the orientation Drv of the gaze, and depending upon the virtual viewpoint image generated in this case, the field of view of the noticed imaging object St cannot be reproduced appropriately.

Therefore, the present example estimates an orientation Drv of the gaze of the noticed imaging object St and presents, to a user, information according to the displacement of the estimated orientation Drv of the gaze and the gaze direction Dv, particularly, guide information for making the direction and the orientation coincide with each other.

First, estimation of an orientation Drv of a gaze of a noticed imaging object St is described.

In the present example, also for the orientation Drv of the gaze, a setting method is selected on the basis of an acquisition situation of analysis information relating to the orientation of the noticed imaging object St similarly as in the case of the second modification.

In particular, a setting method of an orientation Drv of a gaze is selected on the basis of an acquisition situation of the orientation of the face and the orientation of the pupil as depicted in FIG. 21.

Here, the orientation of the pupil of the noticed imaging object St is estimated by the imaging object analysis section 12.

The "pupil" here includes not only a meaning of a narrow sense indicative only of a pupil but also another meaning of a broad sense indicative of a portion including both a pupil and an iris. In the present example, the orientation of the pupil is estimated on the basis of detection information of the orientation of the face and information of the orientation of the pupil. In other words, the orientation of the pupil is information that can be acquired in the case where the orientation of the face is acquired.

As depicted in FIG. 21, in the present example, in the case where none of the orientation of the face and the orientation of the pupil have been acquired, presentation of the orientation Drv of the gaze is not performed. In other words, information notification according to a displacement between the gaze direction Dv and the orientation Drv of the gaze is not performed.

On the other hand, in the case where only the orientation of the face from between the orientation of the face and the orientation of the pupil has been acquired, the orientation Drv of the gaze is estimated on the basis of the orientation of the face.

In the present example, a direction obtained by adding a predetermined rotation to the orientation of the face is determined as an estimated value of the orientation Drv of the gaze. A representative value of such estimation values during a specific period is acquired as the orientation Drv of the gaze.

It is to be noted that, when the orientation Drv of the gaze is estimated from the orientation of the face, the position of the viewpoint Pv may be offset.

Figure 22:
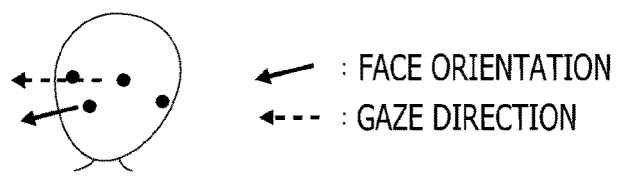
FIG. 22 is an explanatory view of an offset of a viewpoint when a direction of a gaze is estimated from an orientation of the face.

FIG. 22 depicts an example of this, and an offset is added to the viewpoint Pv such that the position of the viewpoint Pv is set closely to the position of the eyes of the noticed imaging object St.

Referring to FIG. 21, in the case where both the orientation of the face and the orientation of the pupil have been acquired, the orientation Drv of the gaze is set on the basis of the orientation of the pupil. In particular, in the present example, a representative value of the orientation of the pupil during a specific period is set as the orientation Drv of the gaze.

In the case where the orientation Drv of the gaze of the noticed imaging object St is set corresponding to a case in which only the orientation of the face is acquired or both the orientation of the face and the orientation of the pupil are acquired as described above, the displacement between the gaze direction (observation direction) Dv of the virtual viewpoint image and the orientation Drv of the gaze is detected and information according to the displacement is notified to the user.

Examples of notification of information according to the displacement between the gaze direction Dv and the orientation Drv of the gaze are described with reference to FIGS. 23 to 26.

Figure 23:
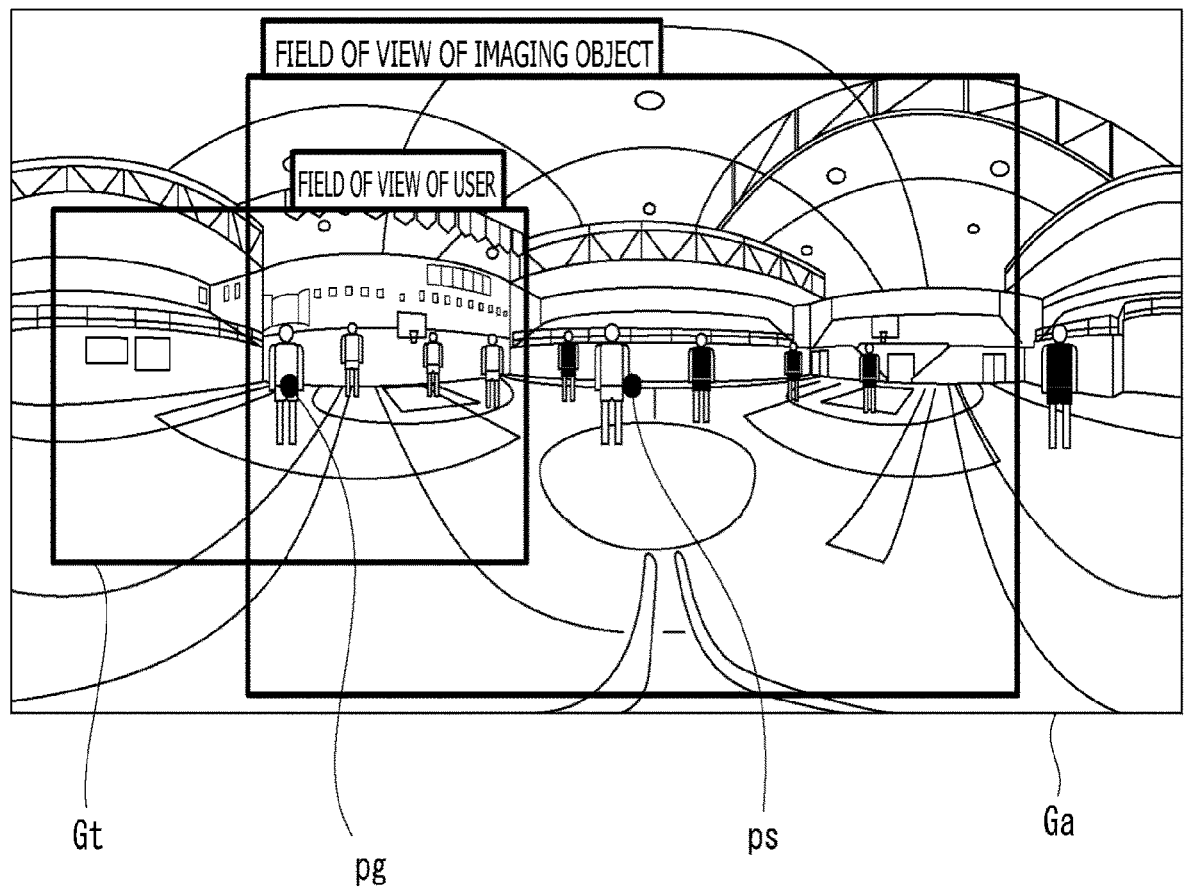
FIG. 23 is an explanatory view exemplifying a relationship of a field of view of an imaging object and a field of view of a user in the case where a displacement occurs between the gaze direction and the orientation of the gaze.

FIG. 23 exemplifies a relationship between the field of view of the noticed imaging object St and the field of view of the user in the case where a displacement occurs between the gaze direction Dv and the orientation Drv of the gaze.

An image Ga in FIG. 23 represents a virtual viewpoint image according to a spherical image in the case where the viewpoint Pv is a first-person viewpoint of the noticed imaging object St. The virtual viewpoint image indicated as a display image Gt in FIG. 23 and to be displayed on the HMD 51 can be regarded as corresponding to the display image Ga from which part is cut out as depicted in FIG. 23. The field of view of the user is determined by the display image Gt.

A point pg in FIG. 23 schematically represents the gaze direction Dv from the viewpoint Pv (first-person viewpoint), and another point ps schematically represents the orientation Drv of the gaze of the noticed imaging object St. If a displacement occurs between the gaze direction Dv and the orientation Drv of the gaze as represented as a displacement between the point pg and the point ps, then the field of view of the noticed imaging object St is not reproduced appropriately on the image Ga.

FIG. 24 is an explanatory view of an example of information notification according to a displacement between the gaze direction Dv and the orientation Drv of the gaze.

In the present example of notification, as information according to a displacement between the gaze direction Dv and the orientation Drv of the gaze, gaze alignment guide information for aligning the gaze direction Dv with the orientation Drv of the gaze is presented. In particular, as depicted in A of FIG. 24, direction instruction information H1 (in the present example, a graphic pattern of an arrow mark shape) for aligning the gaze direction Dv with the orientation Drv of the gaze is presented on the image Ga.

B of FIG. 24 is a view depicting the display image Gt depicted in and extracted from A of FIG. 24.

By presenting such direction instruction information H1 as described above, it allows the user to precisely and intuitively recognize in which direction between the leftward and rightward directions the gaze direction Dv is to be changed (in the present example, in which direction the head is to be moved) in order to align the gaze direction Dv and the orientation Drv of the gaze with each other.

Further, in the present example of notification, presentation of target direction information H2 as information representative of the orientation Drv of the gaze of the noticed imaging object St is performed together with the direction instruction information H1 described above.

Figure 25:
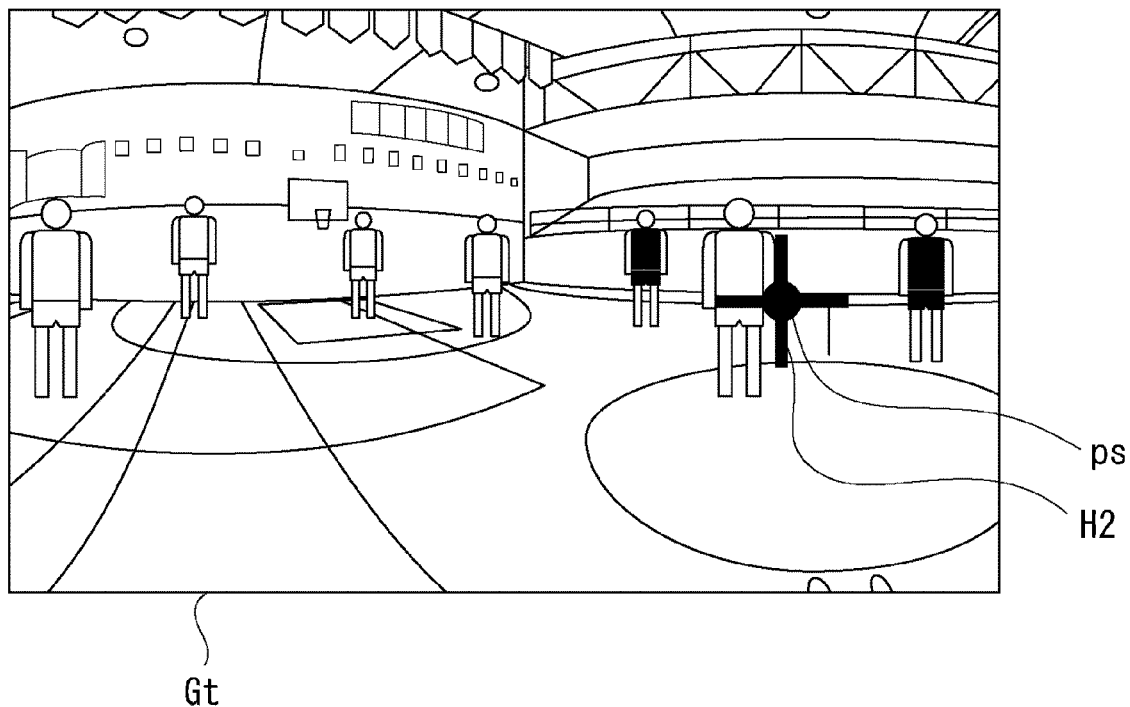
FIG. 25 is an explanatory view of presentation of target direction information.

FIG. 25 depicts a display image Gt in the case where the gaze direction Dv is changed to the side on which it coincides with the gaze from the state of B of FIG. 24. The target direction information H2 is presented in the display image Gt in a state in which the orientation Drv of the gaze is within the field of view of the display image Gt. It is to be noted that, while, in FIG. 25, a graphic pattern of a cross shape is presented as the target direction information H2, the presentation form of the target direction information H2 is not limited to this.

By such presentation of the target direction information H2, it is possible to allow the user to recognize a target of the direction alignment precisely and intuitively.

FIG. 26 is an explanatory view of a different example of information notification according to a displacement between the gaze direction Dv and the orientation Drv of the gaze.

In the present example of notification, an overlapping portion and a non-overlapping portion with the field of view of the noticed imaging object St in the display image Gt are displayed in different displaying forms. In particular, as depicted in A of FIG. 26, when the portion overlapping with the field of view of the noticed imaging object St in the display image Gt is represented as overlapping portion Ai and the portion that does not overlap is represented as non-overlapping portion Ao, the overlapping portion Ai and the non-overlapping portion Ao are displayed in displaying forms different from each other. In particular, in the present example, the overlapping portion Ai is displayed in color while the non-overlapping portion Ao is displayed with the saturation thereof reduced from that of the overlapping portion Ai such as monochromatic display.

According to such display of the overlapping portion Ai and the non-overlapping portion Ao, it is indicated in which one of the leftward and rightward directions the orientation Drv of the gaze exists. In other words, the presentation of information according to the overlapping portion Ai and the non-overlapping portion Ao corresponds to the presentation of the gaze alignment guide information described hereinabove.

It is to be noted that, while FIG. 26 depicts an example in which also presentation of the direction instruction information H1 and the target direction information H2 is performed, in the present example of notification, it is not essential to perform presentation of the direction instruction information H1 and the target direction information H2.

Processes relating to such notification of gaze alignment guide information are performed by the notification processing section 52 depicted in FIG. 19.

Figure 27:
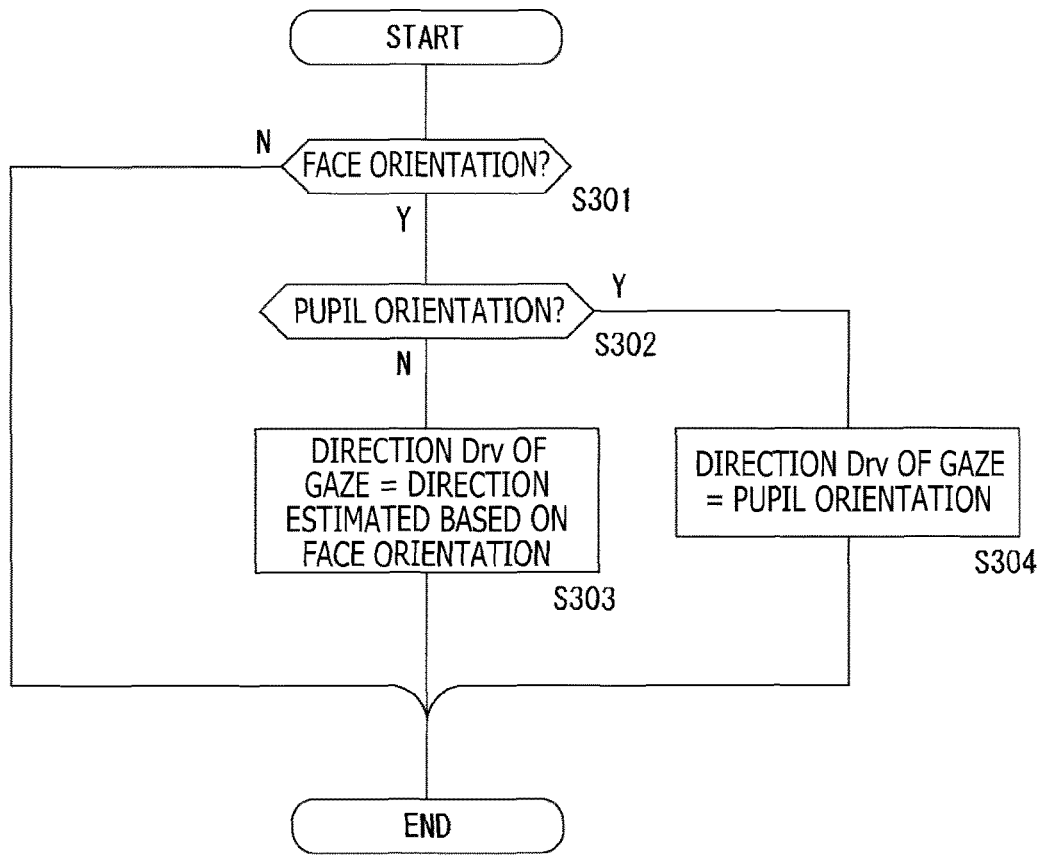
FIG. 27 is a flow chart of processes for selecting a setting method of an orientation of a gaze on the basis of an acquisition situation of analysis information relating to the orientation of the imaging object.

FIG. 27 is a flow chart of processes for selecting a setting method of an orientation Drv of the gaze on the basis of an acquisition situation of analysis information relating to the orientation of the noticed imaging object St from among the processes in the third modification described hereinabove.

In the present example, the processes depicted in FIG. 27 are executed by the virtual viewpoint image generation section 13'.

First, the virtual viewpoint image generation section 13' decides at step S301 whether or not the orientation of the face has been acquired. In the case where the orientation of the face has not been acquired, the virtual viewpoint image generation section 13' ends the processes depicted in FIG. 27. In short, in this case, an orientation Drv of the gaze is not set and notification of information according to a displacement between the gaze direction Dv and the orientation Drv of the gaze is not performed.

On the other hand, if the orientation of the face has been acquired, then the virtual viewpoint image generation section 13' advances the processing to step S302, at which it decides whether or not the orientation of the pupil has been acquired.

In the case where the orientation of the pupil has not been acquired (in other words, in the case where only the orientation of the face has been acquired), the virtual viewpoint image generation section 13' advances the processing to step S303, at which it performs a process for setting the orientation Drv of the gaze to the orientation estimated on the basis of the orientation of the face, and then ends the processes depicted in FIG. 27. In short, in the present example, the virtual viewpoint image generation section 13' performs a process for setting a direction obtained by adding predetermined rotation to the orientation of the face as an estimated value of the orientation Drv of the gaze and setting a representative value during a specific period of the estimated value as an orientation Drv of the gaze.

On the other hand, in the case where the orientation of the pupil has been acquired at step S302 (in the case where both the orientation of the face and the orientation of the pupil have been acquired), the virtual viewpoint image generation section 13' advances the processing to step S304, at which it performs a process for setting the orientation Drv of the gaze to the orientation of the pupil, and then ends the processes depicted in FIG. 27. In particular, the orientation Drv of the gaze in this case is set to a representative value during the specific period of the orientation of the pupil.

Figure 28:
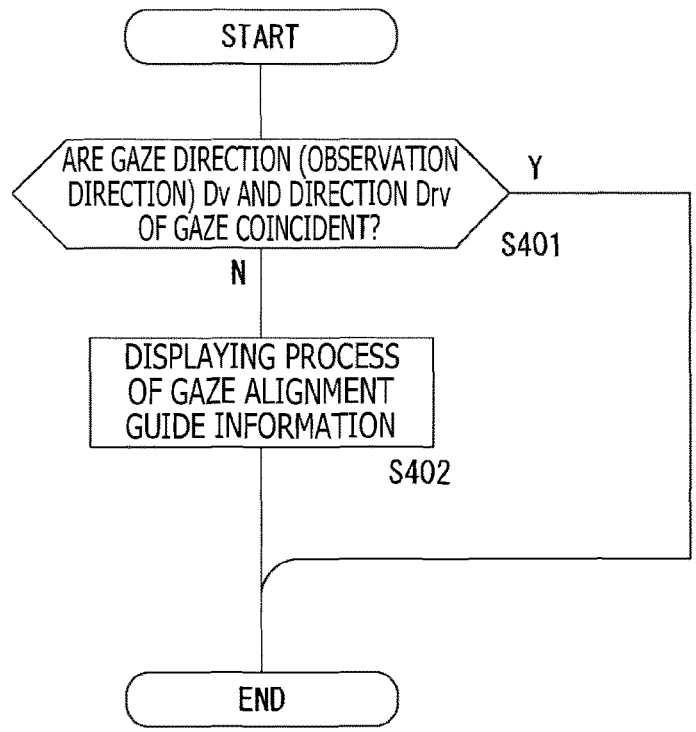
FIG. 28 is a flow chart of processes relating to display of gaze alignment guide information.

FIG. 28 is a flow chart of processes relating to display of gaze alignment guide information.

It is to be noted that the processes depicted in FIG. 28 are executed, in the present example, as the above described processes of the notification processing section 52 by the virtual viewpoint image generation section 13'.

Referring to FIG. 28, the virtual viewpoint image generation section 13' decides at step S401 whether or not the gaze direction (observation direction) Dv and the orientation Drv of the gaze coincide with each other, and if the gaze direction Dv and the orientation Drv of the gaze coincide with each other, then the virtual viewpoint image generation section 13' ends the processes depicted in FIG. 28, but if the gaze direction Dv and the orientation Drv of the gaze do not coincide with each other, then the virtual viewpoint image generation section 13' advances the processing to step S402.

At step S402, the virtual viewpoint image generation section 13' executes a displaying process of gaze alignment guide information. In particular, the virtual viewpoint image generation section 13' first detects a displacement between the gaze direction Dv and the orientation Drv of the gaze and performs a process for displaying gaze alignment guide information according to the detected displacement in the display image Gt. For example, in regard to the direction instruction information H1 described hereinabove, the virtual viewpoint image generation section 13' performs a process for causing, for example, if the orientation Drv of the gaze is displaced in the rightward direction with respect to the gaze direction Dv, a rightwardly directed arrow mark to be displayed, but if the orientation Drv of the gaze is displaced in the leftward direction with respect to the gaze direction Dv, a leftwardly directed arrow mark to be displayed, in an overlapping relationship with the generated virtual viewpoint image (display image Gt). It is to be noted that, in regard to the target direction information H2, it is displayed in an overlapping relationship in a state in which the orientation Drv of the gaze is within the field of view of the display image Gt.

Further, in the case of the example of notification of FIG. 26, the virtual viewpoint image generation section 13' estimates a field of view of the noticed imaging object St on the basis of the orientation Drv of the gaze, specifies the overlapping portion Ai and the non-overlapping portion Ao in the virtual viewpoint image (display image Gt) on the basis of the estimated field of view and generates a virtual viewpoint image in which, for example, the overlapping portion Ai is displayed in color and the non-overlapping portion Ao is displayed with a low saturation.

The virtual viewpoint image generation section 13' ends the processes depicted in FIG. 28 in response to that the displaying process at step S402 is executed.

It is to be noted that, in the third modification, the information to be notified is not limited to visual information but can be auditory information as sound or tactile information such as vibration. For example, where auditory information is used, it is conceivable to perform direction indication by outputting sound from only one speaker for a channel on one side from between speakers for the L channel and the R channel. On the other hand, in the case where tactile information is used, especially in the case of a display device to be mounted on a user such as the HMD 51, it is conceivable to configure the display device such that a tactile stimulation device (a device that provides a tactile simulation such as, for example, vibration or wind pressure) is provided on the left and the right such that direction indication is performed by providing a tactile stimulation from only one of the left and right devices.

2-4. Fourth Modification

The fourth medication relates to changeover between a first-person viewpoint and a third-person viewpoint.

Here, the third-person viewpoint is same in meaning as the "inward viewpoint" described hereinabove, namely, a viewpoint for observing an imaging object.

In the fourth modification, the content to be provided by a virtual viewpoint image is sports.

Changeover between the third-person viewpoint and the first-person viewpoint can be performed in response to a type of a content.

For example, in regard to a competition in which many persons move in a wide space such as soccer, it is conceivable to automatically set a third-person viewpoint prioritizing grasping of the overall competition. On the other hand, in regard to a competition in which a small number of persons move in a narrow space such as boxing, it is conceivable to automatically set a first-person viewpoint prioritizing the presence.

Also it is possible to perform changeover between a third-person viewpoint and a first-person viewpoint in response to the difference in state in regard to whether the noticed imaging object St is in play or out play. For example, in the basketball game, it is conceivable to perform changeover to a first-person viewpoint if the noticed imaging object St holds the ball but to a third-person viewpoint if the noticed imaging object St does not hold the ball.

Further, when the noticed imaging object St is a batter of baseball, it is conceivable to perform changeover to a first-person viewpoint until the noticed imaging object St hits the ball but to a third-person viewpoint after the noticed imaging object St hits the ball.

Further, changeover between a first-person viewpoint and a third-person viewpoint may be performed in response to presence/absence of information of the posture of the noticed imaging object St. In particular, if the information of the posture is available, then changeover to a first-person viewpoint is performed, but if the information of the posture is not available, then changeover to a third-person viewpoint is performed.

Furthermore, also it is possible to perform changeover between a third-person viewpoint and a first-person viewpoint in response a type of the display device.

For example, if the display device of a virtual viewpoint image is a specific display device such as the HMD 51, then changeover to a first-person viewpoint is performed, but if the display device is any other than the specific display device, changeover to a third-person viewpoint is performed.

Alternatively, also it is possible to perform changeover between a third-person viewpoint and a first-person viewpoint in response to the number of times of reproduction of a content. For example, it is conceivable to perform, upon first time reproduction, changeover to a third-person viewpoint (or a first-person viewpoint) but perform, upon second and later time reproduction, changeover to a first-person viewpoint (or a third-person viewpoint).

Also it is possible to perform changeover between a third-person viewpoint and a first-person viewpoint in an interlocking relationship with any operation other than a viewpoint changeover operation.

For example, when a rewiring operation is performed during reproduction, it is conceivable to perform, upon reproduction after such rewinding, changeover from a third-person viewpoint to a first-person viewpoint or from a first-person viewpoint to a third-person viewpoint. Such changeover according to a rewiring operation is suitable in the case where it is desired, for example, to enjoy a cross play once again with the viewpoint changed or in a like case.

Further, in place of actually performing viewpoint changeover, information for proposing changeover may be presented to the user. As an example, such a method is available that a popup screen image for selecting "Yes" or "No" regarding changeover is displayed and an instruction of the user is waited for and then, in the case where no response is obtained for a fixed period of time, the decision of "Yes" is made. As an alternative, also it is conceivable to perform notification of performance of changeover by voice and wait for an instruction of the user and then decide, in the case where a response of the user by voice is not obtained for a fixed period of time, that the use has no will to perform changeover. It is to be noted that the fixed period described is desired to be short because of the sport content, and it is conceivable to set the fixed period, for example, to approximately two seconds.

2-5. Fifth Modification

The fifth modification is a modification regarding the system configuration.

Figure 29:
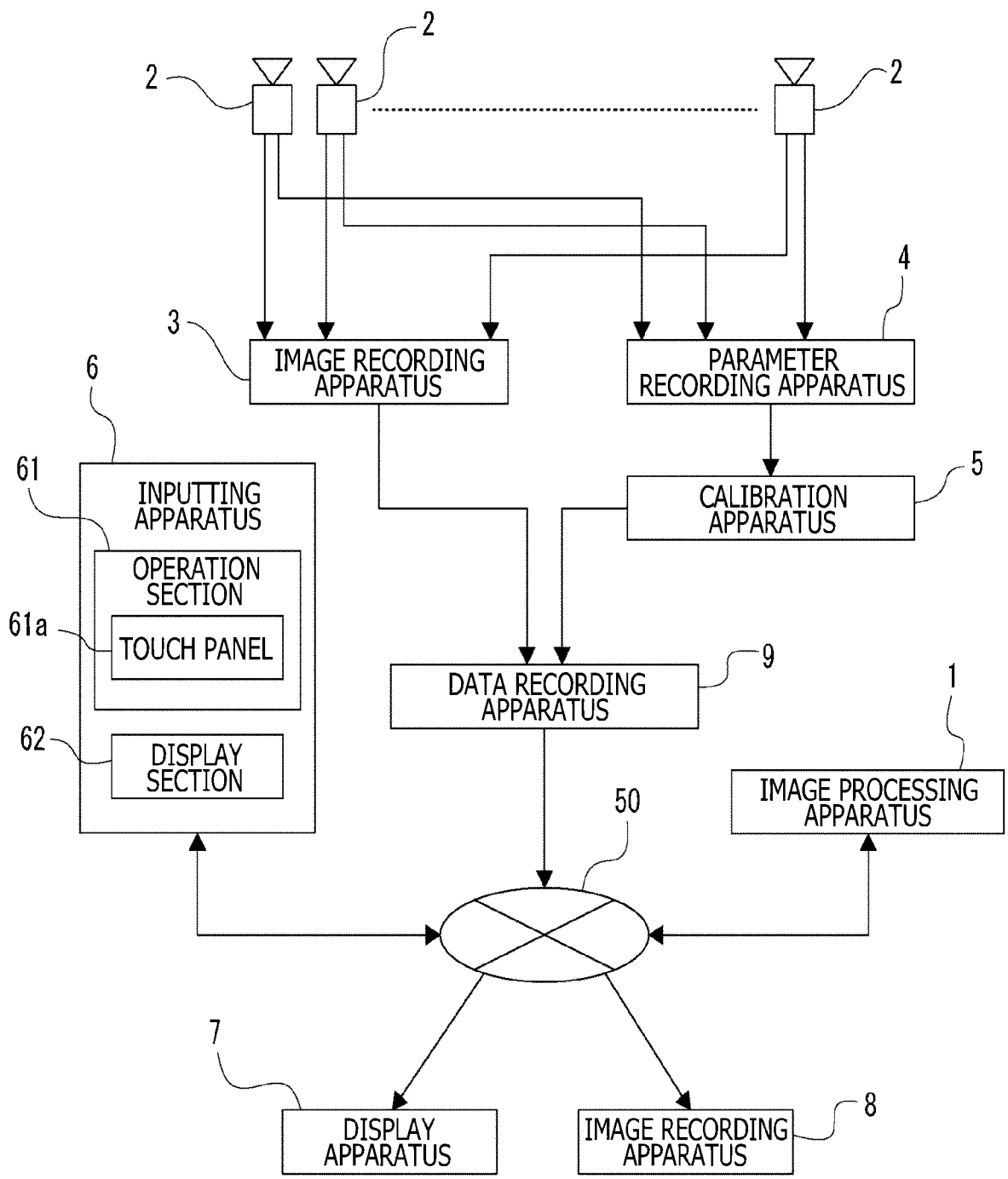
FIG. 29 is a view depicting an example of a configuration of an image processing system according to a fifth modification.

FIG. 29 depicts an example of a configuration of an image processing system 100A in the fifth modification.

It is to be noted that, in the following description, elements similar to those that have been described are denoted by like reference characters and description of them is omitted.

The fifth modification is an example in which processing by the image processing apparatus 1 is implemented by cloud computing.

The image processing system 100A is different in comparison with the image processing system 100 depicted in FIG. 1 in that it additionally includes a data recording apparatus 9 and that the data recording apparatus 9, the image processing apparatus 1, the inputting apparatus 6, the display apparatus 7, and the image recording apparatus 8 are connected for communication thereamong through a network 50.

It is to be noted that the network 50 is, for example, the Internet.

The data recording apparatus 9 includes a data recording section such as, for example, an SSD or an HDD, and a control section for performing recording and reproduction control of data into and from the data recording section, and acquires and records captured images by the imaging apparatus 2 and recorded in the image recording apparatus 3 and information of parameters obtained by the calibration apparatus 5.

In this case, the image processing apparatus 1 acquires captured images by the imaging apparatus 2 and information of camera parameters from the data recording apparatus 9 through the network 50. It is to be noted that processes performed by the image processing apparatus 1 on the basis of the captured images and the information of camera parameters are similar to those described hereinabove, and therefore, overlapping description of them is omitted.

It is to be noted that, in the image processing system 100A, the inputting apparatus 6 may be directly connected for communication to the image processing apparatus 1 without the intervention of the network 50.

2-6. Sixth Modification

Figure 30:
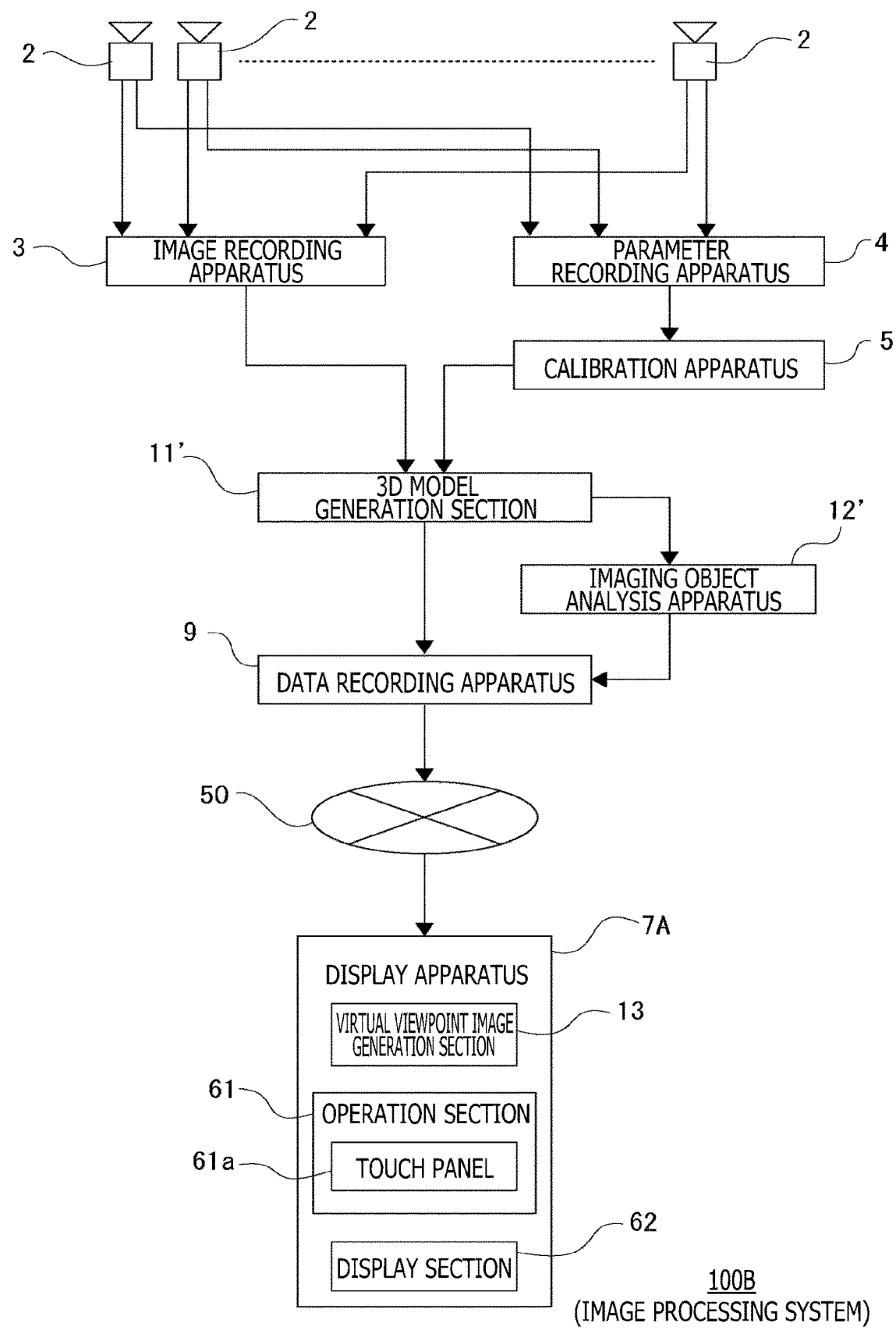
FIG. 30 is a view depicting an example of a configuration of an image processing system according to a sixth modification.

FIG. 30 depicts an example of a configuration of an image processing system 100B according to the sixth modification.

The sixth modification includes a data recording apparatus 9 similar to that in the fifth modification to make it possible to implement generation of a virtual viewpoint image by an offline process.

FIG. 30 exemplifies a case as an example in which 3D model data and imaging object analysis information Ia are recorded into the data recording apparatus 9 in advance and then the recorded 3D model data and imaging object analysis information Ia are acquired by a display apparatus 7A to perform generation of a virtual viewpoint image.

The image processing system 100B is different in comparison with the image processing system 100A in that the image processing apparatus 1, the inputting apparatus 6, and the image recording apparatus 8 are omitted while a 3D model generation apparatus 11' and an imaging object analysis apparatus 12' are provided and a display apparatus 7A is provided in place of the display apparatus 7.

The data recording apparatus 9 and the display apparatus 7A can perform data communication with each other through a network 50.

In this case, captured images from the respective imaging apparatuses 2 and recorded in the image recording apparatus 3 and information of camera parameters obtained by the calibration apparatus 5 are inputted to the 3D model generation apparatus 11'. The 3D model generation apparatus 11' generates 3D model data similar to the 3D model generation section 11 on the basis of the captured images and the information of camera parameters recorded in the image recording apparatus 3.

The imaging object analysis apparatus 12' performs an imaging object analysis process similar to that by the imaging object analysis section 12 on the basis of the 3D model data generated by the 3D model generation apparatus 11' to obtain imaging object analysis information Ia.

The 3D model data generated by the 3D model generation apparatus 11' and the imaging object analysis information Ia are recorded into the data recording apparatus 9.

The display apparatus 7A includes an operation section 61 and a display section 62 and further includes a virtual viewpoint image generation section 13. The virtual viewpoint image generation section 13 acquires 3D model data and imaging object analysis information Ia recorded in the data recording apparatus 9 through the network 50 and generates a virtual viewpoint image. Then, the generated virtual viewpoint image is displayed by the display section 62. Also in this case, the virtual viewpoint image generation section 13 performs setting of a viewpoint Pv and a gaze direction Dv on the basis of an operation input through the operation section 61. Further, similarly as in the case of the image processing apparatus 1, the virtual viewpoint image generation section 13 performs processes according to the "viewpoint mode" and the "viewpoint setting mode" set therein (refer to FIG. 11) similarly as in the case of the image processing apparatus 1.

Such a display apparatus 7A as described above can be implemented as an information processing apparatus having portability such as, for example, a notebook type personal computer, a portable telephone set or a tablet terminal.

Here, in the image processing system 100B, for example, taking the communication traffic of the network 50, a processing burden on the display apparatus 7A and so forth into consideration, also it is possible for the display apparatus 7A to acquire only data of required part of scenes from the data recording apparatus 9 to perform generation of a virtual viewpoint image. In this case, selection of a required scene can be performed on the basis of an operation input through the operation section 61.

Further, recording of 3D model data and imaging object analysis information Ia in the data recording apparatus 9 may be performed only in regard to an image portion within a partial section of a captured image from each of the imaging apparatus 2.

It is to be noted that, in the image processing system 100B, also it is possible to record a virtual viewpoint image generated by the display apparatus 7A into a required recording apparatus.

Further, while the foregoing description presupposes that the virtual viewpoint image generation section 13 in the display apparatus 7A performs setting of a viewpoint Pv, also it is possible for the display apparatus 7A to acquire information of a viewpoint Pv set, for example, by an external apparatus such that the virtual viewpoint image generation section 13 performs generation of a virtual viewpoint image on the basis of the acquired information of the viewpoint Pv.

In this case, setting of the viewpoint Pv based on the position of the imaging object is performed, for example, by the external apparatus described above at least on the basis of the 3D model data and the imaging object analysis information Ia. Then, the virtual viewpoint image generation section 13 of the display apparatus 7A performs generation of a virtual viewpoint image on the basis of the information of the viewpoint Pv set in this manner. It is to be noted that, also in this case, there is no change in that the virtual viewpoint image generation section 13 generates a virtual viewpoint image whose viewpoint Pv changes following a movement of the imaging object.

2-7. Seventh Embodiment

The technology according to the present disclosure can be applied to various products. For example, the technology according to the present disclosure may be applied to a surgery room system.

Figure 31:
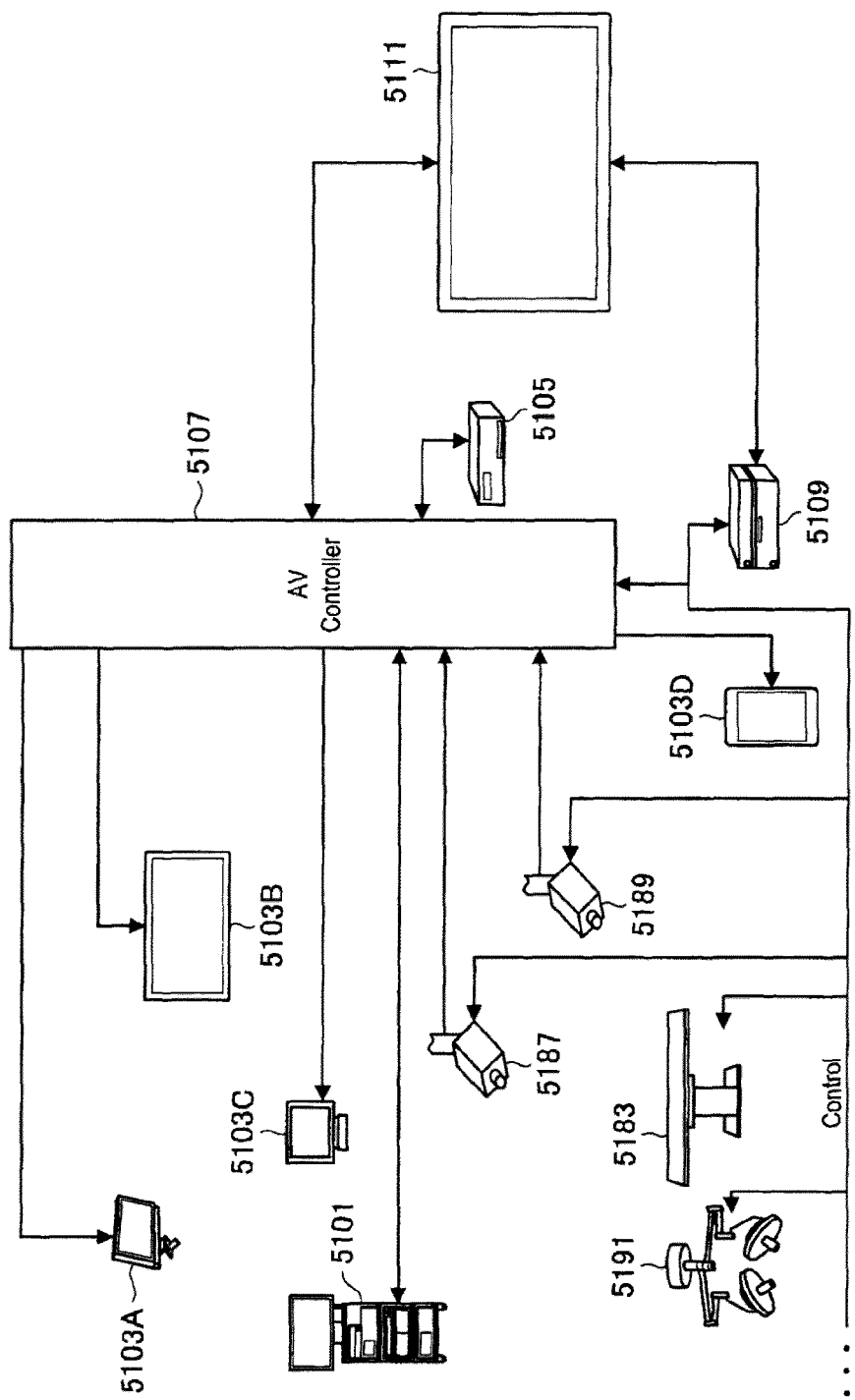
FIG. 31 is a view schematically depicting a general configuration of a surgery room system.

FIG. 31 is a view schematically depicting a general configuration of a surgery room system 5100 to which the technology according to an embodiment of the present disclosure can be applied. Referring to FIG. 31, the surgery room system 5100 is configured such that a group of apparatus installed in a surgery room are connected for cooperation with each other through an audiovisual (AV) controller 5107 and a surgery room controlling apparatus 5109.

In the surgery room, various apparatus may be installed. In FIG. 31, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of a surgery room and images the hands of a surgeon. The surgery field camera 5189 is provided on the ceiling of the surgery room and images a state of the entire surgery room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the surgery room separately from the endoscopic surgery system 5113. The apparatus which do not belong to the endoscopic surgery system 5113 are referred to also as non-medical equipment. The audiovisual controller 5107 and/or the surgery room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the surgery room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body lumen of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire surgery room may be transmitted as display information. It is to be noted that, if a different apparatus having an image pickup function exists in the surgery room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the surgery room; the display apparatus 5103B is a display apparatus installed on a wall face of the surgery room; the display apparatus 5103C is a display apparatus installed on a desk in the surgery room; and the display apparatus 5103D is a mobile apparatus (for example, a tablet personal computer (PC)) having a display function.

Further, though not depicted in FIG. 31, the surgery room system 5100 may include an apparatus outside the surgery room. The apparatus outside the surgery room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The surgery room controlling apparatus 5109 integrally controls processes other than processes relating to image display on the non-medical equipment. For example, the surgery room controlling apparatus 5109 controls driving of the patient bed 5183, the ceiling camera 5187, the surgery field camera 5189 and the illumination 5191.

In the surgery room system 5100, a centralized operation panel 5111 is provided such that it is possible to issue an instruction regarding image display to the audiovisual controller 5107 or issue an instruction regarding operation of the non-medical equipment to the surgery room controlling apparatus 5109 through the centralized operation panel 5111. The centralized operation panel 5111 is configured by providing a touch panel on a display face of a display apparatus.

Figure 32:
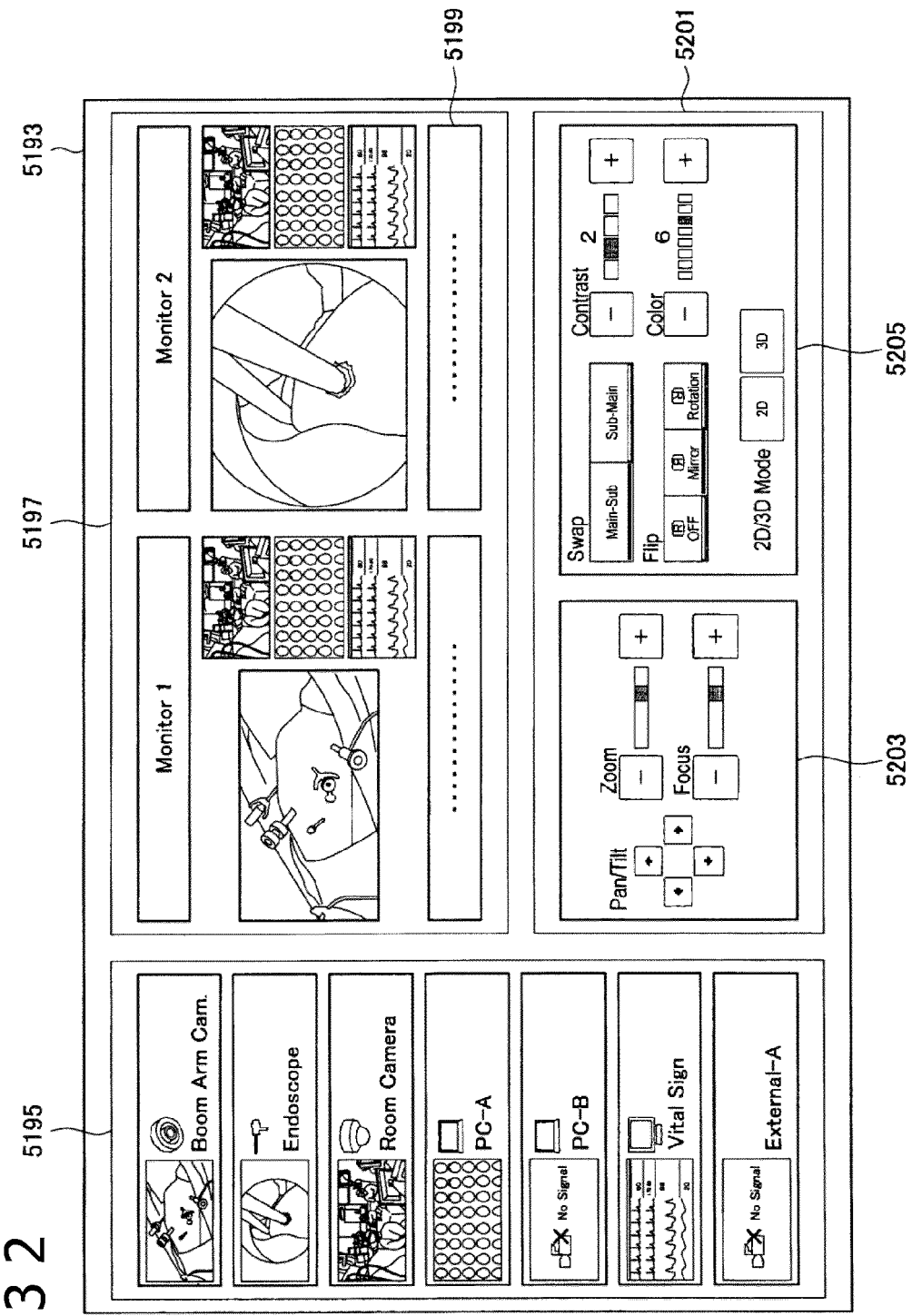
FIG. 32 is a view depicting an example of display of an operation screen image of a centralized operation panel.

FIG. 32 is a view depicting an example of display of an operation screen image on the centralized operation panel 5111. In FIG. 32, as an example, an operation screen image is depicted which corresponds to a case in which two display apparatus are provided as apparatus of an output destination in the surgery room system 5100. Referring to FIG. 32, the operation screen image 5193 includes a sending source selection region 5195, a preview region 5197 and a control region 5201.

In the sending source selection region 5195, the sending source apparatus provided in the surgery room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the surgery room controlling apparatus 5109 provided in the surgery room system 5100 through the centralized operation panel 5111.

Figure 33:
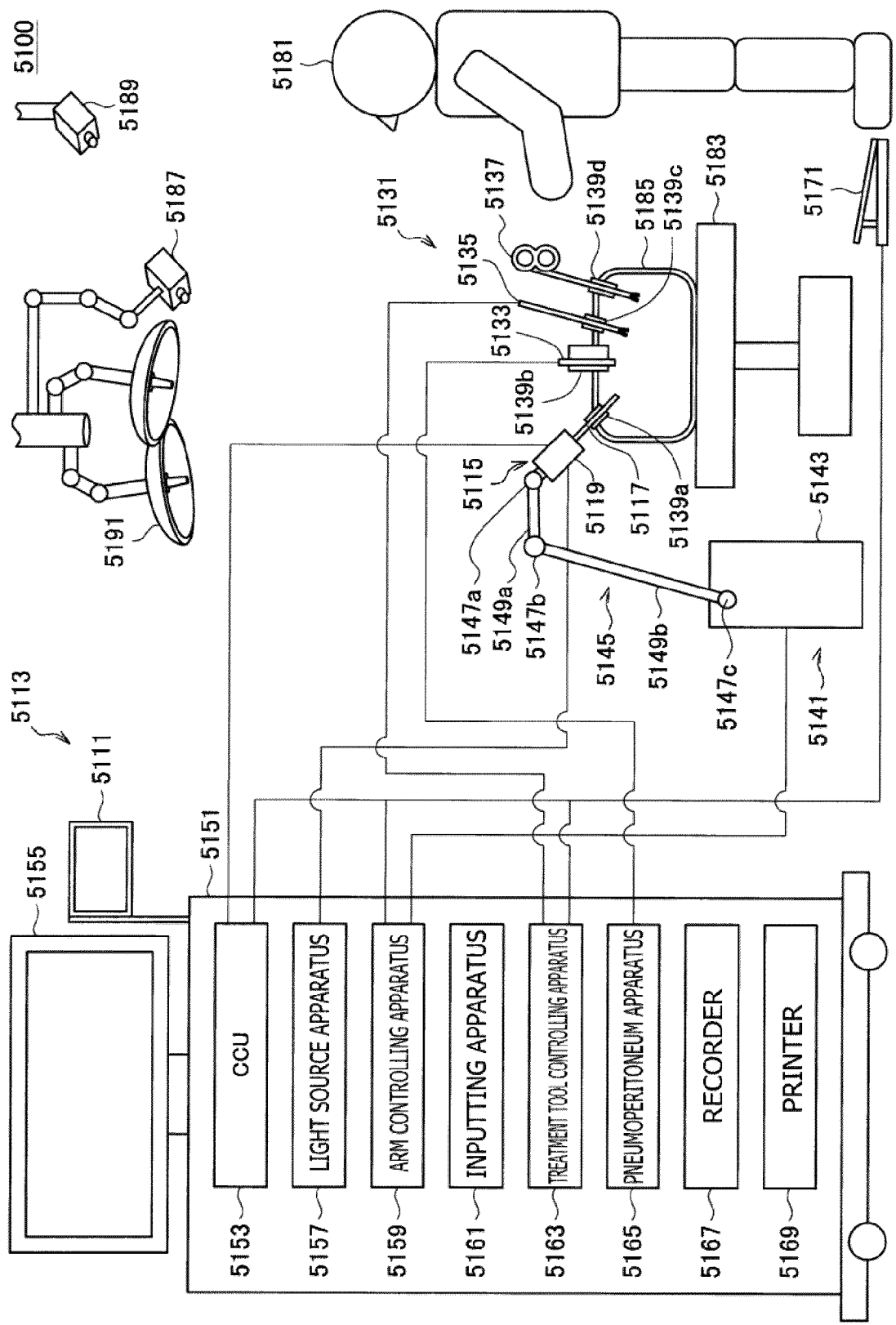
FIG. 33 is a view illustrating an example of a state of surgery to which the surgery room system is applied.

FIG. 33 is a view illustrating an example of a state of surgery to which the surgery room system described above is applied. The ceiling camera 5187 and the surgery field camera 5189 are provided on the ceiling of the surgery room such that it can image the hands of a surgeon (medical doctor) 5181 who performs treatment for an affected area of a patient 5185 on the patient bed 5183 and the entire surgery room. The ceiling camera 5187 and the surgery field camera 5189 may include a magnification adjustment function, a focal distance adjustment function, an imaging direction adjustment function and so forth. The illumination 5191 is provided on the ceiling of the surgery room and irradiates at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the surgery room controlling apparatus 5109 (not depicted in FIG. 33) as depicted in FIG. 31. The centralized operation panel 5111 is provided in the surgery room, and the user can suitably operate the apparatus existing in the surgery room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139a to 5139d are used to puncture the abdominal wall. Then, a lens barrel 5117 of the endoscope 5115 and the other surgical tools 5131 are inserted into body lumens of the patient 5185 through the trocars 5139a to 5139d. In the example depicted, as the other surgical tools 5131, a pneumoperitoneum tube 5133, an energy treatment tool 5135 and forceps 5137 are inserted into body lumens of the patient 5185. Further, the energy treatment tool 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, a pair of tweezers or a retractor may be used.

An image of a surgical region in a body lumen of the patient 5185 picked up by the endoscope 5115 is displayed on a display apparatus 5155. The surgeon 5181 would use the energy treatment tool 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy treatment tool 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147a, 5147b and 5147c and links 5149a and 5149b and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body lumen of the patient 5185, and a camera head 5119 connected to a proximal end of the lens barrel 5117. In the example depicted, the endoscope 5115 is depicted which is configured as a hard mirror having the lens barrel 5117 of the hard type. However, the endoscope 5115 may otherwise be configured as a soft mirror having the lens barrel 5117 of the soft type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is applied toward an observation target in a body lumen of the patient 5185 through the objective lens. It is to be noted that the endoscope 5115 may be a direct view mirror or may be a perspective view mirror or a side view mirror.

An optical system and an image pickup element are provided in the inside of the camera head 5119 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 31 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy treatment tool 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy treatment tool 5135 for cautery or incision of a tissue, sealing of a blood vessel or the like. A pneumoperitoneum apparatus 5165 feeds gas into a body lumen of the patient 5185 through the pneumoperitoneum tube 5133 to inflate the body lumen in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147*a*, 5147*b* and 5147*c* and the plurality of links 5149*a* and 5149*b* connected to each other by the joint portion 5147*b*. In FIG. 33, for simplified illustration, the configuration of the arm unit 5145 is depicted in a simplified form. Actually, the shape, number and arrangement of the joint portions 5147*a* to 5147*c* and the links 5149*a* and 5149*b* and the direction and so forth of axes of rotation of the joint portions 5147*a* to 5147*c* can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body lumen of the patient 5185.

An actuator is provided in the joint portions 5147*a* to 5147*c*, and the joint portions 5147*a* to 5147*c* include such that they are rotatable around predetermined axes of rotation thereof by driving of the actuator. The driving of the actuator is controlled by the arm controlling apparatus 5159 to control the rotational angle of each of the joint portions 5147*a* to 5147*c* thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the surgery room.

Further, where force control is applied, the arm controlling apparatus 5159 may perform power-assisted control to drive the actuators of the joint portions 5147*a* to 5147*c* such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147*a* to 5147*c* of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are applied time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue, narrow band light observation (narrow band imaging) of imaging a predetermined tissue such as a blood vessel of a superficial portion of the mucous membrane or the like in a high contrast is performed by applying light of a narrower band in comparison with irradiation light upon ordinary observation (namely, white light). Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 34:
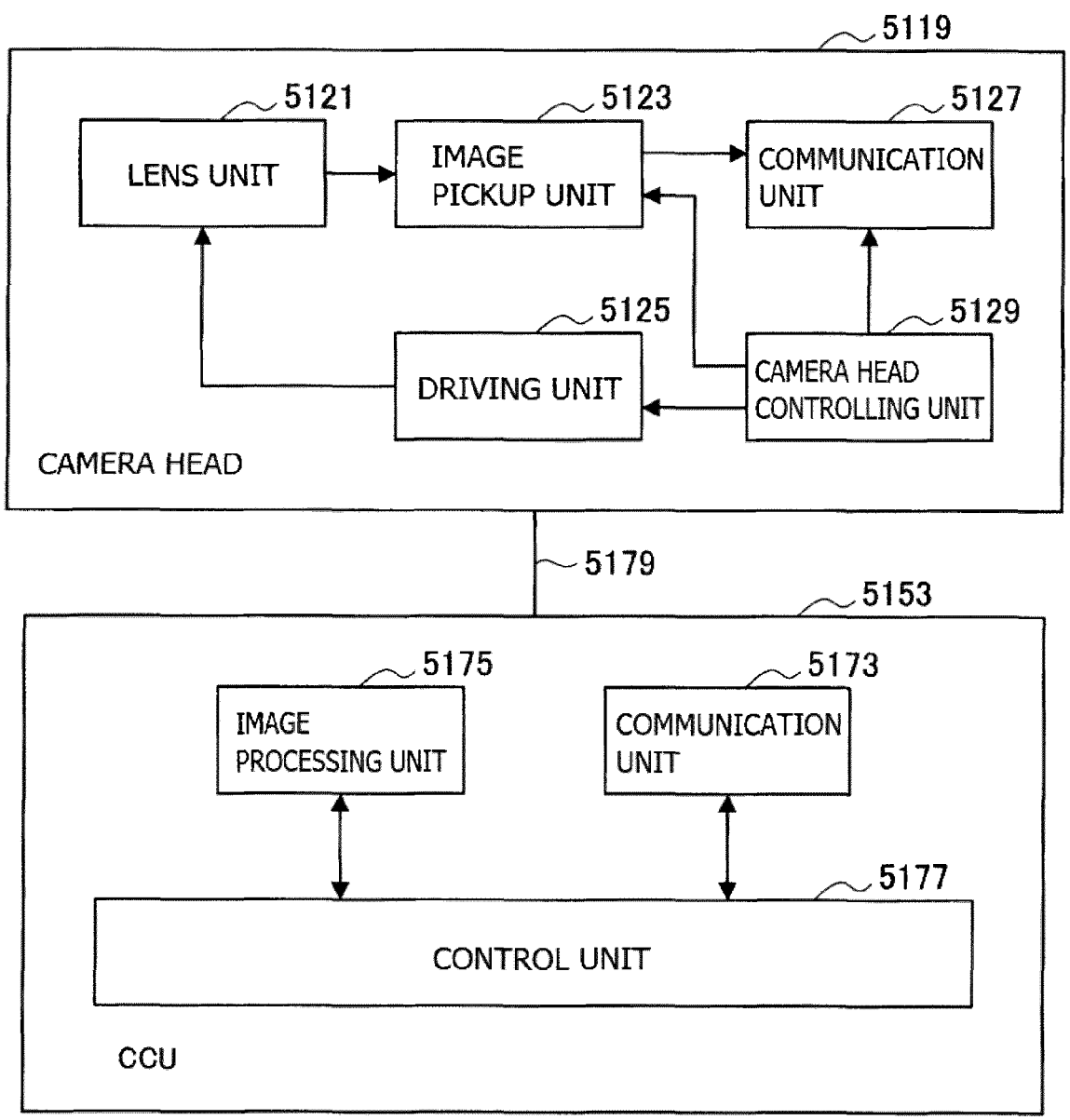
FIG. 34 is a block diagram depicting an example of a functional configuration of a camera head and a camera control unit (CCU) depicted in FIG. 33.

Functions of the camera head 5119 of the endoscope 5115 and the CCU 5153 are described in more detail with reference to FIG. 34. FIG. 34 is a block diagram depicting an example of a functional configuration of the camera head 5119 and the CCU 5153 depicted in FIG. 33.

Referring to FIG. 34, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5115 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy treatment tool 5135 is used and so forth by detecting the shape, color and so forth of edges of the objects included in the surgical region image. The control unit 5177 causes, when it controls the display apparatus 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the surgery room. Therefore, such a situation that movement of medical staff in the surgery room is disturbed by the transmission cable 5179 can be eliminated.

An example of the surgery room system 5100 to which the technology according to an embodiment of the present disclosure can be applied has been described above. It is to be noted here that, although a case in which the medical system to which the surgery room system 5100 is applied is the endoscopic surgery system 5113 has been described as an example, the configuration of the surgery room system 5100 is not limited to that of the example described above. For example, the surgery room system 5100 may be applied to a soft endoscopic system for inspection or a microscopic surgery system in place of the endoscopic surgery system 5113.

The technology according to the present disclosure can be applied favorably to a case in which a virtual viewpoint image is generated on the basis of captured images by imaging apparatus such as the surgery field camera 5189, the ceiling camera 5187 and so forth from among the configurations described hereinabove. In particular, it is possible to provide a plurality of imaging apparatuses such as, for example, the surgery field camera 5189, the ceiling camera 5187 and so forth, acquire three-dimensional information that represents an imaging object in a three-dimensional space on the basis of captured images by the plurality of imaging apparatuses and generate an observation image from a viewpoint in the three-dimensional space as a virtual viewpoint image on the basis of the three-dimensional information.

For example, in the case where the surgery field camera 5189 is used to generate a virtual viewpoint image, as the imaging object, an operator (a surgeon, an assistant, a nurse or the like), a patient, an operating tool or the like becomes a target. In the case where the ceiling camera 5187 is used to generate a virtual viewpoint image, as the imaging object, an operating tool, an organ of a patient or the like can become a target.

2-8. Eighth Modification

The technology according to the present disclosure may be implemented as an apparatus that is incorporated in any of various types of mobile bodies such as, for example, automobiles, electric cars, hybrid electric cars, motorcycles, bicycles, personal mobilities, airplanes, drones, ships, robots, construction machines, agricultural machines (tractors) and so forth.

Figure 35:
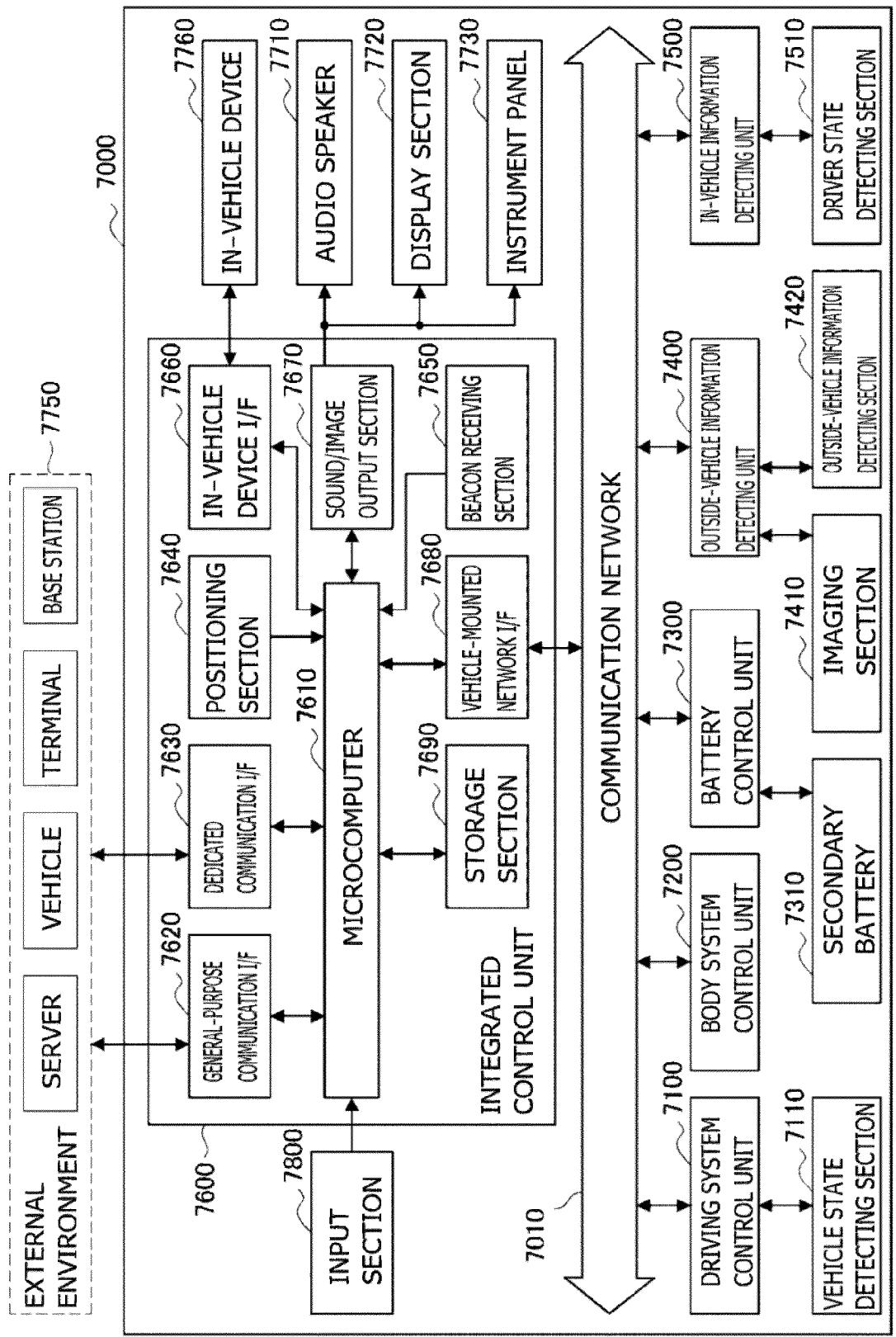
FIG. 35 is a block diagram depicting an example of schematic configuration of a vehicle control system.

FIG. 35 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 35, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 35 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 36:
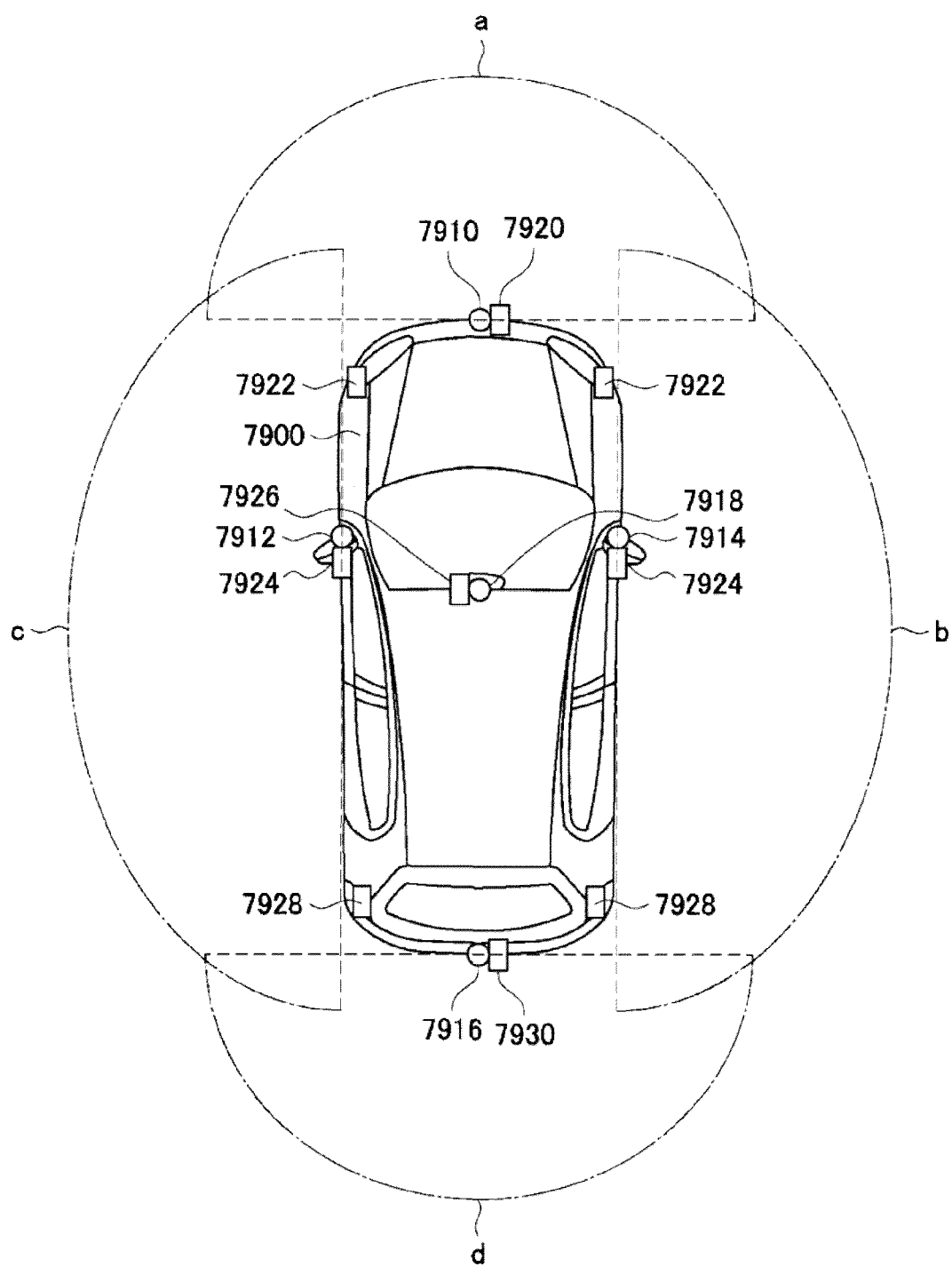
FIG. 36 is a diagram of assistance in explaining an example of installation positions of an outside-vehicle information detecting section and an imaging section.

FIG. 36 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 36 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 35, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 35, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 35 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

3. Summary of Embodiment

As described above, the image processing apparatus (1 or 1' or display apparatus 7A) of the embodiment includes a virtual viewpoint image generation section (13 or 13') that generates, on the basis of three-dimensional information that represents an imaged imaging object in a three-dimensional space, an observation image from a viewpoint in the three-dimensional space as a virtual viewpoint image, and the virtual viewpoint image generation section sets the viewpoint that follows movement of the imaging object.

By setting the viewpoint that follows movement of the imaging object as described above, the operation burden relating to setting of the viewpoint can be reduced. For example, although it is conventionally common that a worker performs a setting operation of a viewpoint manually for each frame, in comparison with this, the setting operation burden of a viewpoint can be reduced significantly.

Accordingly, reduction of the work burden relating to generation of a virtual viewpoint image can be implemented.

Further, the image processing apparatus (1 or 1') as the embodiment includes an imaging object analysis section

(12) that acquires analysis information of the imaging object on the basis of the three-dimensional information, and the virtual viewpoint image generation section sets a reference position to be used for the viewpoint setting of the virtual viewpoint image on the basis of the analysis information.

Consequently, various viewpoint setting based on the reference position can be implemented and following of the imaging object to the viewpoint is facilitated.

Accordingly, improvement of the accuracy in following of the imaging object to the viewpoint can be implemented while improvement of the degree of freedom in setting of a viewpoint is implemented.

Further, the image processing apparatus (1 or 1') as the embodiment includes a three-dimensional information generation section (3D model generation section 11) that generates the three-dimensional information on the basis of imaging information including captured images of a plurality of imaging apparatuses (2) and an imaging condition corresponding to the captured images.

By using the imaging information including the captured images and the imaging condition of the plurality of imaging apparatuses in such a manner, suitable three-dimensional information can be obtained.

Since appropriate three-dimensional information is obtained, improvement in picture quality of the virtual viewpoint image can be implemented.

Furthermore, the image processing apparatus as the embodiment sets a person as the imaging object, and the virtual viewpoint image generation section sets the reference position to the physical center of the person.

The physical center signifies a physical center of a person such as, for example, the center between both shoulders of the person, the center in the upward, downward, leftward, and rightward directions of the body, the center of the face or the center of the feet.

For example, if the reference position is set to the center between both shoulders of a person, then it is possible to set a viewpoint from which especially the skill of a player can be captured in a play in which a hand is used such as, for example, a basketball competition. Further, if the reference position is set, for example, to the center of the face of a person, then it is possible to obtain an image that represents a facial expression of a player or a high realistic image that represents a situation observed from the eyes of a player every second as a virtual viewpoint image.

Accordingly, a virtual viewpoint image suitable for analysis or research of a person such as a player of a competition.

Further, in the image processing apparatus as the embodiment, the virtual viewpoint image generation section sets the viewpoint on the basis of position information of the imaging object.

This makes it possible to set a viewpoint at which the imaging object can be easily captured.

Accordingly, a virtual viewpoint image that is suitable for analysis or research of a movement of a player can be provided.

Further, in the image processing apparatus as the embodiment targets a person as the imaging object, and the virtual viewpoint image generation section sets the viewpoint on the basis of attribute information of the imaging object.

This makes it possible to automatically set the viewpoint on the basis of the position of the imaging object specified from the attribute information of the imaging object.

Accordingly, reduction of the work burden relating to generation of a virtual viewpoint image can be implemented.

It is to be noted that the attribute information of the imaging object signifies information relating to an attribute of the imaging object such as, for example, an ID or a name.

Further, in the image processing apparatus as the embodiment, the virtual viewpoint image generation section sets the viewpoint on the basis of area information designated in the three-dimensional space.

This makes it possible to automatically set the viewpoint on the basis of the position of the imaging object existing in a specific area in the three-dimensional space.

Accordingly, reduction of the work burden relating to generation of a virtual viewpoint image can be implemented.

Furthermore, in the image processing apparatus as the embodiment, the virtual viewpoint image generation section sets the viewpoint on the basis of an operation input.

This makes it possible to set a viewpoint on which an intention of the user is reflected while operation burden reduction in the viewpoint setting is achieved.

Accordingly, reduction of the work burden relating to generation of a virtual viewpoint image can be implemented while improvement of the degree of freedom in setting of a viewpoint is implemented.

Furthermore, the image processing apparatus (display apparatus 7A) as the embodiment includes a display section (62) that displays the virtual viewpoint image, and the display section sequentially displays a plurality of the virtual viewpoint images that are different in the setting method of the view point as candidate viewpoint images and the virtual viewpoint image generation section sets the viewpoint on the basis of a selection operation relating to the candidate viewpoint images.

This makes it possible for the user to select a favorable viewpoint while actually confirming image contents. Further, since sequential display is applied, a comparatively great candidate viewpoint image can be displayed and the user can perform viewpoint selection while confirming particulars of the image.

Accordingly, a superior user interface can be implemented by which the user can perform viewpoint selection in order to achieve reduction of the work burden relating to generation a virtual viewpoint image.

Further, the image processing apparatus (display apparatus 7A) as the embodiment includes a display section (62) that displays the virtual viewpoint image, and the display section displays a plurality of the virtual viewpoint images that is different in the setting method of the view point as candidate viewpoint images in a juxtaposed relationship with each other, and then the virtual viewpoint image generation section sets the viewpoint based on a selection operation relating to the candidate viewpoint images.

This makes it possible for the user to select a favorable viewpoint while actually confirming image contents. Further, since the candidate viewpoint images are displayed in a juxtaposed relationship with each other, the user can perform viewpoint selection while comparing a plurality of candidate viewpoint images with each other at the same time.

Accordingly, a superior user interface can be implemented by which the user can perform viewpoint selection in order to achieve reduction of the work burden relating to generation a virtual viewpoint image.

Furthermore, in the image processing apparatus as the embodiment, the virtual viewpoint image generation section allows changeover between a viewpoint for observing the imaging object and another viewpoint for observing outwardly from the imaging object as the viewpoint.

This achieves diversification of a viewpoint that can be set.

Accordingly, a virtual viewpoint image that captures a movement of an imaging object of a player or the like can be generated, and this is suitable for analysis and research of a movement of an imaging object.

Furthermore, in the image processing apparatus as the embodiment, the virtual viewpoint image generation section sets the viewpoint along a spherical surface that covers the periphery of the imaging object in response to an operation.

This increases the degree of freedom of a viewpoint position that can be set by an operation by the user.

Accordingly, improvement of the degree of freedom of the viewpoint setting position can be implemented while reduction of the work burden relating to generation of a virtual viewpoint image is implemented.

Further, in the image processing apparatus (1') as the embodiment, a person is targeted as the imaging object, and the virtual viewpoint image generation section (13') sets a first-person viewpoint that is a viewpoint for observing outwardly from the imaging object as the viewpoint and selects a setting method for a gaze direction from the first-person viewpoint on the basis of an acquisition situation of analysis information relating to an orientation of the imaging object (refer to the second and third modifications).

This makes it possible to perform setting of an appropriate gaze direction according to the acquisition situation of analysis information relating to an orientation of the imaging object such as, for example, an orientation of the face of the imaging object or an orientation of the body.

Accordingly, an image according to an appropriate gaze direction can be provided as a virtual viewpoint image of a first-person viewpoint.

Furthermore, in the image processing apparatus as the embodiment, the virtual viewpoint image generation section selects a setting method for the gaze direction on the basis of the acquisition situation and a changing rate of an orientation of the imaging object.

This makes it possible to perform, where, even if analysis information relating to an orientation of the imaging object such as, for example, an orientation of the face of the imaging object or an orientation of the body is acquired, the changing rate is high, setting of a gaze direction according to the changing rate of the orientation of the imaging object such as setting of a gaze direction without using the analysis information.

Accordingly, prevention of occurrence of image sickness of the user caused by observing an image in which the gaze direction of a virtual viewpoint image changes frequently can be implemented.

Furthermore, in the image processing apparatus as the embodiment, the virtual viewpoint image generation section sets the gaze direction on the basis of the acquisition situation and an advancing direction of the imaging object.

This makes it possible to set, when analysis information according to the orientation of the imaging object cannot be acquired, the gaze direction on the basis of the advancing direction of the imaging object (changing direction of the position of the imaging object).

For example, in the case where a person such as a player of a competition or the like is advancing (moving), the possibility that the person may be oriented to the advancing direction is high. Accordingly, if a gaze direction is set on the basis of the advancing direction, then an appropriate virtual viewpoint image can be provided in which, even if analysis information relating to the orientation of an imaging object cannot be obtained, a direction in which the imaging object faces with a high degree of possibility is made the gaze direction.

Further, in the image processing apparatus (1) as the embodiment, a person is targeted as the imaging object, and the virtual viewpoint image generation section (13') includes a notification processing section (52) that sets a first-person viewpoint that is a viewpoint for observing outwardly from the imaging object as the viewpoint, sets a gaze direction from the viewpoint on the basis of the analysis information relating to the orientation of the imaging object, and performs a process for notifying the user of information according to a displacement between the gaze direction and the orientation of the gaze of the imaging object (refer to the third modification).

Since such notification of the information according to the displacement between the gaze direction and the orientation of the gaze of the imaging object as described above is performed, the user can easily align the gaze direction of the virtual viewpoint image to the orientation of the gaze of the imaging object.

Accordingly, the convenience when the user aligns the gaze direction of the virtual viewpoint image with the orientation of the gaze of the imaging object can be increased.

Further, since the third modification described above uses a method that does not (automatically) change the gaze direction of the virtual viewpoint image in an interlocking relationship with a change of the orientation of the gaze of the imaging object but changes the gaze direction in response to an operation of the user (in the present example, to a movement of the head), such a situation that, in the case where the orientation of the gaze of the imaging object changes rapidly, also the gaze direction changes rapidly in an interlocking relationship is prevented and prevention of image sickness can be prevented.

Furthermore, in the image processing apparatus as the embodiment, the notification processing section performs a process for displaying gaze alignment guide information for aligning the gaze direction of the virtual viewpoint image with the orientation of the gaze of the imaging object together with the virtual viewpoint image.

Since such gaze alignment guide information as described above is displayed together with the virtual viewpoint image, the user can easily align the gaze direction of the virtual viewpoint image to the orientation of the gaze of the imaging object.

Accordingly, the convenience when the user aligns the gaze direction of the virtual viewpoint image with the orientation of the gaze of the imaging object can be increased.

Furthermore, in the image processing apparatus as the embodiment, the notification processing section performs a process for estimating a field of view of the imaging object on the basis of the orientation of the gaze of the imaging object and causing both an overlapping portion and a non-overlapping portion with the field of view of the imaging object in the virtual viewpoint image in different displaying forms.

Since the displaying forms in the overlapping portion and the non-overlapping portion with the field of view of the imaging object in the virtual viewpoint image are different from each other, it allows the user to easily understand to which direction the gaze direction is to be changed for the orientation alignment with the gaze of the imaging object.

Accordingly, the convenience when the user aligns the gaze direction of the virtual viewpoint image with the orientation of the gaze of the imaging object can be increased.

It is to be noted that the effects described in the present specification are exemplary to the last and are not restrictive and other effects may be applied.

4. Other Modifications

The present technology is not limited to the particular examples described hereinabove, and various modifications are available.

For example, while the foregoing description is directed to an example in which processes relating to imaging object analysis, setting of a viewpoint and generation of a virtual viewpoint image are performed by an image processor by a DSP, also it is possible for at least part of the processes to be implemented as software processing by a CPU or a GPU. The software processing is executed on the basis of a program, and the program is stored into a storage apparatus from which it can be read out by the computer such as a CPU or a GPU described above.

Further, the present technology can be applied suitably also where a competition other than competitions in which a competition ball is used is made an imaging target. Furthermore, the present technology can be applied suitably also where an even other than a competition is made an imaging target.

Furthermore, in the present technology, captured images can include not only captured images by R (red), G (green), and B (blue) but also captured images obtained by receiving near infrared light, infrared light, or polarized light.

5. Present Technology

It is to be noted that the present technology can take such configurations as described below.

(1)
An image processing apparatus, including:
a virtual viewpoint image generation section that generates, on the basis of three-dimensional information that represents an imaged imaging object in a three-dimensional space, an observation image from a viewpoint in the three-dimensional space as a virtual viewpoint image, in which
the virtual viewpoint image generation section
sets the viewpoint that follows movement of the imaging object.

(2)
The image processing apparatus according to (1) above, further including:
an imaging object analysis section that acquires analysis information of the imaging object on the basis of the three-dimensional information, in which
the virtual viewpoint image generation section sets a reference position to be used for the viewpoint setting of the virtual viewpoint image on the basis of the analysis information.

(3)
The image processing apparatus according to (1) or (2) above, further including:
a three-dimensional information generation section that generates the three-dimensional information on the basis of imaging information including captured images of a plurality of imaging apparatuses and an imaging condition corresponding to the captured images.

(4)
The image processing apparatus according to (2) or (3) above, in which
a person is targeted as the imaging object, and
the virtual viewpoint image generation section sets the reference position to a physical center of the person.

(5)
The image processing apparatus according to any one of (1) to (4) above, in which
the virtual viewpoint image generation section sets the viewpoint on the basis of position information of the imaging object.

(6)
The image processing apparatus according to any one of (1) to (4) above, in which
a person is targeted as the imaging object, and
the virtual viewpoint image generation section sets the viewpoint on the basis of attribute information of the imaging object.

(7)
The image processing apparatus according to any one of (1) to (4) above, in which
the virtual viewpoint image generation section sets the viewpoint on the basis of area information designated in the three-dimensional space.

(8)
The image processing apparatus according to any one of (1) to (7) above, in which
the virtual viewpoint image generation section sets the viewpoint on the basis of an operation input.

(9)
The image processing apparatus according to (8) above, further including:
a display section that displays the virtual viewpoint image, in which
the display section sequentially displays a plurality of the virtual viewpoint images that is different in a setting method of the view point as candidate viewpoint images, and
the virtual viewpoint image generation section sets the viewpoint on the basis of a selection operation relating to the candidate viewpoint images.

(10)
The image processing apparatus according to (8) above, further including:
a display section that displays the virtual viewpoint image, in which
the display section displays a plurality of the virtual viewpoint images that is different in a setting method of the view point as candidate viewpoint images in a juxtaposed relationship with each other, and
the virtual viewpoint image generation section sets the viewpoint based on a selection operation relating to the candidate viewpoint images.

(11)
The image processing apparatus according to any one of (1) to (10) above, in which
the virtual viewpoint image generation section allows changeover between a viewpoint for observing the imaging object and another viewpoint for observing outwardly from the imaging object as the viewpoint.

(12)
The image processing apparatus according to any one of (1) to (11) above, in which
the virtual viewpoint image generation section sets the viewpoint along a spherical surface that covers a periphery of the imaging object in response to an operation.

(13)

The image processing apparatus according to any one of (1) to (12) above, in which
  a person is targeted as the imaging object; and
  the virtual viewpoint image generation section
    sets a first-person viewpoint that includes a viewpoint for observing outwardly from the imaging object as the viewpoint, and
    selects a setting method for a gaze direction from the first-person viewpoint on the basis of an acquisition situation of analysis information relating to an orientation of the imaging object.

(14)

The image processing apparatus according to (13) above, in which
  the virtual viewpoint image generation section
  selects a setting method for the gaze direction on the basis of the acquisition situation and a changing rate of an orientation of the imaging object.

(15)

The image processing apparatus according to (13) or (14) above, in which
  the virtual viewpoint image generation section
  sets the gaze direction on the basis of the acquisition situation and an advancing direction of the imaging object.

(16)

The image processing apparatus according to any one of (1) to (15) above, in which
  a person is targeted as the imaging object; and
  the virtual viewpoint image generation section includes a notification processing section that
    sets a first-person viewpoint that includes a viewpoint for observing outwardly from the imaging object as the viewpoint, sets a gaze direction from the viewpoint on the basis of analysis information relating to an orientation of the imaging object, and
    performs a process for notifying a user of information according to a displacement between the gaze direction and an orientation of the gaze of the imaging object.

(17)

The image processing apparatus according to (16) above, in which
  the notification processing section
  performs a process for causing gaze alignment guide information for aligning the gaze direction of the virtual viewpoint image with the orientation of the gaze of the imaging object together with the virtual viewpoint image to be displayed.

(18)

The image processing apparatus according to (16) or (17) above, in which
  the notification processing section
  performs a process for estimating a field of view of the imaging object on the basis of the orientation of the gaze of the imaging object and causing both an overlapping portion and a non-overlapping portion with the field of view of the imaging object in the virtual viewpoint image to be displayed in different displaying forms.

REFERENCE SIGNS LIST

100, 100A, 100B Image processing system, 1, 1' Image processing apparatus, 11 3D model generation section, 11' 3D model generation apparatus, 12 Imaging object analysis section, 12' Imaging object analysis apparatus, 13, 13' Virtual viewpoint image generation section, 13a Viewpoint setting processing section, 13b Rendering processing section, 2 Imaging apparatus, 6 Inputting apparatus, 61 Operation section, 61a Touch panel, 62 Display section, 7, 7A Display apparatus, 50 Network, 51 HMD (head-mounted display), 52 Notification processing section, Pv Viewpoint, Dv Gaze direction, Pr Reference position, Drv Orientation of gaze, H1 Direction instruction information, H2 Target direction information, Ai Overlapping portion, Ao Non-overlapping portion

The invention claimed is:

1. An image processing apparatus, comprising:
  processing circuitry configured to:
    receive captured images from a plurality of imaging devices;
    generate a three-dimensional model that represents an imaged imaging object in a three-dimensional space according to the captured images, parameters of the plurality of imaging devices, and triangulation,
      a person being targeted as the imaging object, and
      the three-dimensional model including detection points representing joints of the person and lines interconnecting the detection points;
    detect an orientation of the imaging object at a reference position of the imaging object according to a face orientation and a posture of the three-dimensional model of the imaging object;
    set a viewpoint in the three-dimensional space at a predetermined distance from the reference position along a direction of the detected orientation, on a basis of attribute information of the imaging object, the attribute information including a name of the person;
    generate an observation image that is a virtual viewpoint image taken from the viewpoint; and
    change the viewpoint by following a movement of the imaging object, wherein
  in response to the three-dimensional model representing a plurality of imaging objects, the processing circuitry is configured to define lines, using a set of at least three imaging objects, each line passing through two of the at least three imaging objects and through two reference viewpoints outside of a shape defined by the at least three imaging objects and oriented along the each line toward the two imaging objects, and set the viewpoint as a midpoint between the two reference viewpoints nearest to an intersection of two lines of the lines.

2. The image processing apparatus according to claim 1, wherein the processing circuitry is further configured to:
  analyze the imaging object on a basis of the three-dimensional model to obtain analysis information of the imaging object; and
  set the reference position on a basis of the analysis information.

3. The image processing apparatus according to claim 2, wherein
  the processing circuitry is configured to set the reference position that corresponds to a physical center of the person.

4. The image processing apparatus according to claim 1, wherein
  the processing circuitry is configured to set the viewpoint on the basis of the attribute information of the imaging object, the attribute information including the name of the person, a team the person is affiliated with, and a uniform number associated with the person.

5. The image processing apparatus according to claim 1, wherein
the processing circuitry is configured to set the viewpoint further on a basis of area information designated in the three-dimensional space.

6. The image processing apparatus according to claim 1, further comprising:
a display that is configured to display the virtual viewpoint image, wherein
the display is configured to sequentially display different virtual viewpoint images corresponding to different viewpoints as candidate viewpoint images, and
the processing circuitry is configured to set a final viewpoint on a basis of a selection operation relating to the candidate viewpoint images.

7. The image processing apparatus according to claim 1, further comprising:
a display that is configured to display the virtual viewpoint image, wherein
the display is configured to display different virtual viewpoint images corresponding to different viewpoints as candidate viewpoint images in a juxtaposed relationship with each other, and
the processing circuitry is configured to set a final viewpoint on a basis of a selection operation relating to the candidate viewpoint images.

8. The image processing apparatus according to claim 1, wherein
the processing circuitry is configured to adjust the viewpoint along a spherical surface that covers a periphery of the imaging object in response to an operation.

9. The image processing apparatus according to claim 1, wherein
the processing circuitry is configured to:
set the reference position according to a center between shoulders of the person, a center of a body of the person, a center of a face of the person, or a center between feet of the person; and
set the orientation according to the face or a posture of the person.

10. The image processing apparatus according to claim 1, wherein
the observation image corresponds to a view taken from the viewpoint at a front side of the imaging object toward the reference position of the imaging object.

11. The image processing apparatus according to claim 1, wherein
the two lines of the intersection define a minimum angle among angles defined by the each line passing through two of the at least three imaging objects.

12. An image processing method for an image processing apparatus, the method comprising:
receiving captured images from a plurality of imaging devices;
generating three-dimensional model that represents an imaged imaging object in a three-dimensional space according to the captured images, parameters of the plurality of imaging devices, and triangulation,
a person being targeted as the imaging object, and
the three-dimensional model including detection points representing joints of the person and lines interconnecting the detection points;
detecting, by processing circuitry of the image processing apparatus, an orientation of the imaging object at a reference position of the imaging object according to a face orientation and a posture of the three-dimensional model of the imaging object;
setting, by the processing circuitry of the image processing apparatus, a viewpoint in the three-dimensional space at a predetermined distance from the reference position along a direction of the detected orientation, on a basis of attribute information of the imaging object, the attribute information including a name of the person;
generating an observation image that is a virtual viewpoint image taken from the viewpoint; and
changing the viewpoint by following a movement of the imaging object, wherein
in response to the three-dimensional model representing a plurality of imaging objects, the setting defines lines, using a set of at least three imaging objects, each line passing through two of the at least three imaging objects and through two reference viewpoints outside of a shape defined by the at least three imaging objects and oriented along the each line toward the two imaging objects, and sets the viewpoint as a midpoint between the two reference viewpoints nearest to an intersection of two lines of the lines.

13. A non-transitory computer-readable storage medium storing a computer program, which when being executed by a computer apparatus causes the computer apparatus to perform a method comprising:
receiving captured images from a plurality of imaging devices;
generating a three-dimensional model that represents an imaged imaging object in a three-dimensional space according to the captured images, parameters of the plurality of imaging devices, and triangulation,
a person being targeted as the imaging object, and
the three-dimensional model including detection points representing joints of the person and lines interconnecting the detection points;
detecting an orientation of the imaging object at a reference position of the imaging object according to a face orientation and a posture of the three-dimensional model of the imaging object;
setting a viewpoint in the three-dimensional space at a predetermined distance from the reference position along a direction of the detected orientation, on a basis of attribute information of the imaging object, the attribute information including a name of the person;
generating an observation image that is a virtual viewpoint image taken from the viewpoint; and
changing the viewpoint by following a movement of the imaging object, wherein
in response to the three-dimensional model representing a plurality of imaging objects, the setting defines lines, using a set of at least three imaging objects, each line passing through two of the at least three imaging objects and through two reference viewpoints outside of a shape defined by the at least three imaging objects and oriented along the each line toward the two imaging objects, and sets the viewpoint as a midpoint between the two reference viewpoints nearest to an intersection of two lines of the lines.

* * * * *